United States Patent
Stapelmann

(10) Patent No.: US 12,215,664 B2
(45) Date of Patent: Feb. 4, 2025

(54) PARAMETRIC WAVE ENERGY, SUBSEA POWER GENERATION

(71) Applicant: Bardex Corporation, Goleta, CA (US)

(72) Inventor: Frank Herbert Stapelmann, Santa Barbara, CA (US)

(73) Assignee: Bardex Corporation, Goleta, CA (US)

( * ) Notice: Subject to any disclaimer, the term of this patent is extended or adjusted under 35 U.S.C. 154(b) by 0 days.

(21) Appl. No.: 17/834,502

(22) Filed: Jun. 7, 2022

(65) Prior Publication Data

US 2022/0403810 A1 Dec. 22, 2022

Related U.S. Application Data

(60) Provisional application No. 63/209,030, filed on Jun. 10, 2021.

(51) Int. Cl.
| | |
|---|---|
| F03B 15/06 | (2006.01) |
| F03B 13/14 | (2006.01) |
| F03B 13/18 | (2006.01) |
| F03B 15/00 | (2006.01) |

(52) U.S. Cl.
CPC .......... F03B 13/1805 (2013.01); F03B 13/14 (2013.01); F03B 15/00 (2013.01)

(58) Field of Classification Search
None
See application file for complete search history.

(56) References Cited

U.S. PATENT DOCUMENTS

| | | | |
|---|---|---|---|
| 1,021,572 A | 3/1912 | Bryson | |
| 4,208,875 A | 6/1980 | Tsubota | |
| 4,355,511 A * | 10/1982 | Jones | F03B 13/1845 60/507 |
| 4,453,894 A | 6/1984 | Ferone et al. | |
| 4,490,621 A * | 12/1984 | Watabe | F03B 13/182 60/497 |
| 6,229,225 B1 | 5/2001 | Carroll | |
| 6,305,308 B1 | 10/2001 | Kristiansen et al. | |
| 8,008,795 B2 * | 8/2011 | Turner | H02J 3/1885 290/55 |
| 8,308,449 B2 | 11/2012 | Smith | |

(Continued)

FOREIGN PATENT DOCUMENTS

| | | |
|---|---|---|
| EP | 3011166 A1 | 4/2016 |
| JP | 2015520324 A | 7/2015 |
| WO | 2014202082 A1 | 12/2014 |

OTHER PUBLICATIONS

International Search Report and Written Opinion mailed Oct. 18, 2022 (received in PCT Application No. PCT/USPCT/US22/32519) [14 pages].

(Continued)

*Primary Examiner* — Kayla McCaffrey
(74) *Attorney, Agent, or Firm* — Michael S. McCoy; Amatong McCoy LLC

(57) ABSTRACT

A system for converting wave energy into electricity is provided. The system includes a wave energy mechanical interface, a power take off coupled with the wave energy mechanical interface, and a generator coupled with the power take off. A controller is coupled with the power take off. The controller is configured to regulate impedance of energy transferred from the power take off to the generator.

48 Claims, 30 Drawing Sheets

(56) References Cited

U.S. PATENT DOCUMENTS

| | | | |
|---|---|---|---|
| 10,669,982 B2 | 6/2020 | Stapelmann | |
| 2004/0201223 A1 | 10/2004 | Grinsted et al. | |
| 2005/0167988 A1 | 8/2005 | Wood | |
| 2006/0208839 A1 | 9/2006 | Taylor et al. | |
| 2007/0102937 A1* | 5/2007 | Resen Steenstrup | F03B 13/1815 290/53 |
| 2008/0238102 A1 | 10/2008 | Wegener et al. | |
| 2009/0309366 A1 | 12/2009 | Moore | |
| 2010/0071891 A1* | 3/2010 | Liknes | E21B 43/127 166/77.4 |
| 2010/0190394 A1 | 7/2010 | Hine et al. | |
| 2010/0207390 A1* | 8/2010 | Zimmermann | F03B 13/187 60/398 |
| 2011/0018275 A1 | 1/2011 | Sidenmark | |
| 2011/0036085 A1 | 2/2011 | Oigarden | |
| 2012/0096846 A1* | 4/2012 | Kalinin | F03B 13/20 60/497 |
| 2012/0247096 A1 | 10/2012 | Gerber et al. | |
| 2013/0103801 A1 | 4/2013 | Hansen et al. | |
| 2013/0226349 A1* | 8/2013 | Siegel | F03B 15/00 700/275 |
| 2013/0341927 A1 | 12/2013 | Murphree | |
| 2014/0284925 A1* | 9/2014 | Ross | F03B 15/00 290/52 |
| 2015/0069761 A1 | 3/2015 | Heim | |
| 2015/0167629 A1 | 6/2015 | Wigant | |
| 2015/0292471 A1 | 10/2015 | Kithil et al. | |
| 2016/0061179 A1 | 3/2016 | Pechlivanides | |
| 2016/0131101 A1 | 5/2016 | Bein | |
| 2017/0101977 A1* | 4/2017 | Sidenmark | F15B 15/08 |
| 2017/0152672 A1 | 6/2017 | Santucci | |
| 2017/0279303 A1* | 9/2017 | Bauer | H02J 3/38 |
| 2018/0030953 A1* | 2/2018 | Stapelmann | F03B 13/182 |
| 2019/0323478 A1 | 10/2019 | Jung | |

OTHER PUBLICATIONS

Berg, Jonathan C.; "Extreme Ocean Wave Conditions for Northern California Wave Energy Conversion Device", Sandia Report, SAND2011-9304, Dec. 2011, Sandia National Laboratories, Albuquerque, New Mexico and Livermore, California [19 pages].

Hansen, Rico Hjerm; "Design and Control of the Power Take-Off System for a Wave Energy Converter with Multiple Absorbers", Department of Energy Technology, Oct. 2013, Aalborg University, Denmark [291 pages].

Jacobson, P.; "Mapping and Assessment of the United States Ocean Wave Energy Resource", 2011 Technical Report, Dec. 2011, Electric Power Research Institute, Palo Alto, California [176 pages].

Notification of Transmittal of International Preliminary Report on Patentability issued Jul. 20, 2018, during the prosecution of International Application No. PCT/US2017/044477. [29 pages].

Notification of Transmittal of International Search Report and Written Opinion mailed Dec. 12, 2017 (issued in PCT Application No. PCT/US2017/044477) [17 pages].

Selvag, A., Wave Impact Forces on complex structures during lowering through the splash zone, Norwegian University of Science and Technology, Jun. 2013, pp. 1-125, Trondheim.

Supplementary EP Search Report issued in EP Application No. 17835368.6 dated Nov. 25, 2019 [7 Pages].

Umaya, Masahide; Noguchi, Toshihide; Uchida, Michiya; Shibata, Masaaki; Kawai, Yasuhiro; Notomi, Ryosuke, Wind Power Generation—Development Status of Offsore Wind Turbines, Sep. 2013, pp. 29-35, vol. 50, No. 3, Mitsubishi Heavy Industries Technical Review.

\* cited by examiner

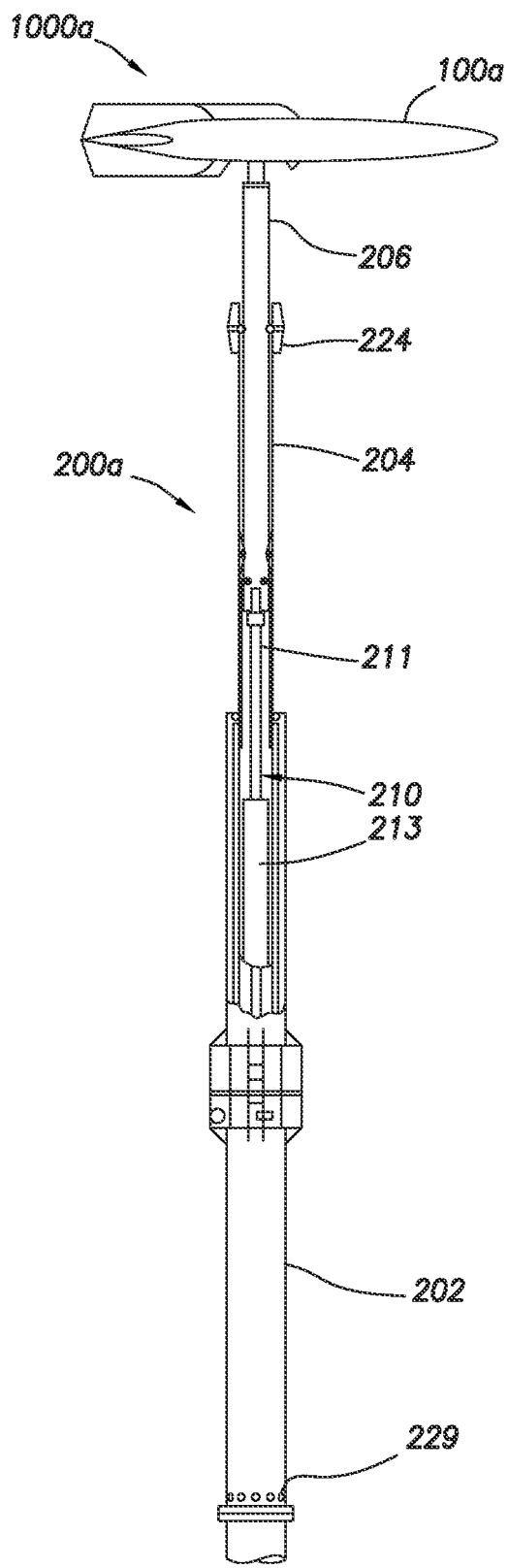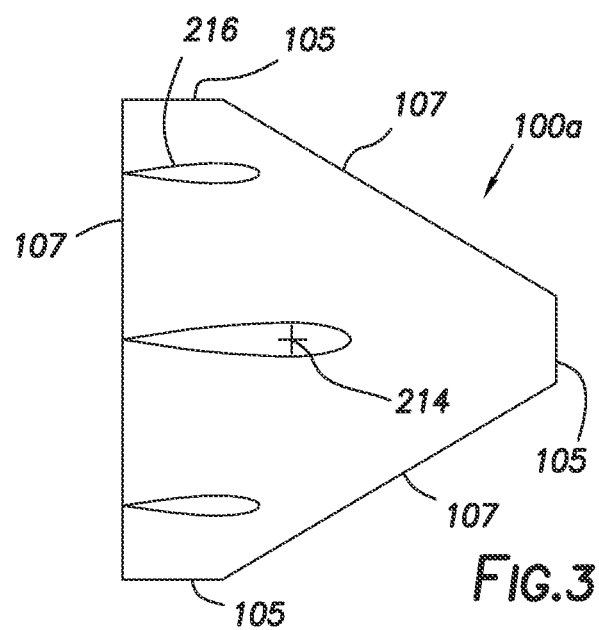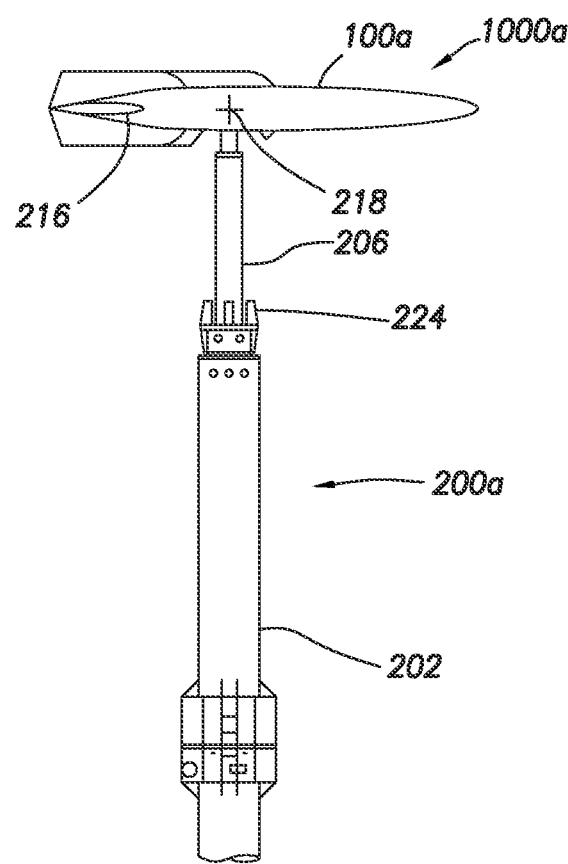

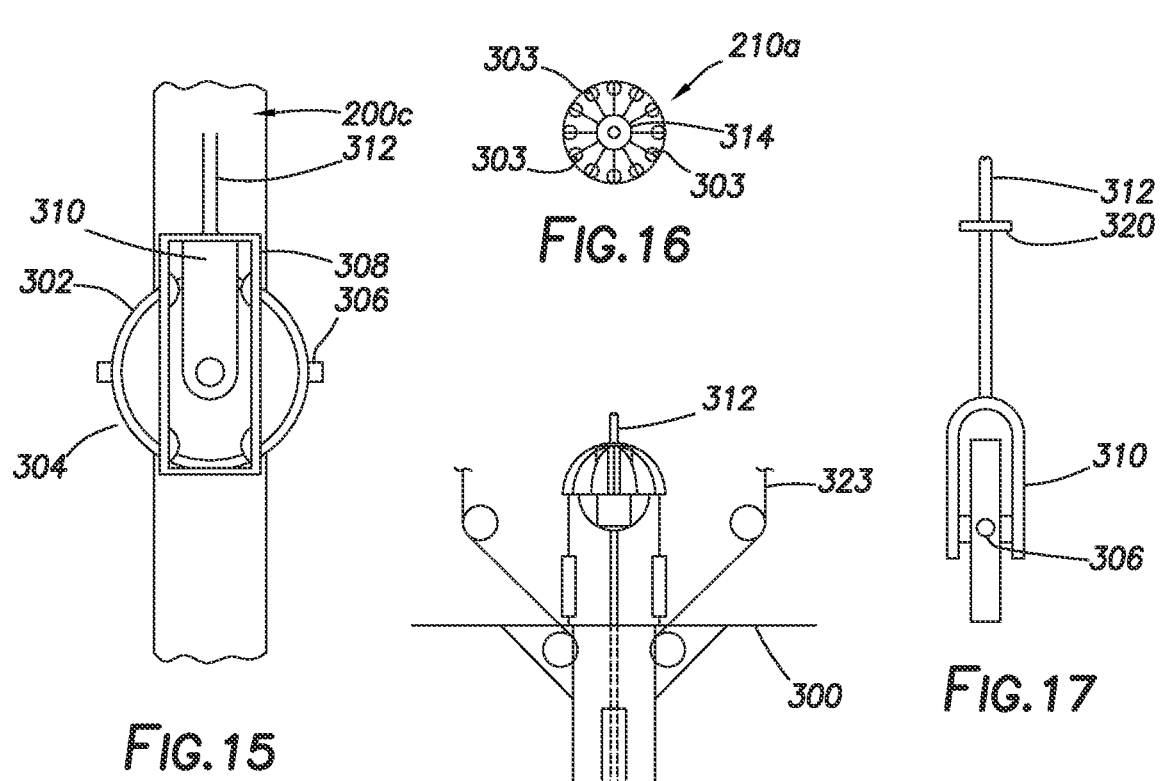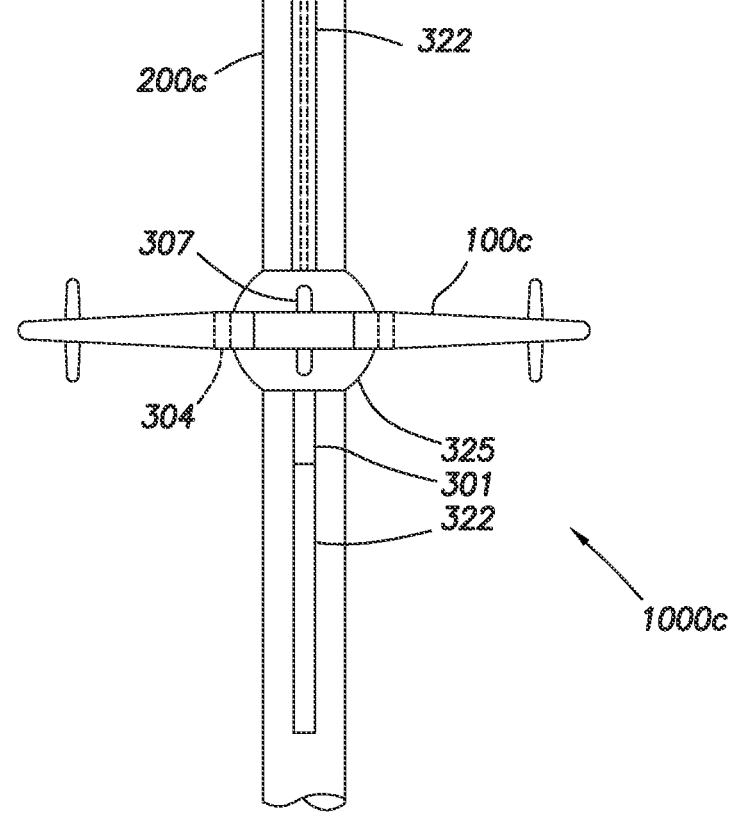

GIMBALLED PARAVENE HEAVE VECTORS: NORMAL AND STROKE θ PHASES Φ 180°–269°
PARAVENE PITCH / ROLL ANGLE (DEGREES, +CW/−CCW) = P.R Φ

HEAVE VELOCITY (w.V) θΦ=w.V.Φ

$\cos\theta = adj/hyp$
$\cos\theta * hyp = adj$
$\cos((w.\theta.\Phi - (ABS(P.R.\Phi))^\circ)) * w.\Phi = w.v.\Phi$
$*\cos(ABS(P.R.\Phi))^\circ) = w.V.\Phi$ HEAVE ACCELERATION (a.A) θΦ=a.A.Φ

$\cos\theta = adj/hyp$
$\cos\theta * hyp = adj$
$\cos(((180+ABS(P.R.\Phi))-A.z.\theta.\Phi))^\circ) = a.Z.\Phi$
$*\cos(ABS(P.R.\Phi))^\circ) = a.A.\Phi$ w.V.Φ=−−cos(ABS(P.R.Φ)°)*cos((w.θ.Φ−−(ABS(P.R.Φ))°))*w.Φ | a.A.Φ=−−cos(ABS(P.R.Φ)°)*cos(((180+ABS(P.R.Φ))−A.z.θ.Φ)°)*a.z.Φ

FIG.23C

GIMBALLED PARAVENE SURGE AS HEAVE VECTORS; NORMAL AND STROKE @ PHASES Φ 0°–89°
PARAVENE PITCH / ROLL ANGLE (DEGREES, +CW/–CCW) = P.R Φ

SURGE AS HEAVE VELOCITY (u.V) @ Φ =u.V.Φ ⎯⎯⎯⎯ SURGE AS HEAVE ACCELERATION (a.xA) @ Φ =a.x.A.Φ

$\cos\theta = adj/hyp$
$\cos\theta * hyp = adj$
$\cos((U.\theta.\Phi - (180 - ABS(P.R.\Phi))^\circ) * u.\Phi = u.v.\Phi$
$*\cos(ABS(P.R.\Phi))^\circ) = u.SaH.V.\Phi$ $\cos\theta = adj/hyp$
$\cos\theta * hyp = adj$
$\cos((U.\theta.\Phi - (180 - ABS(P.R.\Phi))^\circ) * u.\Phi = a.X.\Phi$
$*\cos(ABS(P.R.\Phi))^\circ = a.x.SaH.A.\Phi$ $u.SaH.V.\Phi =$
$\cos(ABS(P.R.\Phi))^\circ)*\cos((U.\theta.\Phi - (180 - ABS(P.R.\Phi))^\circ))*u.\Phi$ $a.x.SaH.A.\Phi =$
$-\cos(ABS(P.R.\Phi))^\circ)*\cos(((360 - ABS(P.R.\Phi))^\circ) - A.x.\theta.\Phi)*a.x.\Phi$

FIG. 23E

GIMBALLED PARAVENE SURGE AS HEAVE VECTORS: NORMAL AND STROKE ⊙ PHASES ⊕ 180°–269°
PARAVENE PITCH / ROLL ANGLE (DEGREES, +CW/−CCW) = P.R⊕

SURGE AS HEAVE VELOCITY (u.V) ⊙⊕=u.V.⊕

$\cos\theta = adj/hyp$
$\cos\theta * hyp = adj$
$\cos((U.\theta.\oplus - (ABS(P.R.\oplus))) * u.\oplus = u.v.\oplus$
$*-\cos(ABS(P.R.\oplus))*u.\oplus = u.SaH.V.\oplus$ $u.SaH.V.\oplus =$
$-\cos(ABS(P.R.\oplus))*\cos(U.\theta.\oplus - (ABS(P.R.\oplus)))*u.\oplus$ SURGE AS HEAVE ACCELERATION (a.xA) ⊙⊕=a.x.A⊕

$\cos\theta = adj/hyp$
$\cos\theta * hyp = adj$
$\cos(((180+ABS(P.R.\oplus)) - A.x.\theta.\oplus))*a.x.\oplus = a.X.\oplus$
$*\cos(ABS(P.R.\oplus)) = a.x.SaH.\oplus$ $a.x.SaH.A.\oplus =$
$\cos(ABS(P.R.\oplus))*\cos(((180+ABS(P.R.\oplus)) - A.x.\theta.\oplus))*a.x.\oplus$

FIG. 23G

GIMBALLED PARAVENE SURGE AS HEAVE VECTORS: NORMAL AND STROKE Θ PHASES Φ 270°−359°
PARAVENE PITCH / ROLL ANGLE (DEGREES, +CW/−CCW) = P.RΦ

| SURGE AS HEAVE VELOCITY (u.V) ΘΦ=u.V.Φ | SURGE AS HEAVE ACCELERATION (a.x.A) ΘΦ=a.x.AΦ |
|---|---|
| cos θ = adj/hyp | cos θ = opp/hyp    sin θ = opp/hyp |
| cos θ *hyp = adj | cos θ *hyp = opp    sin θ *hyp = opp |
| cos(((180−(ABS(P.R.Φ))−U.θ.Φ)°)*u.Φ = u.v.Φ | sin((A.x.θ.Φ −(270−ABS(P.R.Φ)))°)*a.xΦ = a.X.Φ |
| *cos(ABS(P.R.Φ)°)=u.SaH.V.Φ | *cos(ABS(P.R.Φ)°)=u.Φ | u.SaH.V.Φ =
cos(ABS(P.R. Φ)°)*cos(((180−ABS(P.R.Φ))−U.θ.Φ)°)*u.Φ a.x.SaH.Φ =
−cos(ABS(P.R.Φ))*sin((A.x.θ.Φ −(270−ABS(P.R.Φ)))°)*a.x.Φ

FIG.23H

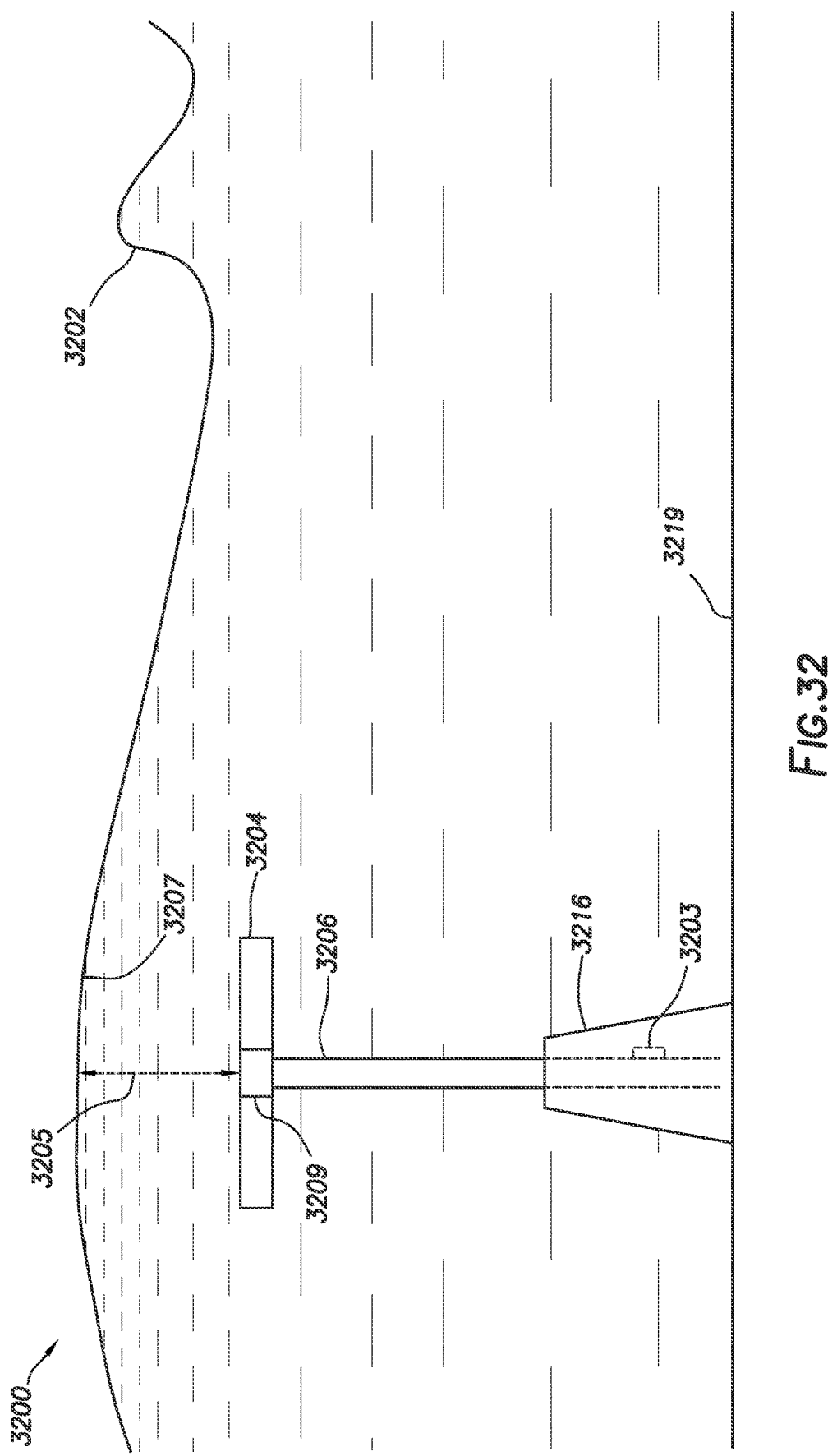

PARAMETRIC WAVE ENERGY, SUBSEA POWER GENERATION

CROSS-REFERENCE TO RELATED APPLICATIONS

The present application claims the benefit of U.S. Provisional Patent Application No. 63/209,030, filed on Jun. 10, 2021, and entitled "Parametric Wave Energy Subsea Power Generation," the entirety of which is incorporated herein by reference.

FIELD

The present disclosure relates to systems and methods for estimating wave energy and controlling a power take off (PTO) of a wave energy converter (WEC).

BACKGROUND

Wave energy conversion involves the use of a wave energy converter in the harvesting, transfer, conversion, storage, and use of water wave energy (e.g., ocean waves), such as to produce electricity.

One concern in WECs is the ability to operate under conditions in which wave energy levels may exceed the WECs capacity, also referred to as "survivability." For example, the mechanical interface and PTO of a particular WEC may be designed for a particular operating range of conditions (e.g., wave frequency, force, and height). Conventionally, when a WEC approaches, reaches, and/or exceeds such maximum operating conditions (MOC), the WEC is shut-down and placed into a "survival mode," thus ceasing to capture wave energy. The ability of a WEC to operate regardless of wave conditions may allow wave energy to be harvested in a continuous, uninterrupted manner, even during high-energy events, thus allowing continued capture of wave energy. Adjustability of a paravane operating depth allows the paravane to be positioned closer to the surface, allowing for greater wave energy collection during small, low-energy wave events.

Conventional WECs do not account for the fact that ocean near-shore currents may be approximately 90° relative to prevailing wave trains. Near-shore ocean currents may vary in direction and strength due to tidal influences, local weather, and seasonal climatic conditions. The ability of a WEC to vary operational direction with local current directions may allow wave energy to be harvested regardless of current direction.

Also, conventionally, buoy or positive buoyant WECs react only to heave up forces. A neutral buoyant paravane would allow reaction to both heave up and heave down forces, providing the potential for a doubling of the efficiency of the paravane in collection of wave energy relative to a WEC that only reacts to heave up forces.

It would be desirable to maintain the position of paravane in phase with waves during use, allowing for increased power output of the WEC.

It would also be desirable to control the transmission of energy through a transmission of the PTO to regulate the generation of electricity.

BRIEF SUMMARY

Some embodiments of the present disclosure include a system for converting wave energy into electricity. The system includes a wave energy mechanical interface, a power take off coupled with the wave energy mechanical interface, and a generator coupled with the power take off. A controller is coupled with the power take off. The controller is configured to regulate impedance of energy transferred from the power take off to the generator.

Some embodiments of the present disclosure include a method for regulating the generation of electricity from wave energy in a wave energy convertor. The method includes estimating an amount of energy transferred from a wave to a wave energy mechanical interface, estimating an amount of energy transferred from the wave energy mechanical interface to a power take off, and estimating an amount of energy transferred from the power take off to a plurality of generators. The method includes regulating impedance of the power take off to control the amount of energy transferred from the power take off to the generator; thereby, controlling the generation of electricity by the generators.

Some embodiments of the present disclosure include a method for regulating the generation of electricity from wave energy in a wave energy convertor. The method includes positioning a wave energy mechanical interface of a wave energy convertor in water such that the wave energy mechanical interface is submerged in the water. The wave energy convertor includes a power take off. The power take off includes a plurality of hydraulic pumps coupled with a plurality of hydraulic motors. The hydraulic pumps are coupled with the wave energy mechanical interface. A plurality of generators are coupled with the hydraulic motors. The method includes monitoring hydraulic pressure of the hydraulic pumps, monitoring flow rate of hydraulic fluid from the hydraulic pumps to the hydraulic motors, monitoring a distance between the paravane and a wave surface, or combinations thereof. The method includes adjusting the hydraulic pressure of the hydraulic pumps, adjusting the flow rate of hydraulic fluid from the hydraulic pumps to the hydraulic motors, adjusting the distance between the paravane and the wave surface, or combinations thereof thereby, controlling the generation of electricity by the generators.

Some embodiments of the present disclosure include a method for estimating wave energy. The method includes forming a modified Airy Wave Theory model, including generating a graph of a propagation of waves on a surface of a homogeneous fluid layer in accordance with Airy Wave Theory. A wave phase of the graph for the Airy Wave Theory begins at a wave crest. The method includes resetting a beginning of the wave phase from the wave crest so that the graph and calculation begins at a beginning of a wave trough when the wave particle is at SWL. The method includes reorienting a direction of the propagation of the wave phase. The method includes determining a wave energy estimate based on this modified Airy Wave Theory and the Morison Equation. Airy Theory is also known as Linear Wave Theory.

BRIEF DESCRIPTION OF THE DRAWINGS

So that the manner in which the features and advantages of the systems and methods of the present disclosure may be understood in more detail, a more particular description may be had by reference to the embodiments illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 2 is another partial cut-away, side view of the wave energy converter of FIG. 1, with the stroke and operating range telescopes extended.

FIG. 3 is a plan view of the depth adjustable paravane of FIG. 1.

FIG. 4 is a side view of the wave energy converter of FIG. 1, with the stroke telescope extended and the operating range telescope retracted.

FIG. 15 is a detail view showing a rolling ring axle, pitch wheel, and pitch wheel bearing chase and carriage frame of the wave energy converter of FIG. 18.

FIG. 16 is a detail view of energy collection device cylinders and an actuator rod locking collet of the wave energy converter of FIG. 18.

FIG. 17 is a detail view of showing a pitch wheel yoke of the wave energy converter of FIG. 18.

FIG. 18 is a partial cut-away, bow elevation view of a wave energy converter including a depth adjustable paravane installed on a spar in accordance with certain embodiments.

FIGS. 23A-23H depict graphs illustrating vector analysis performed on the surge and heave velocities and accelerations, as determined in accordance with Airy wave theory, to determine stroke velocities and accelerations on a stroke telescope of the WEC.

FIG. 32 is a simplified schematic of a wave energy convertor.

DETAILED DESCRIPTION

Figure 1:
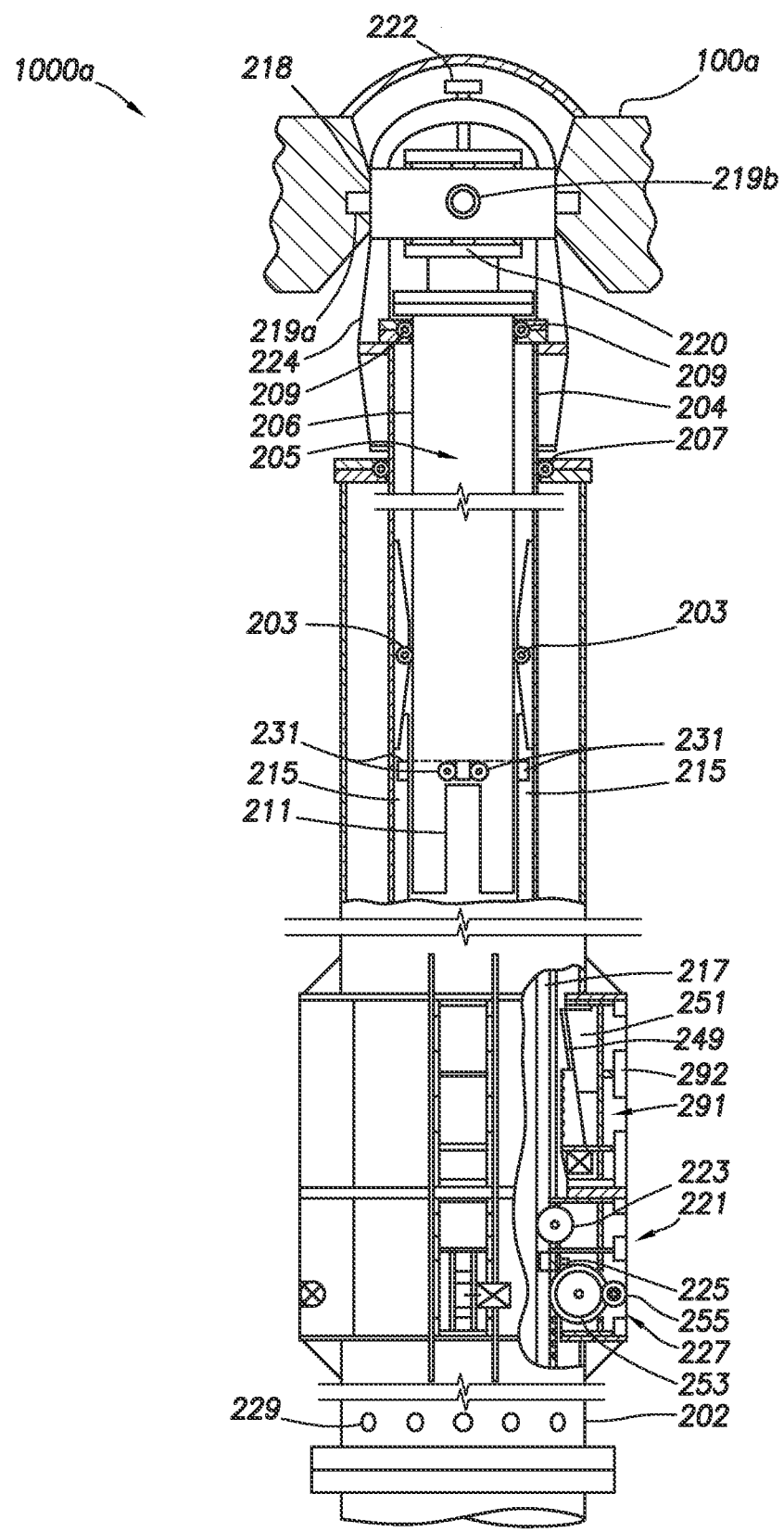
FIG. 1 is a partial cut-away, side view of a wave energy converter including a depth adjustable paravane installed on a structural column with the stroke and operating range telescopes retracted.

Certain embodiments of the present disclosure include a wave energy converter. The wave energy converter is configured to harvest water wave energy (e.g., ocean waves). For example, and without limitation, the wave energy converter may store energy from water waves as hydraulic energy (e.g., pressurized hydraulic fluid), pneumatic energy (e.g., pressurized gas), or electrical energy (e.g., battery stored electricity). The stored energy may then be transferred and/or used to perform work. The wave energy converter disclosed herein is not limited to storage in these mediums, and may be configured to store energy in any manner and form known to those skilled in the art. The stored energy may be transferred from a local environment proximate the wave energy converter to a remote environment at a distance from the wave energy converter, such as transfer of energy from an offshore wave energy converter to onshore for use thereof. In some embodiments, energy harvested by the wave energy converter is not stored, and is transferred and/or used to perform work without intermediate storage. The energy harvested by the wave energy converter may be used to provide power in the local environment, such as providing power to an offshore floating vessel; providing power to a remove environment, such as inputting electrical energy into an onshore electric grid for residential, commercial, and/or industrial use; or combinations thereof. Certain embodiments relate to an array of multiple wave energy converters disclosed herein for harvesting water wave energy.

Embodiments of the wave energy converter include a paravane (also referred to as a "fish" or "biomimicry fish") that is rotationally and pivotably coupled to a support structure such that the paravane is capable of moving relative to the support structure in response to water waves impacting the paravane. While exemplary embodiments of rotational and pivotable coupling of the paravane to the support structure are shown and described herein, such rotational and pivotable coupling is not limited to the embodiments shown in the Figures, and may be achieved in any manner known to those skilled in the art.

The paravane may be a depth adjustable paravane. As used herein, "depth adjustable paravane" refers to a paravane in which a depth of the paravane, relative to the seabed and to the mean sea level is adjustable, allowing the paravane to be selectively maintained at a desired depth. In some embodiments, the depth of the paravane may be adjusted "on the fly" in response to, for example and without limitation, changes in the mean sea level, changes in the force of impact imparted from the waves to the paravane, and/or changes in the desired level of energy to be harvested from the water waves. While exemplary embodiments of depth adjustment of the paravane are shown and described herein, such depth adjustment is not limited to the embodiments shown in the Figures, and may be achieved in any manner known to those skilled in the art.

Embodiments of the wave energy converter include an energy collection device operatively coupled to the paravane. In operation, movement of the paravane in response to water waves impacting the paravane is transferred (e.g., mechanically) from the paravane into the energy collection device (e.g., for storage therein). While exemplary embodiments of energy collection devices are shown and described herein, such energy collection devices are not limited to the embodiments shown in the Figures, and may be any energy collection device known to those skilled in the art.

With reference to the Figures, embodiments of the wave energy converter will now be described. However, it is understood by those skilled in the art that the wave energy converter disclosed herein is not limited to the particular embodiments shown and described with reference to the Figures. FIGS. 1-20 are reproduced from U.S. Pat. No. 10,669,982 and are described below. The wave energy converters shown and described in FIGS. 1-20 may be used in conjunction with embodiments of the systems and methods for controlling PTOs disclosed herein.

Structural Column with Telescoping Sections

FIGS. 1-4 depict wave energy converter 1000a, and portions thereof, in accordance with certain embodiments of the present disclosure. Wave energy converter 1000a includes paravane 100a rotationally and pivotably coupled to support structure 200a, and operatively coupled to energy collection device 210.

Support Structure

In the embodiment of FIGS. 1-4, support structure 200a has three sections. The first section is a static, structural column 202 or tower. The structural column 202 may be made of steel, a high-modulus composite material (e.g., resin), or any other suitable material as understood by those skilled in the art. Structural column 202 is fixed and static relative to the water wave. In a preferred embodiment, structural column 202 is fixed to the seabed (not shown). In alternative embodiments, structural column 202 may be fixed to a structure that is relatively stable relative to water wave. For example, it may be fixed to a movable or floating platform. Support structure 200a includes a second section, here shown as operating range telescope 204, which is telescopically engaged to structural column 202 and is extendable and retractable relative to structural column 202. Operating range telescope 204 is coupled to structural column 202, at least in part, via upper alignment girth rollers 207 and at a lower end by draft adjustment assemblies 221. Support structure 200a includes a third section, herein shown as stroke telescope 206, which is telescopically engaged to operating range telescope 204, and is movable relative to operating range telescope 204. Stroke telescope 206 is coupled to operating range telescope 204, at least in part, via upper alignment girth rollers 209 and lower alignment girth rollers 203.

Operating range telescope 204 moves (e.g., extends and retracts) relative to structural column 202, to define an operating range of paravane 100a. As used herein, "operating range" refers to the distance from the mean sea level to the greatest depth required for continual operation of paravane 100a, i.e., the Rated Operating Condition (ROC), which is descried in more detail below.

Also, as described in more detail below with respect to paravane 100a, stroke telescope 206 moves relative to the structural column 202 and the operating range telescope 204 in response to water wave. As shown, stroke telescope 206 and operating range telescope 204 are 1:1 ratio cantilevered pipes; however, other configurations of stroke telescope 206 and operating range telescope 204 are possible. Each of stroke telescope 206 and operating range telescope 204 may be made of steel, a high-modulus composite material (e.g., resin), or any other suitable material as understood by those skilled in the art.

Upper alignment girth rollers 207 and 209 may be installed on upper flanges of operating range telescope 204 and stroke telescope 206, respectively. Upper alignment girth rollers 207 and 209 may be supported by the upper flanges of the telescopes, and be bolted thereon. Upper alignment girth rollers 207 and 209 may be closely spaced and include sealed bearing and wear surfaces of a material that is softer than the mating surface of the upper flanges of the telescopes, which may include a cathodic protection paint thereon.

Lower alignment girth rollers 203 may be of a similar construction as upper alignment girth rollers 207 and 209, but installed on an interior of operating range telescope 204.

The structures disclosed herein are not limited to including upper alignment girth rollers. For example, in some embodiments the upper alignment girth rollers are replaced by composite, adjustable dry (i.e., no oil/grease) bearing pads.

Support structure 200a includes seawater vents 229. In operation, reciprocating motion of energy collection device 210, as described in more detail below, flushes ocean water throughout the interior of portions of support structure 200a. In some embodiments, gravity swung check/flapper valves are disposed at the base of structural column 202, such that during flushing through seawater vents 229, check/flapper valves open and when not flushing, check valves close. The placement and arrangement of seawater vents 229 is not limited to the particular placement and arrangement shown.

Paravane 100a is rotationally and pivotably coupled to a top of support structure 200a. With reference to FIG. 1, paravane 100a is attached to stroke telescope 206 via gimbal joint 218. Gimbal joint 218 may be a double gimbal including spindle 220, and may be configured to provide paravane 100a with a pitch and roll and rotation relative to structural column 202. In one embodiment, the gimbal joint 218 allows for up to 40° of pitch and roll and unlimited 360° rotation about structural column 202. The ability of paravane 100a to pitch, roll, and rotate, reduces or eliminates side loading on wave energy converter 1000a, such as side loading on support structure 100. Also, the ability of paravane 100a to pitch, roll, and rotate allows paravane 100a to adjust to changes in the direction of impacting water waves, such as in dynamic water wave conditions, allowing paravane 100a to maximize reaction to heave up and heave down forces.

Gimbal joint 218 may include a cast gimbal ring with two axles, 219a and 219b. The two gimbal ring axles 219a and 219b may be captured by sealed, tapered roller bearings held by journals, port and starboard, in paravane 100a. Spindle 220, with captured dry bearings, may include two axles, with a 90° offset relative to the axels 219a and 219b. In some embodiments, installation and removal of the gimbal ring from the spindle 220 casting is possible with no spindle axle bearings in place. Spindle 220 bearing casting may be a two-part "female" bolted assembly having two axles and an "hour-glass" or "double-conical" form. In certain embodiments, the taper of the hourglass or double-conical shape of spindle 220 bearing casting is not a locking taper. Spindle 220 bearing casting may be the journal for two pairs of split-dry bearings, each of conical shape. Some embodiments of spindle 220 may include vertical thrust ring bearings. Dry bearings of spindle 220 may be sealed from the marine environment. A grease or graphite cap diaphragm may be disposed at a crown of spindle 220, allowing ocean depth pressure to purge grease or graphite in the case of any seal failures. In some embodiments, with certain mortise and tenon mating of the two casting halves of spindle 220 bearing casting, as the dry bearings wear and decrease in thickness a servicing step may include tightening the two casting halves together, thus decreasing any play in the bearing/spindle assembly.

Although not shown, gimbal joint 218 may also include dampeners, such as springs or hydraulics, to prevent the gimbal joint 218 from hitting its mechanical limits when operating in high energy, turbulent conditions. In some embodiments, correct controls, reducing depth of paravane 100a, will preclude paravane 100a from operating in conditions that would require the use of 'soft' limit stops, such as dampeners. Alternatively, the paravane 100a may include closed loop pairs of hydraulic cylinders or pumps, which, through pressure regulation and acting as brakes, operate to limit the pitch and roll. The closed loop hydraulic cylinders may also be configured to return gimbal joint 218 to a preferred orientation, such as one in which the paravane 100a is in a horizontal attitude.

With spindle 220 attached to stroke telescope 206, both spindle 220 and stroke telescope 206 are prevented from rotating in response to paravane 100a azimuth change, by guide bars 215 coupled (e.g., machine screwed) to the inside of operating range telescope 204 and aligned with the centerline of operating range telescope 204. Rotation limit rollers 231 (guide bar rollers) may be coupled (e.g., machine screwed, such as if of steel construction) to the exterior of the stroke telescope 206, which engage guide bars 215 and limit rotation thereof.

Structural column 202 provides alignment, rotation, and depth control for the operating range telescope 204. In a preferred method of providing alignment, rotation, and depth control, structural column 202 of the embodiment shown in FIG. 1 includes four adjustment assemblies 221. The cutaway portion of structural column 202 in FIG. 2 shows one of the adjustment assemblies 221. The adjustment assemblies 221 are used to retract or extend operating range telescope 204, which, in turn, raises and lowers paravane 100a. Operating range telescope 204 includes guide bar/racks 217 (one of four of which is shown). The operating range telescope 204 is limited in rotation by guide bars/racks 217 for depth control. The embodiment shown includes two hydraulic controls-draft locking assemblies 291 and draft adjustment assemblies 221. Draft locking assemblies 291 and draft adjustment assemblies 221 are configured as cartridges, allowing assemblies 291 and 221 to be readily changeable, as maintenance requires.

Each draft locking assembly 291 includes paired wedge chocks 251, which are selectively engaged and disengaged via a hydraulic motor 292, such as via an acme screw powered by the hydraulic motor. The paired wedge chocks 251 may be aligned with the top surface of a dovetail track 249. The paired wedge chocks 251 use the dovetail track 249 to maintain alignment to each other.

In some embodiments, the draft locking assemblies do not include paired wedge chocks with acme screw controls. The draft locking assemblies can include hydraulic motors for use in controlling and for use as locking brakes.

Each draft adjustment assembly 221 includes lower alignment rollers 223, rotation limit rollers 225, and a power train 227. The power train 227 includes a hydraulic motor (not shown), a reduction gear 255, and a pinion gear 253. Rollers 223 and 225 engage the sides of guide bar/racks 217. The pinion gear 253 of power train 227 engages teeth of the guide bar/racks 217. Coordinated control between locking and adjustment assemblies 291 and 221 increases or decreases and locks the position of operating range telescope 204 depth, thereby, controlling the operating range of paravane 100a.

Wave energy converter 1000a includes slip ring 222 for mechanical, electrical, and/or data communication links to and from paravane 100a. Spindle 220 may include a pipe chase on a centerline thereof for slip ring 222 pipe, tubing and cable components.

With reference to FIG. 1, stroke telescope 206 may include a pressurized buoyancy chamber 205. As shown in FIG. 1, paravane 100a is "parked" on bolsters 224 of support structure 200a, with the PTO of energy collection device 210 retracted.

Energy Collection Device

Energy collection device 210 is operatively coupled to paravane 100a via support structure 200a. As shown in FIG. 2, energy collection device 210 is operatively coupled to stroke telescope 206, which is, in-turn, operatively coupled to paravane 100a. In operation, paravane 100a is forced upwards and downwards (relative to the energy collection device 210) in response to force applied to paravane 100a from the waves. Such upward and downward movement of paravane 100a causes stroke telescope 206 to stroke upwards and downwards along an effective stroke length, respectively, thereby, causing rod 211 of energy collection device 210 to stroke upwards and downwards within cylinder 213 of energy collection device 210, transferring water wave energy into energy collection device 210.

In a preferred embodiment, energy collection device 210 is a linear, reciprocating power take off (PTO) assembly, which may operate in a vertical alignment. As shown, energy collection device 210 includes a hydraulic cylinder (rod 211 and cylinder 213) as the PTO; however, energy collection device 210 may include other linear PTOs. The hydraulic cylinder PTO of the energy collection device 210 may be arranged such that the rod 211 of the hydraulic cylinder is arranged above the cylinder 213, as shown in FIG. 2. Such a "rod-up" configuration allows for connecting hydraulic hoses in a central position of wave energy converter 1000a, spaced-apart from moving portions of wave energy converter 1000a. This, in-turn, minimizes the required diameters of operating range telescope 204 and stroke telescope 206. Rod 211 may be mechanically coupled to a lower end of stroke telescope 206, such as via a blade mating clevis.

In a preferred embodiment, energy collection device 210 may be installed within support structure 200a. For example, energy collection device 210 may be installed solely within operating range telescope 204, with the base of cylinder 213 pinned by spherical bearing to the lower end of operating range telescope 204, and the rod 211 blade end spherical bearing pinned to the lower end of stroke telescope 206, with the lower end of stroke telescope 206 positioned within operating range telescope 204. In FIG. 1, the rod 211 blade end and pin hole center-line are not shown for purpose of clarity. Installing the energy collection device 210 within the support structure 200a protects it from the surrounding marine flora and fauna, protects it from side-loading, and allows only linear motion of the rod 211 relative to the cylinder 213, without rotary motion. However, other embodiments are envisioned in which the energy collection device 210 performs the functions of one or more of the operating range telescope 204, stroke telescope 206, and structural column 202. For example, paravane 100a may be attached to the energy collection device 210. In this arrangement, the cylinder 213 and rod 211 perform the functions of at least the stroke telescope. In another example, energy collection device 210 can also be configured to control the maximum extension or retraction of the rod 211. In this manner, the energy collection device 210 can also perform the range adjustments function.

In some embodiments, the hydraulic fluid used in one or more of the hydraulic cylinders of wave energy converter 1000a is a saturated synthetic ester-based hydraulic fluid, which provides compatibility to the marine biosphere, such as a vegetable oil-based fluid. An example of a suitable hydraulic fluid for use herein is PANOLIN® HLP SYNTH E, which meets ISO-15380 HEES, WGK-1, and OECD 301B standards. In some embodiments, wave energy converter 1000a may include sealed chambers (ecology cofferdams) external to the hydraulic cylinder pressure seals of the energy collection device 210, which may be used to monitor and control pressure seal conditions.

As harvested, ocean wave power is cyclical, based on wave period, and is delivered to an electrical power grid after conditioning (i.e., smoothing the sinusoidal surges). With linear, electrical PTO assemblies, such smoothing of sinusoidal waves may be achieved through the use of batteries, which may be environmentally hazardous, as well as financially costly. Although not shown, a preferred embodiment includes power conditioning to smooth sinusoidal waves. In one embodiment, stored pressure is used for power conditioning. The pressure may be stored hydraulically or pneumatically (e.g., stored air pressure). Some embodiments use conditioned hydraulic power in a piston-type pressure accumulator. Stored hydraulic power may then be applied to one or more electrical generators (not shown) in a continuous and controlled manner to produce electricity. Due to continually changing ocean wave seasonal energy levels, energy collection device 210 may, at times, operate at lower than desired pressures; however, stored power allows the pressure to be increased during such times to achieve the desired pressure for hydraulic motor/generator operation.

Paravane

Figure 10:
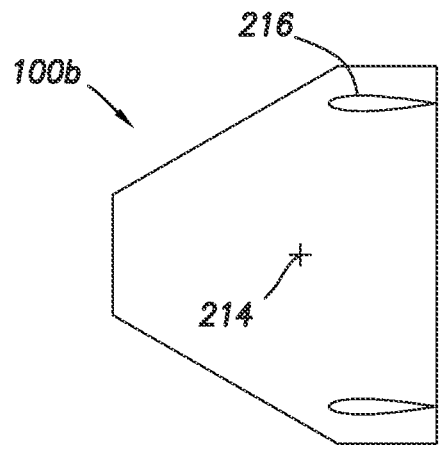
FIG. 10 is a plan view of the depth adjustable paravane of FIG. 6.
Figure 11:
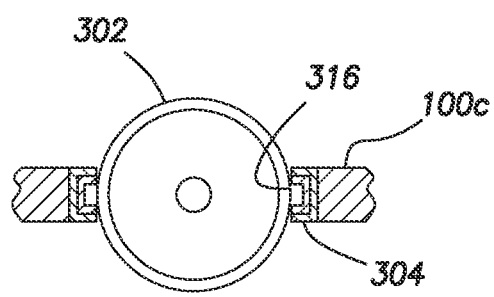
FIG. 11 is a detail view of a pitch wheel of the wave energy converter showing the roll ring and azimuth bearing chase assembly and roll ring frame in accordance with FIG. 18.
Figure 12:
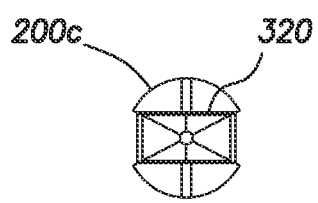
FIG. 12 is a detail view of an upper traveling spar frame of the wave energy converter of FIG. 18.
Figure 13:
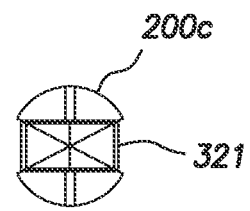
FIG. 13 is a detail view of a lower traveling spar frame of the wave energy converter of FIG. 18.
Figure 14:
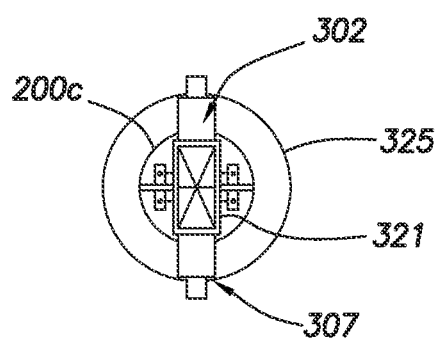
FIG. 14 is a detail, bottom view showing a sphere fairing and pitch wheel of the wave energy converter of FIG. 18.
Figure 19:
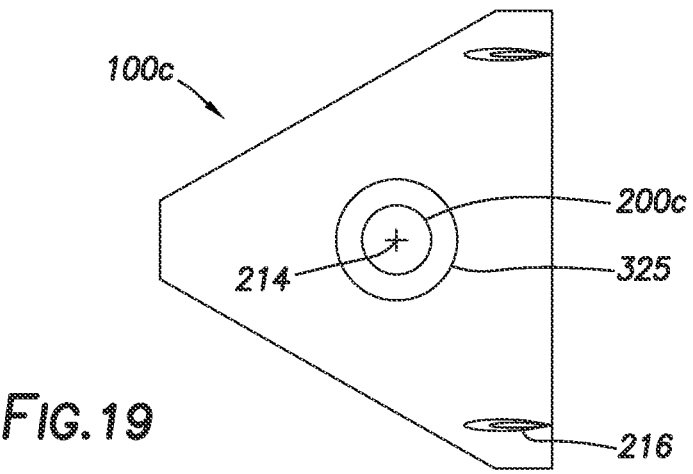
FIG. 19 is a plan view of the depth adjustable paravane of FIG. 18.

In a preferred embodiment, paravane 100a has a triangular or substantially triangular plan shape, such as an equilateral triangle plan shape. As used herein, the "plan shape" of the paravane refers to the two-dimensional shape of the paravane, and "plan shape area" or "planar area" refer to the two-dimensional area of the "plan shape." In some embodiments, the paravane has the plan shape of a truncated triangle, such as a truncated equilateral triangle. For example, paravane 100a in FIG. 3 has a plan shape of a truncated equilateral triangle. That is, if sides 107 of paravane 100a were extended to meet at points, paravane 100a would have the plan shape of an equilateral triangle. However, paravane 100a has truncated ends 105, such that paravane 100a has the plan shape of a truncated equilateral triangle. While truncated ends 105 are shown as straight sides connecting with sides 107, which are also shown as straight sides, one skilled in the art would understand that truncated ends 105 and/or sides 107 may be arcs. The truncations, forming truncated ends 105, may be equal in size, such as is with paravane 100a, or may vary, such as is with paravanes 100b and 100c (FIGS. 10 and 19, respectively). The plan shape of paravane 100a may have a symmetrical cross-section. With reference to FIG. 3, the surface area of the plan shape of paravane 100a ranges from 900 ft$^2$ to 12,000 ft$^2$, including any values there-between. The surface area of the plan shape of paravane 100a may have another value, including those less than 900 ft$^2$ and greater than 12,000 ft$^2$. The center of planar area 214 is shown in FIG. 3. While shown and described as a "paravane", the "paravane" disclosed herein is not limited to any particular shape, including those shapes conventional to paravanes. Rather, the "paravane" may have any shape, size, and/or configuration suitable for the functions described herein. For example, the plan shape of the paravane may be triangular, disc, truncated triangular, or any other shape. In some embodiments, paravane 100a has a shape similar or substantially similar to a delta wing.

Paravane 100a may include at least one tail foil or a plurality of tail foils 216. Tail foils 216 may provide at least some directional control to paravane 100a. There are a number of varying ways in which to achieve rotation, pitch, and/or roll of paravane 100a in response to impact with water waves, and the present disclosure is not limited to coupling paravane 100a to support structure 200 via a gimbal joint. In some such embodiments, both stroke telescope 206 and operating range telescope 204 are configured to retract within support structure 200a, and each of the operating range telescope 204, stroke telescope 206, and structural support 200a have no tails and/or rudders attached thereto. In some such embodiments, the connection of cables to paravane 100a and hoses to hydraulic cylinder 213 are maintained in a fixed azimuth position and do not twist within the support structure 200a. The addition of tail foils 216 to paravane 100a increases the three-dimensional surface area of paravane 100a. As such, selective placement of tail foils 216 allowed the three-dimensional surface area of paravane 100a to be increased aft of the center of planar area 214 relative to fore of the center of planar area 214.

In a preferred embodiment, a majority of the surface area of paravane 100a is aft of center of planar area 214. Such a geometrical configuration provides greater planar area friction aft than forward of paravane 100a, such that, even in non-linear and turbulent fluid vortices, paravane 100a is hydrodynamically stable. The nose or bow of paravane 100a will align to the prevailing flow, or to the resultant vector of multiple flows, via rotation of paravane 100a about support structure 200a.

In a preferred embodiment, the center of planar area 214 coincides with the center of buoyancy of paravane 100a. The center of planar area 214 and/or the center of buoyancy is, in at least some embodiments, also the point at which paravane 100a is connected to stroke telescope 206 (e.g., by way of spindle 220). The stability of paravane 100a may be adjusted based on the location of this connection point, center of planar area 214, and center of buoyancy. In the preferred embodiment, the paravane 100a is configured to be both dynamically and statically stable. However, in alternative embodiments, especially those in which the paravane 100a can be controlled, the stability can be neutral or even slightly unstable—requiring control input.

Paravane 100a may have neutral buoyancy, and react to both heave-up and heave-down wave energy. The stable, efficient, and neutral buoyant hydrodynamic form of paravane 100a allows paravane 100a to operate in vigorous and high-energy conditions. The displacement of paravane 100a may be adjusted, as required, to meet neutral buoyancy in view of attached weights of active components including, but not limited to: gimbal joint 218, spindle 220, stroke telescope 206, and PTO rod 211 and cylinder 213 (or armature if the PTO is electric). In a preferred embodiment, paravane 100a has a symmetrical cross-section. Thus, paravane 100a is not an asymmetrical lifting foil. In a preferred embodiment, paravane 100a may be shaped according to the NACA-00415 series of foils.

In some embodiments, paravane 100a has a composite construction. For example, in one embodiment, paravane 100a may have internal longitudinals, wing spars and plan shape perimeters made of metal (e.g., steel); a polymer foam (e.g., polyurethane foam) core; skin panels of multidirectional wood veneers of metal (e.g., steel) configured to withstand expected shear loads, longitudinal and transverse loads, and to provide a puncture resistance envelope to paravane 100a; layers of fiberglass or other high-tensile cloth for seamlessness, abrasion resistance and a waterproof barrier; and lamination (e.g., vacuum bag lamination of the entire paravane 100a with an epoxy). The paravane 100a is not limited to such a composite construction, and may be made of any suitable material(s).

Onboard components that paravane 100a may have include, but are not limited to: one or more compressed air/sea water ballast tanks; one or more (e.g., two) ailerons adapted to provide dynamic trim compensation and potential active-controls; azimuth and attitude sensing and communication; pneumatic and/or hydraulic piping, as required; male/female mechanical coupling for connection to stroke telescope 206; or combinations thereof. In some embodiments, paravane 100a may include onboard at least one (e.g., two) closed loop pairs of hydraulic cylinders or pumps (not shown) that, through pressure regulation, act as brakes to limit pitch and roll of paravane 100a by centralizing the gimbal joint 218.

Maximum wind wave (short period) or swell (long period) energy is at the still water level (SWL), i.e., the mean sea level between waves. For maximum wave energy harvesting, depth adjustable paravane 100a is operated as close as practicable to the SWL. The ability of the depth adjustable paravane 100a to be selectively raised up into prime heave energy and lowered to depths away from overabundant heave energy (when wave energy increases) allows paravane 100a to operate in varying wave energy conditions, such that wave energy harvest may be continuous, and uninterrupted by low and high-energy events. As such, some embodiments of wave energy converter 1000a exhibit no maximum operating conditions (MOC).

The threshold operation condition for the depth adjustable paravane 100a or the hydraulic PTO of the energy collection device 210 may be at low-wave energy levels. As such, the rated operating condition (ROC) of the depth adjustable paravane 100a or the hydraulic PTO of the energy collection device 210 may have a broad spectrum, with the ability to operate at low and high pressures.

The range of motion of paravane 100a is, at least in part, determined by the rod 211 stroke length. The rod 211 stroke length may be optimized from wave height historical data for particular coastlines.

As stated, the operating range telescope 204 length defines the operating range of paravane 100a. In some embodiments, the depth of the operating range telescope is adjusted to the height of tide cycles. Operating range telescope 204 may be adjusted to increase or decrease its depth as wave heights and energy decrease or increase, such that the PTO of the energy collection device 210 may continuously or continually operate at the optimal ROC. In operation, the depth of operating range telescope 204 may be controlled by power train 227, and the depth may be locked by the wedge chocks 251 engaged with guide bar/racks 217.

In some embodiments, paravane 100a may be autonomously stable and self-tending, requiring no external control. Hydraulic power logic, aided by process logic control, may be used to automate the adjustment and locking of operating range telescope 204. Hydraulic power logic may also provide for primary automated control for the energy collection device 210 PTO's: operating pressures; routing control of operating pressures distribution to storage/conditioning; and end of stroke limits.

In operation, paravane 100a functions as a wave energy mechanical interface. When paravane 100a is horizontally positioned and vertically supported at its center of planar area 214, paravane 100a will transmit applied vertical forces aligned to the vertical support centerline that contains the energy collection device 210 PTO assembly. Paravane 100a transmits harvested wave energy to energy collection device 210.

In the embodiment shown in FIGS. 1-4, the depth adjustable paravane 100a is installed on single, structural column 202. The depth adjustable paravane 100a of FIGS. 1-4 is omni-directional, including rotation about support structure 200a, as well as pitch and roll. As such, depth adjustable paravane 100a is configured to harvest singular or multiple wave swell energy, as well as sea heave energy. In operation, the depth adjustable paravane 100a aligns with a resultant vector of all impacting wave velocities and ocean currents, providing the least hydrodynamic drag to the structural column 202. Paravane 100a extends or retracts to operate in the optimum wave energy range. The embodiment of wave energy converter 1000a shown in FIGS. 1-4 may shed over-abundant wave energy by operating at lower hydraulic cylinder pressures. While operating at lower hydraulic cylinder pressures, average stroke and hydraulic volume increase, such that energy production is continuous.

Surge-Sway Tower

FIGS. 5-10 depict wave energy converter 1000b, and portions thereof, in accordance with certain embodiments of the present disclosure. In FIGS. 5-10, like reference numerals relative to those in FIGS. 1-4 are used to indicate like elements.

Wave energy converter 1000b operates in substantially the same manner as wave energy converter 1000a, with the exception that the first section, structural column 202, of FIGS. 1-4 is replaced with a first section that is a surge-sway tower 202b. In some embodiments, surge-sway tower 202b is an extension of structural tower 202, and coupled therewith.

Surge-sway tower 202b of support structure 200b is an omni-directional cantilever that is operatively coupled to pedestal frame 228. Pedestal frame 228 is fixed relative to the seabed 234, and surge-sway tower 202b is configured to move relative to the seabed 234. As shown, surge-sway tower 202b is operatively coupled to pedestal frame 228 via pivot double gimbal 218a along a midsection of surge-sway tower 202b. Surge-sway tower 202b is also operatively coupled to pedestal frame 228 via hydraulic cylinder 232 and universal joint 230 at a bottom end of surge-sway tower 202b. Hydraulic cylinder 232 may be within a splined cylinder carrier. Hydraulic cylinder 232 is coupled to double gimbal 218b, and double gimbal 218b is coupled to pedestal frame 228. Gimbals 218a and 218b may be the same as or substantially similar gimbal 218, as described with respect to FIGS. 1-4.

Surge-sway tower 202b is configured to absorb wave-surge energy from any direction. Thus, wave energy converter 1000b is configured to harvest both wave heave and surge energy. In operation, the upper portion of surge-sway tower 202b, above gimbal 218a, reacts to prime, omni-directional wave surge energy, and the lower portion of surge-sway tower 202b, below gimbal 218a, operates in diminished wave energy surge.

In some embodiments, surge-sway tower 202b has about a 2:1 mechanical advantage to the hydraulic cylinder 232 PTO. When surge-sway tower 202b is initially, minimally out of alignment with hydraulic cylinder 232, surge-sway tower 202b may have a mechanical advantage to the hydraulic cylinder 232 PTO that is, at least theoretically, infinite. The actual mechanical advantage diminishes as the angular misalignment increases. Surge-sway tower 202b may shed over-abundant surge energy by operating at lower hydraulic cylinder pressures, allowing greater sway and presenting less surface area to the impacting surge energy. While operating a lower pressure, hydraulic volume increases such that energy production may be continuous.

Figure 5:
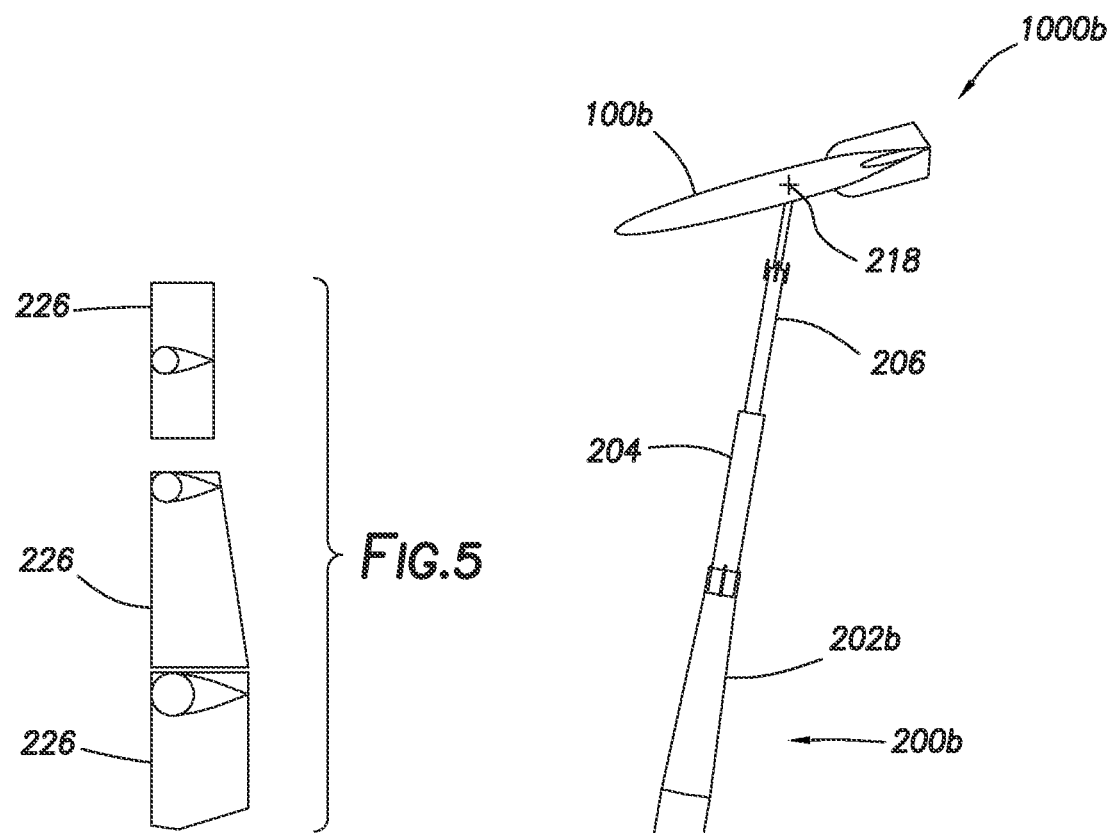
FIG. 5 depicts fairings suitable for use with at least some embodiments of the wave energy converter disclosed herein.
Figure 6:
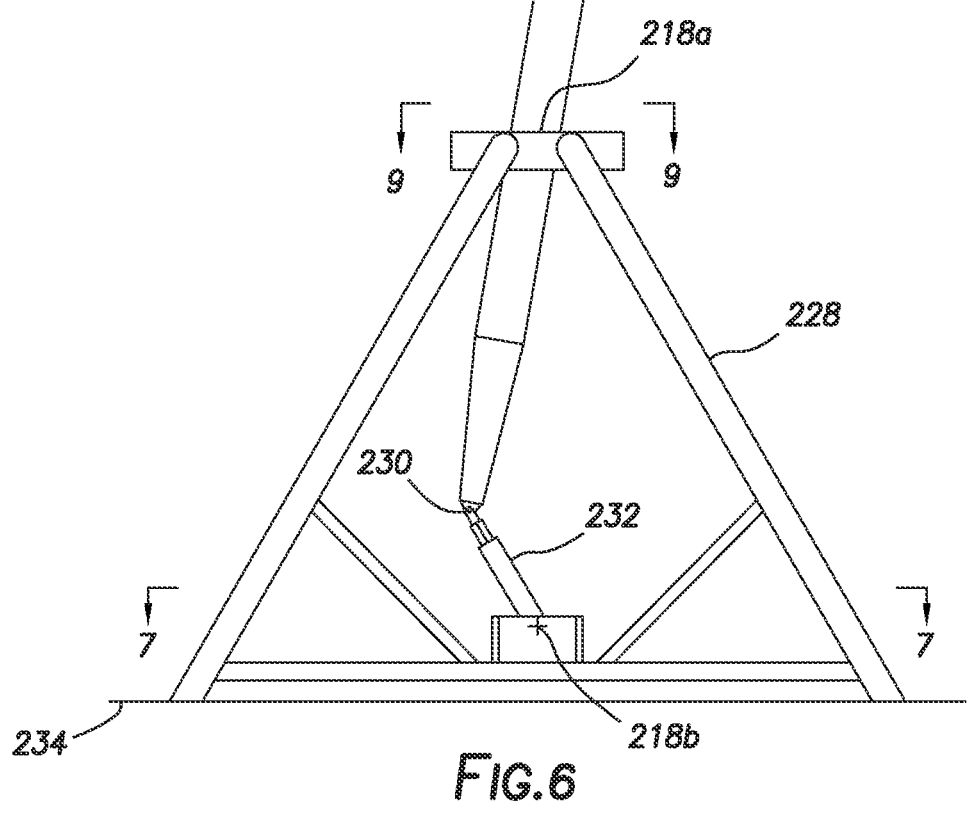
FIG. 6 is a side view of a wave energy converter including a depth adjustable paravane installed on a surge-sway tower.

Self-tending fairings 226, as shown in FIG. 5, may be coupled with surge-sway tower 202b depending upon local conditions, such as if coastwise currents are a detriment to surge energy harvest. Such self-tending fairings 226 may reduce added hydraulic mass, thereby, changing surge energy absorption by reducing inertia. Self-tending fairings 226 may cover structural column 202 or surge-sway tower 202b, for example. Self-tending fairings 226 may be adapted to rotate about structural column 202 or surge-sway tower 202b, when coupled therewith. In some embodiments, self-tending fairings 226 do not cover stroke telescope 206 or operating range telescope 204. Self-tending fairings 226 may also be used, in some embodiments, to assist in the directional control of paravane 100b. In some such embodiments, structural column 202 is configured to rotate with paravane 100b.

Figure 7:
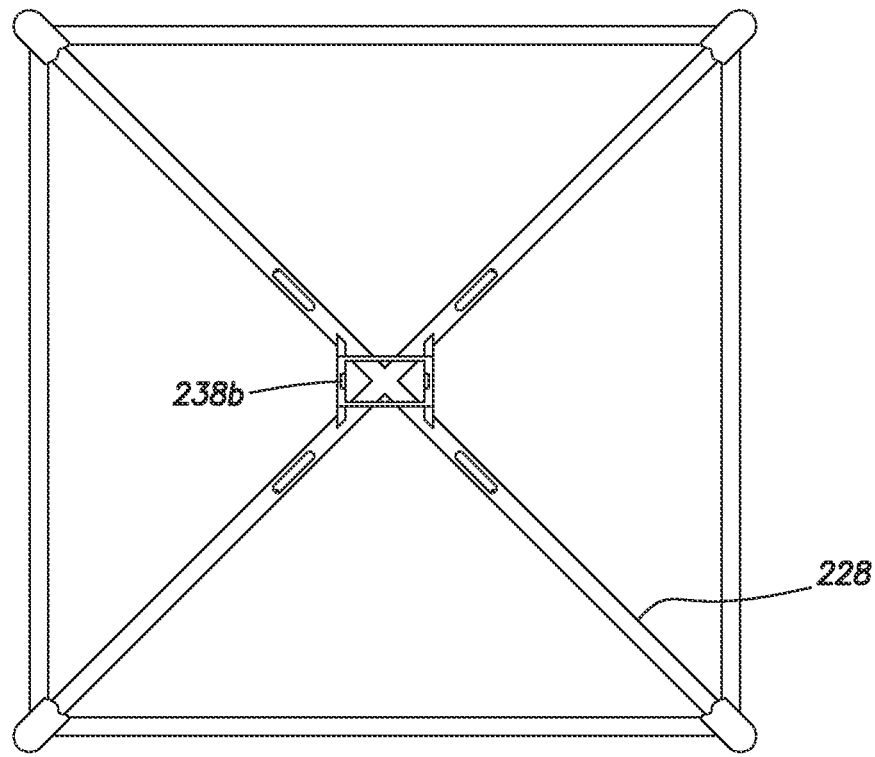
FIG. 7 is a detail view showing bolster keyways along line 7-7 of FIG. 6.
Figure 8A:
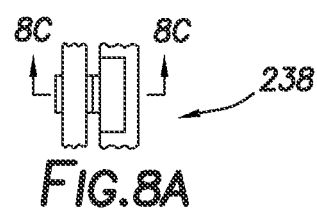
FIG. 8A is a detail, side view of a double-keyway axle bolster.
Figure 8B:
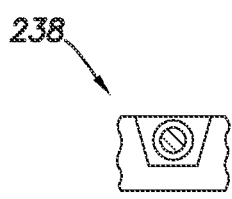
FIG. 8B is a detail, front view of the double-keyway axle bolster of FIG. 8A.
Figure 8C:
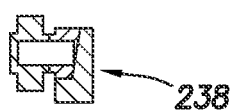
FIG. 8C is a view along line 8C-8C of FIG. 8A.
Figure 9:
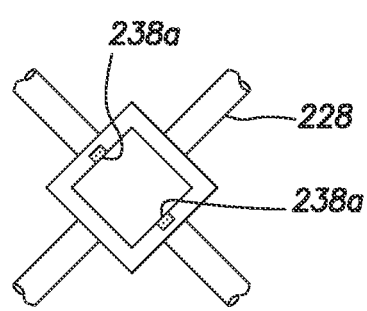
FIG. 9 is a detail view of bolster keyways along line 9-9 of FIG. 6.

Assemblies of axles' bolsters two key ways 238a and 238b are shown for gimbals 218a and 218b in FIGS. 7 and 9, respectively. The non-locking taper of these double key ways 238a and 238b allow ease of removal and an integral 'stabbing guide' for re-installation. FIGS. 8A-8C show one embodiment of the axle bolsters of FIGS. 7 and 9.

In some embodiments of surge-sway tower 202b, air buoyancy tank displacement may be used. For example, wave energy converter 1000b, which, as shown, is designed for an ocean depth of 300 feet, may employ air buoyancy tank displacement at depths from 132 feet to 250 feet. Such air buoyancy tank displacement may be used to: reduce the negative impact of 'wet tank' inertia on wave energy harvest; mitigate weight during installation and retrieval operations; or combinations thereof. While wave energy converter 1000b of FIGS. 5-10 is designed for an ocean depth of 300 feet, those skilled in the art understand that embodiments of such a wave energy converter may be scaled up or down for different ocean depths, as local conditions require.

The paravane 100b of FIG. 10 is similar to the paravane 100a of FIG. 3, but does not include the center tail foil.

Guide Spar

FIGS. 11-20 depict wave energy converter 1000c, and portions thereof, in accordance with certain embodiments of the present disclosure. In FIGS. 11-20, like reference numerals relative to those in FIGS. 1-4 and FIGS. 5-10 are used to indicate like elements.

While paravane 100c of wave energy converter 1000c is similar to paravane 100a and 100b, it is supported on support structure that is or includes guide spar 200c. In one embodiment, guide spar 200c is a portion of a "moored floating structure" or a "fixed offshore platform" 300. Paravane 100c is configured to have the same or similar range of motion as paravane 100a, including a full 360 degree of rotation about support structure 200c and an up to 40-degree pitch and roll. However, in wave energy converter 1000c, hydraulic PTO components of energy collection device 210a are disposed onboard the moored floating structure or fixed offshore platform, and not located subsea, thereby, easing maintenance activities for energy collection device 210a. Paravane 100c may be hauled up, out of the ocean, to an elevation where maintenance may be performed.

The plan area of paravane 100c is a slightly different shape relative to paravanes 100a and 100c. The slight difference is the result of a smaller piece off being truncated off the front than either of the sides.

Wave energy converter 1000c is configured to harvest wave heavy up and wave heave down energy, due, at least in part, to the neutral buoyancy of paravane 100c and all active components of wave energy converter 1000c. Wave energy converter 1000c exhibits at least three operational distinctions relative to wave energy converters 1000a and 1000b, including: (1) all hydraulic PTO components of energy collection device 210a and their control system(s) are disposed in a controlled atmosphere environment above sea level; (2) paravane 100c may be lowered to greater depths than paravanes 100a and 100b, at least in part, because paravane 100c depth controls are not disposed beneath paravane 100c; and (3) minimal or no maintenance vessels or subsea operations are required due to the positioning of equipment.

The up to 40° pitch and roll of paravane 100c is accomplished via pitch wheel 302 and roll ring and azimuth bearing chase assembly 304. Pitch wheel 302 is aligned with the fore and aft centerline of paravane 100c, and includes two roll ring axles 306 and roll ring axel sluice 307. Pitch wheel 302 is centralized by pitch wheel bearing chase and carriage frame 308 within guide spar 200c. In operation, pitch wheel yoke 310 supports roll ring axles 306, and transmits heave forces to the hydraulic PTO of energy collection device 210a via actuator rod 312, which couples with cylinders of energy collection device 210a via actuator rod locking collet 314. While not shown in FIGS. 11-20, wave energy converter 1000c may include elevation controls to control actuator rod 312, thereby, determining the operating range of paravane 100c. In some embodiments, elevation control of actuator rod 312 is the same as or similar to continuous loop chains 323, with pitch wheel bearing chase and carriage frame 308, sphere fairing 325, and paravane 100c selectively decouplable from the loop chains to allow wave energy harvesting. Similar to the operation of wave energy converters 1000a and 1000b, the operating range is determined by the stroke length of actuator rod 312 and associated hydraulic cylinders. Increasing the draft of the operating range reduces exposure of paravane 100c to wave energy.

Roll ring and azimuth bearing chase assembly 304 includes roll ring frame 316, which couples to the two roll ring axles 306. Azimuth bearing chase of roll ring and azimuth bearing chase assembly 304 is coupled (e.g., fastened) to the structural frame of paravane 100c. In operation, horizontal loads are transmitted from the roll ring and azimuth bearing chase assembly 304 to roll ring frame 316 via roller bearings. Vertical heave loads up and down via double thrust bearings within roll ring and azimuth bearing chase assembly 304.

Mechanical power transmission to the PTO of energy collection device 210a is achieved via actuator rod 312, which may be constructed of steel pipe, for example. Guide spar 200c, and upper traveling spar frames 320 of guide spar 200c, support the reciprocating action of the actuator rod 312.

Two halves of guide spar 200c are defined by the centerline guide spar sluice 322. Sluice 322 is a gateway that provides structural tracks for pitch wheel 302 pitch wheel bearing chase and carriage frame 308. The structural tracks of sluice 322 are also operatively engaged by upper traveling spar frames 320, lower traveling spar frame 321, and sluice 322 gates. Pitch wheel bearing chase and carriage frame 308, upper traveling spar frames 320, lower traveling spar frame 321, and sluice 322 gates tie the two halves of the guide spar 200c together to form a singular column structure. Section 301 is open to the sea, and the vertical height thereof matches the stroke length of hydraulic cylinders 303. As shown, each of the twelve hydraulic cylinders 303 of energy collection device 210b are extended, and paravane 100c is at apogee.

In operation, the optimum orientation of sluice 322 in guide spar 200c to the local spectrum of wave energies may be determined. The alignment of the bow of paravane 100c and sluice 322 is not necessarily indicative of the optimum orientation of sluice 322 in guide spar 200c. The orientation of the bow of paravane 100c to sluice 322 determines the naming convention such that, if the orientation is rotated by 90°, pitch wheel 302 becomes a roll wheel; and the roll ring of roll ring and azimuth bearing chase assembly 304 becomes a pitch ring. Regardless of name, pitch wheel 302 and roll ring of roll ring and azimuth bearing chase assembly 304 jointly and alternately provide pitch and roll capabilities to paravane 100c.

The deployment and elevation of the upper traveling spar frames 320, lower traveling spar frames 321, and sluice 322 gates is controlled by continuous loop chains 323 coupled therewith, which provide simultaneous down-haul and up-haul.

Figure 20:
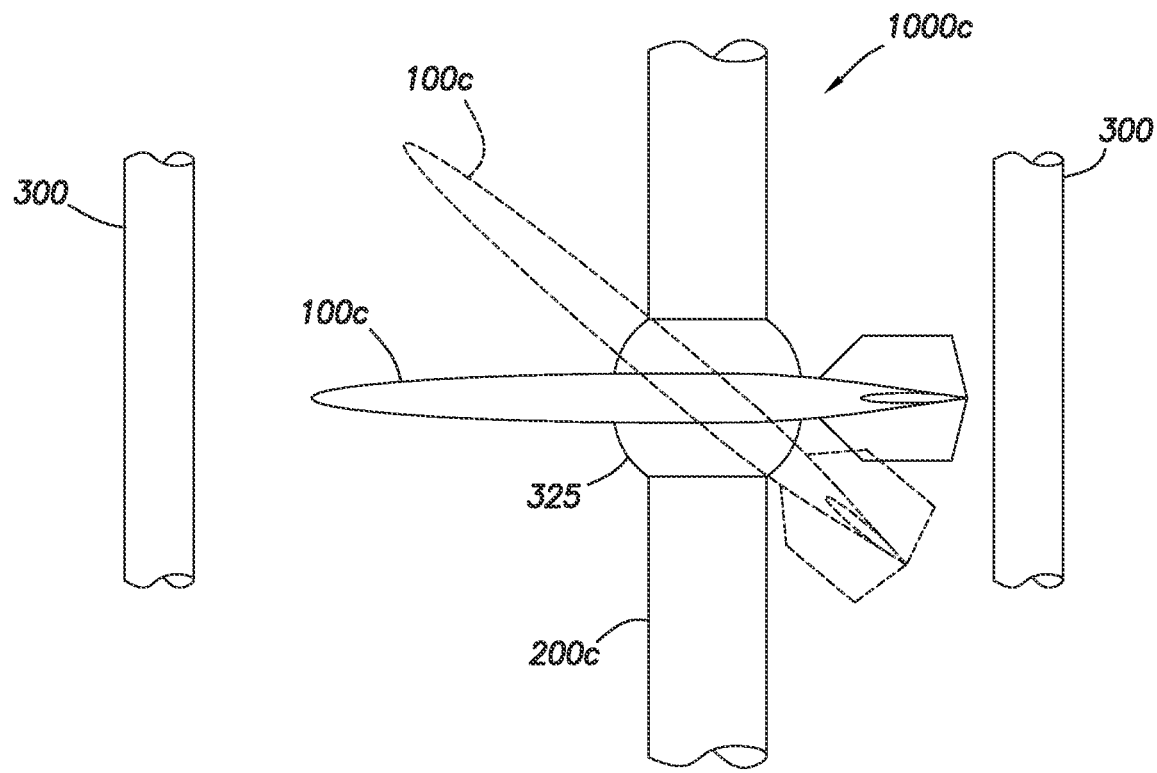
FIG. 20 is a port elevation view of a portion of the wave energy converter of FIG. 18, showing that 40° of pitch and 40° of roll is achieved by the pitch wheel and roll ring assembly.

Pitch wheel bearing chase and carriage frame 308 supports sphere fairing 325. In operation, pitch wheel bearing chase and carriage frame 308, sphere fairing 325, and paravane 100c reciprocate together in response to wave energy heave. In FIG. 20, the solid line paravane 100c is shown disposed at a 0-degree pitch, and the dashed line paravane 100c is shown disposed at a 40-degree pitch.

Attributes of Depth Adjustable Paravane and Power Take Off Arrangements

In certain embodiments, the depth adjustable paravanes 100a-100c and PTO arrangements of the energy collection devices 210, 210a are characterized by one or more of the following attributes: (1) minimization of weight and horizontal load on supporting structures 200a-200c due, at least in part, to neutral buoyancy and the hydrodynamic form plan shape of paravanes 100a-100c; (2) optimum vertical alignment to the PTO assembly(s) of energy collection devices 210, 210a; (3) the neutral buoyant mechanical interfaces of paravanes 100a-100c reacting equally to wave heave down and wave heave-up, allowing greater utilization of double-acting PTO assembly(s); (4) the ability to operate efficiently in vigorous, high-energy wave conditions due, at least in part, to the stable hydrodynamic form of paravanes 100a-100c; and (5) the ability to retract from increasing wave energy near the surface by increasing depth, thereby, allowing for continued energy harvesting at ideal, design optimized energy levels without shutting-down and entering into a "survival mode."

Neutral Buoyancy

The mechanical interface active components (i.e., components that react to heave motion) of wave energy converters 1000a-1000c may include, but are not necessarily limited to: paravanes 100a-100c; double gimbal 218; spindle 220; rod 211; cylinder 213; and the stroke telescope 206. In a preferred embodiment, the displacement (volume) of paravanes 100a-100c is configured to net neutral buoyancy of the total weight of all active components, including the structural weight of the paravane. Neutral buoyancy allows for greater utilization of a double-acting PTO of the energy collection device to both wave heave up and wave heave down, equally. In contrast, buoy type WECs are only configured to drive cylinder in one direction, consuming harvested power to return the cylinder in the opposite direction. Neutral buoyancy of the paravanes disclosed herein reduces or eliminate side loading on the wave energy converters, such as side loading on the support structures thereof. As such, the neutrally buoyant paravanes may only or substantially only react to heave up and heave down forces.

Method of Harvesting Water Wave Energy

Certain embodiments of the present disclosure provide for a method of harvesting water wave energy. The method may be implemented using a wave energy converter as described herein, such as any of wave energy converters 1000a-1000c. The method may be used in conjunction with the methods of controlling PTOs as disclosed herein.

The method includes positioning a paravane within water to be impacted by water waves. For example, the paravane may be positioned close to SWL, such that at least some wave mass and/or water particles in motion are positioned above the paravane to provide 'heave down' forces on the paravane. Impact of the paravane by water waves transfers water wave energy to the paravane.

The method includes transferring water wave energy from the paravane to the energy collection device. For example, in response to impact with water waves, the paravane moves. Movement of the paravane may, in-turn, transfer energy to the energy collection device, such as via extension and retraction of the stroke telescope or actuator rod coupled to the energy collection device.

The method may include storing the transferred wave energy in the energy collection device. For example, and without limitation, the energy may be stored as hydraulic energy, pneumatic energy, electrical energy, or combinations thereof.

The method may include raising or lowering the paravane relative to a mean sea level. For example, and without limitation, the depth of the paravane relative to the mean sea level may adjusted in response to changes in the mean sea level, changes in the force of impact imparted from the water waves to the paravane, changes in a desired level of energy to be harvested from the water waves, or combinations thereof. In embodiments in which wave energy converter 1000a or 1000b is used in the method, raising the paravane includes extending the operating range telescope, and lowering the paravane includes retracting the operating range telescope.

In the method, the paravane self-aligns with the prevailing flow, or to the resultant vector of multiple flows, of water. Alignment of the paravane with the water flow is achieved via rotation of the paravane about the support structure, e.g., a gimbal joint 218.

PTO Control

Some embodiments of the present disclosure include systems and methods of controlling the PTO of a WEC. The systems and methods of controlling the PTO may be used with any of the WECs disclosed herein, including those shown and described in relation to FIGS. 1-20. However, the systems and methods of controlling the PTO are not limited to being used with the WECs shown and described in relation to FIGS. 1-20. In some embodiments, the PTO is controlled to regulate and/or maximize the amount of electricity produced by the WEC, to maintain the mechanical interface (e.g., paravane) in phase with the waves, or combinations thereof. While the systems and methods disclosed herein are described in relation to controlling the PTO of a WEC, the systems and methods disclosed herein are not limited to this particular application, and may be used in other applications.

PTO Control—Determining Forces

In some embodiments, the systems and methods disclosed herein include determining the hydraulic forces from water (wave forces, heave-up forces, heave-down forces) that are exerted on a mechanical interface that is installed at a location where the waves are present. As used herein, a "mechanical interface" is a structure that is mechanically responsive to hydraulic forces imparted thereon, such that at least a portion of the mechanical interface moves in response to the hydraulic forces imparted thereon. While the examples in the present disclosure include mechanical interfaces that are paravanes that move upward and downward in response to heave-up and heave-down forces, the systems and methods disclosed herein are not limited to use with the paravanes disclosed herein.

The systems and methods disclosed herein include determining the force of the moving mechanical interface. For example, in embodiments where in the mechanical interface is a paravane coupled with a stroke telescope such that the paravane and stroke telescope move (stroke) in response to hydraulic forces imparted thereon, the determination the force of the moving mechanical interface can include determining the stroke forces of the paravane and/or the stroke telescope.

The systems and methods disclosed herein include determining and controlling the energy transmitted through a PTO (e.g., a hydraulic transmission) of the WEC as a result of the force of the moving mechanical interface (e.g., the stroke force).

The systems and methods disclosed herein include determining the energy generated by the WEC as a result of the energy transmitted through the PTO of the WEC to the generators.

PTO Control—Modifying the Airy Wave Theory

Determining wave forces can include analyzing the waves using Airy wave theory. As would be understood by one skilled in the art, Airy wave theory (also referred to as linear wave theory) involves generating a linearized description of the propagation of gravity waves on the surface of a homogeneous fluid layer. In some such embodiments, prior to analyzing the waves using Airy wave theory, the method includes modifying the Airy wave theory.

Figure 21:
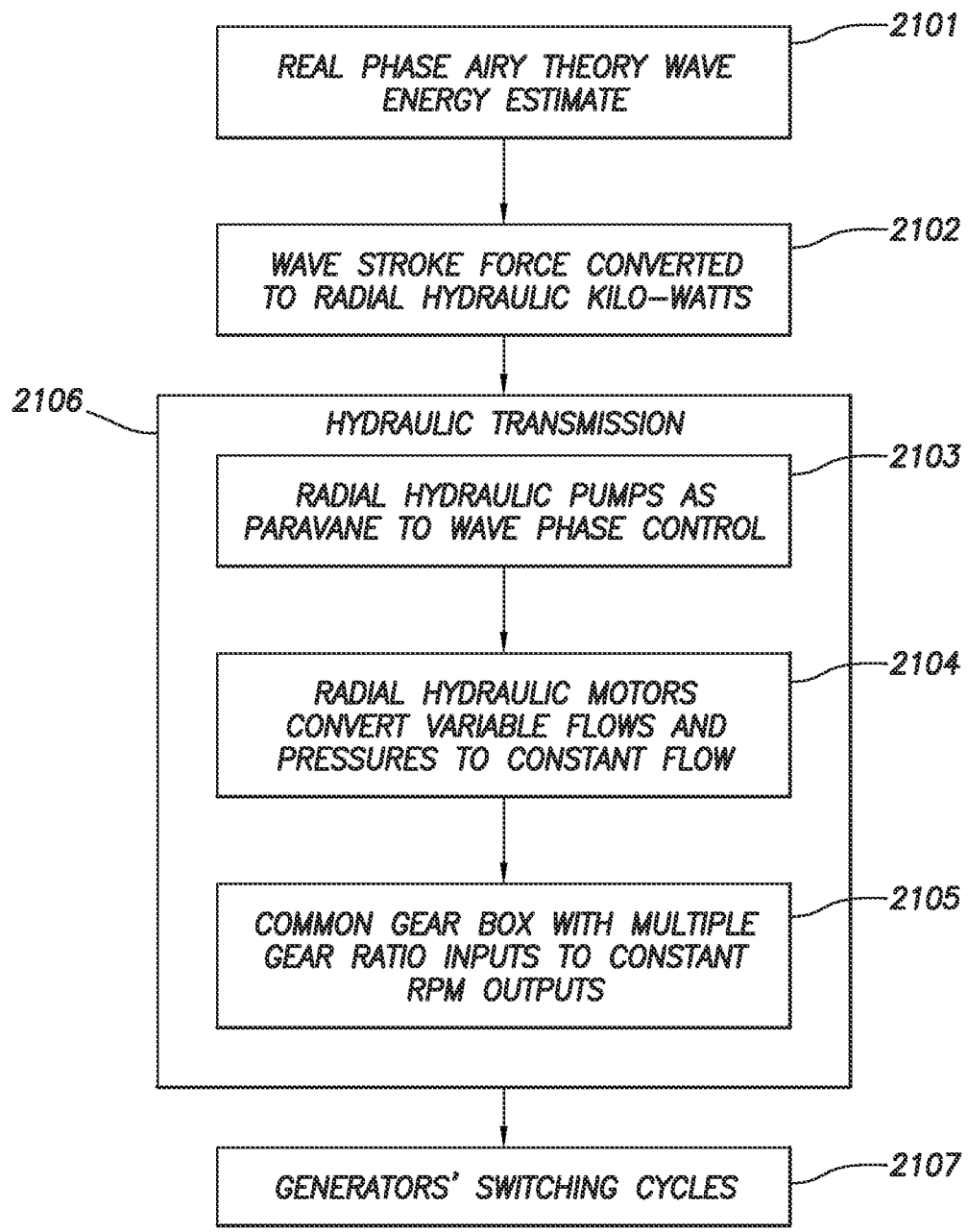
FIG. 21 is a flow chart of a method for analyzing wave energy and controlling the transmission of that energy through a PTO of a WEC.
Figure 22A:
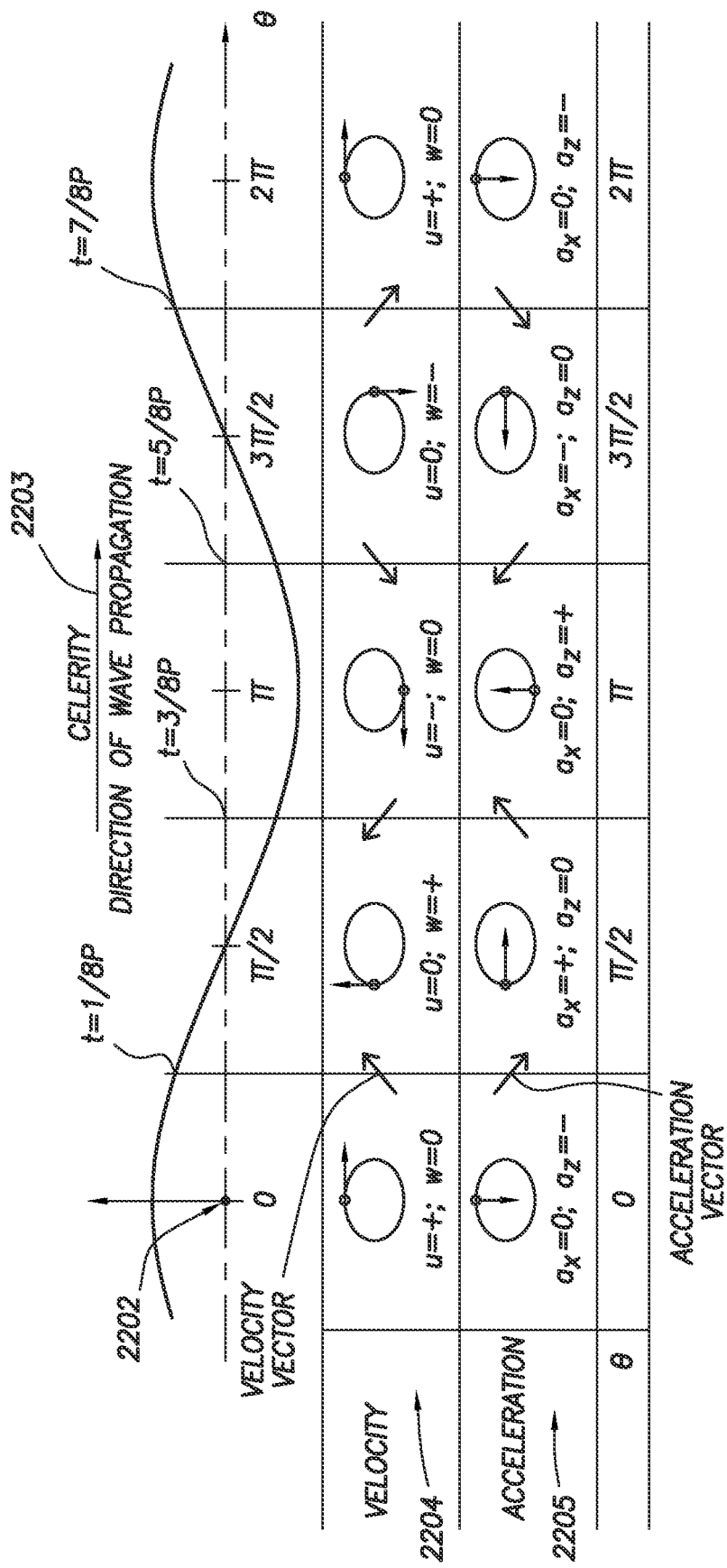
FIG. 22A is an Airy wave theory graph.

With reference to FIG. 21, some embodiments include modifying the Airy wave theory to form a "real-phase" Airy wave theory energy estimate 2101, which can be used to analyze the wave conditions and inform the operation of the WEC systems disclosed herein. FIG. 22A is an exemplary "standard" Airy wave theory graph showing particle velocity 2204 and particle acceleration 2205 for particles of the wave over a full wave cycle beginning at the top of the crest 2202 of a wave and continuing to the top of a subsequent crest along the direction of wave propagation 2203.

Figure 22B:
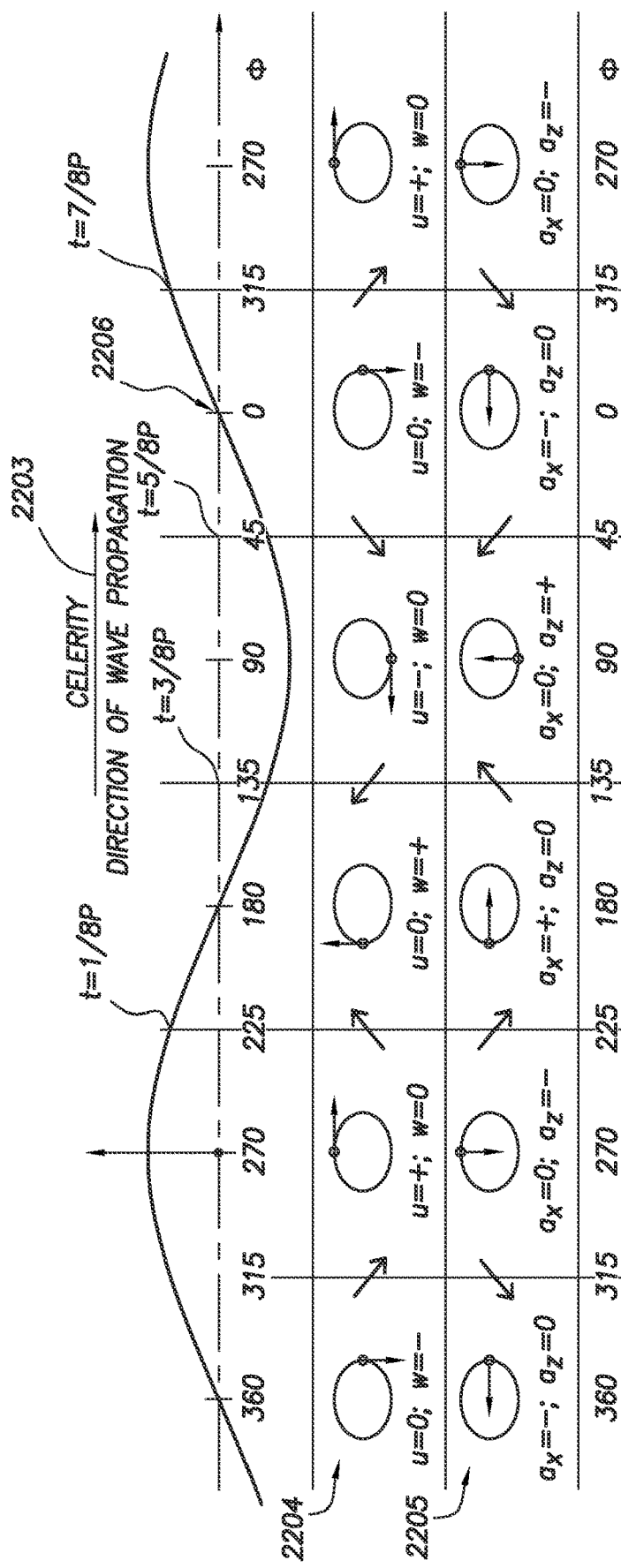
FIG. 22B is an Airy wave theory graph modified, relative to FIG. 22A, such that the beginning of the wave phase is at the beginning of a trough of the wave.

With references to FIGS. 21 and 22B, in some embodiments, modifying the Airy wave theory to form a real-phase Airy wave theory energy estimate 2101 includes resetting the beginning of the wave phase at the beginning of a trough 2206, rather than at the top of the crest 2202. As troughs precede crests, resetting the phase, as shown in the modified graph of FIG. 22B, allows the control logic disclosed herein to reflect real wave phase conditions.

In some embodiments, modifying Airy wave theory to form a real-phase Airy wave theory energy estimate 2101 also includes reorienting the direction of propagation of the wave phase plot to a "left/right" plotting direction. That is, in FIG. 22B the wave period is shown as moving from 360° to 0°. Whereas, in the further modified graph of FIG. 22C, the direction of the wave period propagation is reversed such that the wave period is shown as moving from 0° to 360°, from left to right on the graph. This modification provides a graph that reflects conventional graph directionality. With the reorientation shown in FIG. 22C, the direction of wave propagation 2207 is opposite than is shown in FIGS. 22A and 22B. Thus, using Air wave theory, or the modified version of Airy wave theory (also referred to herein as "real phase Airy wave theory"), the systems and methods disclosed herein are used to estimate the wave energy of the waves at the location where the mechanical interface is installed. The estimate the wave energy can include wave particle velocity, wave particle acceleration, and, ultimately, wave particle forces (including forces normal to the top surface of the paravane).

The modified Airy wave theory disclosed herein may be used in applications other than analyzing energy propagation through a WEC system. Also, wave analysis methods other than Airy wave theory may be used and/or modified to determine wave forces.

The real-phase Airy wave theory energy estimate, as determined in accordance with the real-phase Airy wave theory, can then be used to estimate the wave forces applied to the mechanical interface. That is, the real-phase Airy theory wave energy estimate 2101 can be used to determine and/or estimate wave stroke force on the mechanical interface. The forces from the wave exerted onto the mechanical interface will vary depending on specifications of the mechanical interface (e.g., the size and shape of a paravane) and other variables (e.g., the depth of a paravane below SWL).

PTO Control—Data, Variables, and Calculations

With reference to Tables 1-9, calculations and data used in determining mean wave, normal stroke forces on the mechanical interface, and other data will now be described. Table 1 shows specifications and variables used as input data in the calculations used in determining mean wave, normal stroke forces on a paravane.

TABLE 1

| Specifications and Variables | |
|---|---|
| Specifications and Variables | Symbol |
| Paravane planar area (m$^2$) | PARA.area |
| Equilateral triangle sided (m) | TRI.sided |
| Density of Sea Water (kg/m$^3$) | p |
| Triangular plate added mass | C.m.tri.plate |
| Use Coefficient of Drag for Thin Flat Plate | C.d |
| Paravane volume (m$^3$) | ~ |
| Paravane mass (kg) | PARA.mass |
| Acceleration due to Gravity (m/s$^2$) | g |
| Maximum pitch/roll (degrees, °) per phase ($\Phi$) | P.R.$\Phi$ |
| Pitch/Roll increment (degrees, °) per phase ($\Phi$) | ~ |
| Wave height (m) | H |
| Amplitude (½ height) | a |
| Maximum stroke (m), % of wave height | ~ |
| Wave period (s) | T |
| Seconds per 1° phase increment | ~ |
| Wave length (m) | L |
| Ocean depth (m) | d |
| Wave speed (celerity, transitional, m/s) | c |
| Radian Frequency (1/s) | w |
| Airy Rotary Angles ($\Theta$) per phase ($\Phi$) | $\Theta, \Phi$ |

Table 2 depicts other variables relevant to the calculations used in determining mean wave, normal stroke forces on the paravane will now be described.

TABLE 2

| Particle Variables | |
|---|---|
| Symbol | Description |
| $\Phi.\Theta$ | Replaces Airy Phase Angle expression (2px/L-2pt/T) |
| z.$\Phi$ | Water Particle Depth, meters (m) @ Phase $\Phi$ |
| P.R.$\Phi$ | Pitch/Roll Angle $\Theta$ [−CCW, +CW] @ Phase $\Phi$ |

TABLE 2-continued

| Particle Variables | |
|---|---|
| Symbol | Description |
| W.$\Theta.\Phi$ | Particle Heave Velocity Rotary Angle $\Theta$ @ Phase $\Phi$ |
| U.$\Theta.\Phi$ | Particle Surge Velocity Rotary Angle $\Theta$ @ Phase $\Phi$ |
| A.z.$\Theta.\Phi$ | Particle Heave Acceleration Rotary Angle $\Theta$ @ Phase $\Phi$ |
| A.x.$\Theta.\Phi$ | Particle Surge Acceleration Rotary Angle $\Theta$ @ Phase $\Phi$ |

Table 3 depicts additional variables relevant to the calculations used in determining mean wave, normal stroke forces on the paravane will now be described.

TABLE 3

| Stroke Variables | | |
|---|---|---|
| Description | Symbol | Unit |
| Heave Velocity Stroke | w.V.$\Phi$ | m/s |
| Heave Acceleration Stroke | a.A.$\Phi$ | m/s$^2$ |
| Surge as Heave Velocity Stroke | u.SaH.V.$\Phi$ | m/s |
| Surge as Heave Acceleration Stroke | a.x.SaH.A.$\Phi$ | m/s$^2$ |

Table 4 depicts Airy Wave Theory variables relevant to the calculations used in determining mean wave, normal stroke forces on the paravane will now be described.

TABLE 4

| Airy Wave Theory Variables | | |
|---|---|---|
| Symbol | Description | Unit |
| w | Heave Velocity (+/−z) | m/s |
| a.z | Heave Acceleration (+/−z) | m/s$^2$ |
| u | Surge Velocity (+/−x) | m/s |
| a.x | Surge Acceleration (+/−x) | m/s$^2$ |

Table 5 depicts Airy Wave Theory equations relevant to the calculations used in determining mean wave, normal stroke forces on the paravane will now be described.

TABLE 5

| Airy Wave Theory Equations | |
|---|---|
| Description | Equation |
| Heave Velocity (+/−z) | $=-(H/2)*((g*T)/L)*(SINH((2*3.14*(z+d))/L))/COSH((2*3.14*d)/L)*SIN(\Phi.\Theta)$ |
| Heave Acceleration (+/−z) | $=-((-g*3.14*H)/L)*(SINH((2*3.14*(z+d))/L))/COSH((2*3.14*d)/L)*COS(\Phi.\Theta)$ |
| Surge Velocity (+/−x) | $=-(H/2)*((g*T)/L)*(COSH((2*3.14*(z+d))/L))/COSH((2*3.14*d)/L)*COS(\Phi.\Theta)$ |
| Surge Acceleration (+/−x) | $=-((g*3.14*H)/L)*(COSH((2*3.14*(z+d))/L))/COSH((2*3.14*d)/L)*SIN(\Phi.\Theta)$ |

The use of the specifications, variables, and equations of Tables 1-5 is more readily understood in view of the exemplary calculations and results shown in Tables 6A-6D. The exemplary calculations and results are presented in multiple separate tables (Tables 6A-6D) for the purpose of clarity, but could be presented in a single table, as is shown in FIGS. 32A-32I of incorporated U.S. Provisional Patent Application No. 63/209,030 (the '030 application).

TABLE 6A

Exemplary Calculations and Results

| | Wave Phase ($\Phi$ °)/ Period (sec) Paravane Pitch/Roll (°) | | Particle Position | | Airy Rotary Angles $\Delta$ @ $\theta$ | | Surge as Heave | |
|---|---|---|---|---|---|---|---|---|
| | | | 0.278 | | Heave | | | |
| Row # | $\Phi$ | P.R.$\Phi$ | t | x | z | W.$\theta$.$\Phi$ | A.z.$\theta$.$\Phi$ | U.$\theta$.$\Phi$ | A.x.$\theta$.$\Phi$ |
| 1 | 0 | −5.000 | 0.000 | 0 | −3.0000 | 180 | 270 | 180 | 270 |
| 2 | 45 | −2.500 | 1.000 | 12.490 | −3.5655 | 225 | 315 | 225 | 315 |
| 3 | 90 | 0.000 | 2.000 | 24.980 | −3.8000 | 270 | 0 | 270 | 0 |
| 4 | 135 | 2.500 | 3.000 | 37.470 | −3.5664 | 315 | 45 | 315 | 45 |
| 5 | 180 | 5.000 | 4.000 | 49.961 | −3.0013 | 0 | 90 | 0 | 90 |
| 6 | 225 | 2.500 | 5.000 | 62.451 | −2.4354 | 45 | 135 | 45 | 135 |
| 7 | 270 | 0.0000 | 6.000 | 74.941 | −2.2000 | 90 | 180 | 90 | 180 |
| 8 | 315 | −2.500 | 7.000 | 87.431 | −2.4327 | 135 | 225 | 135 | 225 |
| 9 | 360 | −5.000 | 8.000 | 99.921 | −2.9975 | 180 | 270 | 180 | 270 |

TABLE 6B

Exemplary Calculations and Results - Continued

Velocities & Stroke Forces

| | Surge | | Heave | | |
|---|---|---|---|---|---|
| Row # | u.$\Theta$ | u.SaH.V.$\Phi$ | w.$\Phi$ | w.V.$\Phi$ | w.V.Ttl.$\Phi$ |
| 1 | −0.5205 | −0.5165 | 0.0000 | 0.0000 | −0.517 |
| 2 | −0.3552 | −0.2397 | −0.3546 | −0.2394 | −0.479 |
| 3 | 0.0000 | 0.0000 | 0.4942 | 0.0000 | 0.4942 |
| 4 | −0.3552 | 0.2397 | 0.3546 | 0.2393 | 0.479 |
| 5 | 0.5204 | 0.5165 | 0.0000 | 0.0000 | 0.5165 |
| 6 | 0.3813 | 0.2809 | 0.3808 | 0.2805 | 0.561 |
| 7 | 0.0000 | −2.8493E−32 | −0.5465 | −3.35E−17 | −3.35E−17 |
| 8 | 0.3814 | −0.2574 | −0.3808 | −0.2805 | −0.538 |
| 9 | 0.5206 | −0.5166 | 0.0000 | 0.0000 | −0.517 |

TABLE 6C

Exemplary Calculations and Results - Continued

Accelerations & Stroke Forces

| | Surge | | Heave | | |
|---|---|---|---|---|---|
| Row # | a.x.$\Phi$ | a.x.SaH.A.$\Phi$ | a.z.$\Phi$ | a.A.$\Phi$ | a.A.$\Phi$.Ttl |
| 1 | 0.0000 | 0.0000 | 0.4080 | 0.0354 | 0.035 |
| 2 | −0.2788 | 0.2054 | 0.2784 | 0.2050 | 0.410 |
| 3 | 0.3886 | 0.3886 | 0.0000 | −2.38E−17 | 0.389 |
| 4 | 0.2788 | 0.2054 | 0.2784 | 0.2050 | 0.410 |
| 5 | 0.0000 | 0.0000 | −0.4079 | 0.0354 | 0.035 |
| 6 | 0.2993 | −0.2020 | −0.2989 | −0.2017 | −0.404 |
| 7 | −0.4296 | −0.4296 | 0.0000 | 7.8842E−17 | −0.430 |
| 8 | −0.2994 | −0.2205 | −0.2990 | −0.2018 | −0.422 |
| 9 | 0.0000 | 0.0000 | −0.4080 | 0.0354 | 0.035 |

TABLE 6D

Exemplary Calculations and Results - Continued

Force.Ttl.$\Phi$ (N)

| Row # | SWL+/− | Stroke+/− |
|---|---|---|
| 1 | −2.04E+06 | −2.04E+06 |
| 2 | −2.55E+07 | −2.55E+07 |
| 3 | −2.45E+07 | −2.45E+07 |

TABLE 6D-continued

Exemplary Calculations and Results - Continued

Force.Ttl.$\Phi$ (N)

| Row # | SWL+/− | Stroke+/− |
|---|---|---|
| 4 | −2.58E+07 | −2.58E+07 |
| 5 | −2.39E+06 | −2.39E+06 |
| 6 | 2.51E+07 | 2.51E+07 |
| 7 | 2.69E+07 | 2.69E+07 |
| 8 | 2.66E+07 | 2.66E+07 |
| 9 | −2.04E+06 | −2.04E+06 |

Within Tables 6A-6D, each row number in one table corresponds with the same row number in the other tables. For example, the values shown in Row #5 in Table 6A correspond with the values shown in Row #5 in Tables 6B, 6C, and 6D. The values shown in Tables 6A-6D are for an exemplary, discrete selection of points during an exemplary wave phase, including at 0°, 45°, 90°, 135°, 180°, 225°, 270°, 315°, and 360°. However, as is shown in FIGS. 32A-32I of the '030 application, values can be determined for other points in the wave phase, such as for each discrete degree ranging from 0° to 360°, and the particular values determined will vary depending on the particular application.

With reference to Table 6A, the values for the wave phase ($\Phi$), the paravane pitch/roll (P.R. $\Phi$), and the wave period (t) are shown. This data for wave phase ($\Phi$), the paravane pitch/roll (P.R. $\Phi$), and the wave period (t) includes input data from the specifications and variables shown in Table 1, which is determined in accordance with the real-phase Airy wave theory plot shown in FIG. 22C. Table 6A also shows particle position data, with "x" being the horizontal (wave propagation) direction and "z" being the depth relative to the SWL. The depth z below the SWL defines, at least in part, the amount of energy that can be extracted from a wave by the paravane. Table 6A also shows the particle heave velocity angle (W.$\theta$.$\Phi$); the particle heave acceleration angle (A.z.$\theta$.$\Phi$); the particle surge velocity angle (U.$\theta$.$\theta$); and the particle surge acceleration angle (A.x.$\theta$.$\Phi$); each as determined in accordance with the modified, real-phase Airy wave theory plot as shown in FIG. 22C.

Figure 22C:
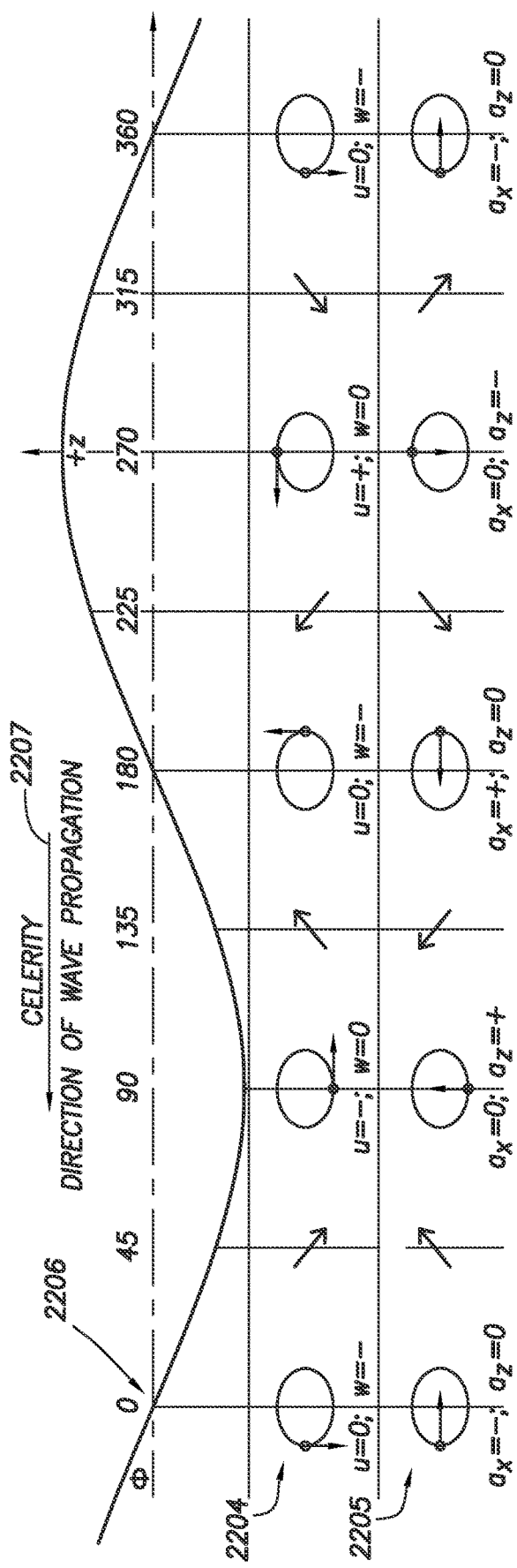
FIG. 22C is an Airy wave theory graph modified, relative to FIG. 22B, such that the wave phase progress from 0° to 360° from left to right on the graph.

Table 6B shows the particle surge velocity magnitude (u.$\theta$) and the particle heave velocity magnitude (w.$\Phi$), each as determined in accordance with the modified, real-phase Airy wave theory plot as shown in FIG. 22C.

Table 6C shows the particle surge acceleration magnitude (a.x.Φ) and the particle heave acceleration magnitude (a.z.Φ), each as determined in accordance with the modified, real-phase Airy wave theory plot as shown in FIG. 22C.

Vector analysis is performed on the particle surge velocity magnitude (u.θ), particle heave velocity magnitude (w.Φ), particle surge acceleration magnitude (a.x.Φ), and particle heave acceleration magnitude (a.z.Φ), each as determined in accordance with the modified, real-phase Airy wave theory plot as shown in FIG. 22C. The vector analysis is graphically illustrated by the vector graph shown in FIGS. 23A-23H. The vector analysis can be performed utilizing the equations shown in FIGS. 33A-34B of the '030 application, and can include using a computing program, such as Mathcad or Excel to perform the associated calculations. The vector analysis is performed to determine: (1) surge-as-heave velocity stroke (u.SaH.V.Φ); (2) heave velocity stroke (w.V.Φ); (3) surge-as-heave acceleration stroke (a.x.SaH.A.Φ); (4) heave acceleration stroke (a.A.Φ); and, ultimately, (5) the total velocity stroke (w.V.Ttl.Φ) and (6) the total acceleration stroke (a.A.Φ.Ttl).

The Morison Equations, shown in Table 7 below, can then be applied to the total velocity stroke (w.V.Ttl.Φ) and total acceleration stroke (a.A.Φ.Ttl) to determine the force totals (Force.Ttl.Φ) shown in Table 6D, which includes subcolumns for force SWL (indicated forces from above and below the SWL) and stroke (positive and negative stroke on the paravane).

TABLE 7

The Morison Equations
Morison Equation Extended - Force Drag and Force Inertia

| | |
|---|---|
| Equation 1 | F.drag.Φ = ((½)*p) * (w.V.Ttl.Φ*ABS(w.V.Ttl.Φ)) * PARA.area * C.d |
| Equation 2 | F.inertia.Φ = (PARA.mass * a.A.Φ.Ttl) + (C.m.tri.plate * a.A.Φ.Ttl) |
| Equation 3 | F.total.Φ = F.drag.Φ + F.inertia.Φ |

Figure 24:
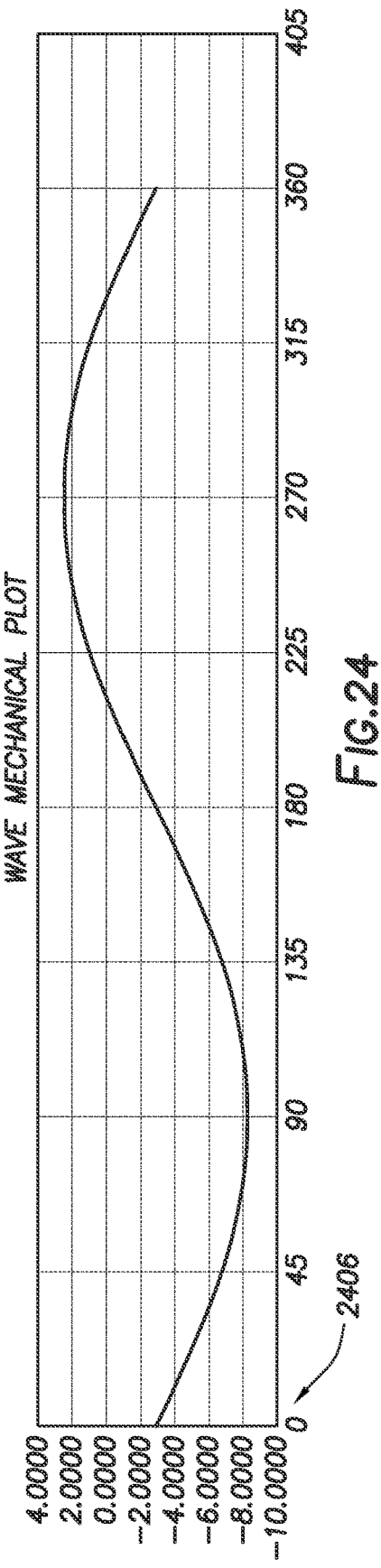
FIG. 24 is a wave mechanical plot of wave particle depths relative to SWL.
Figure 23A:
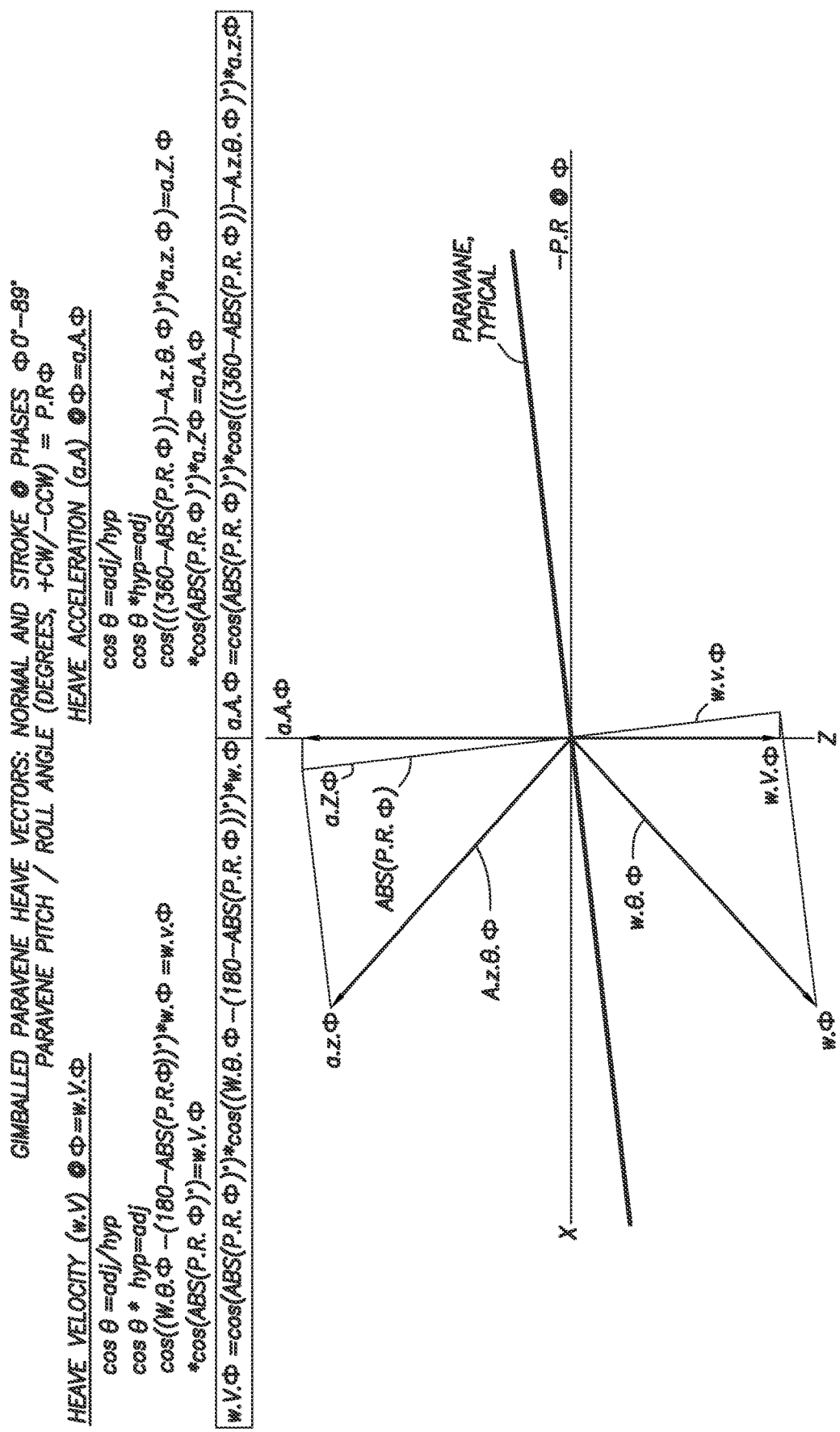
Figure 23B:
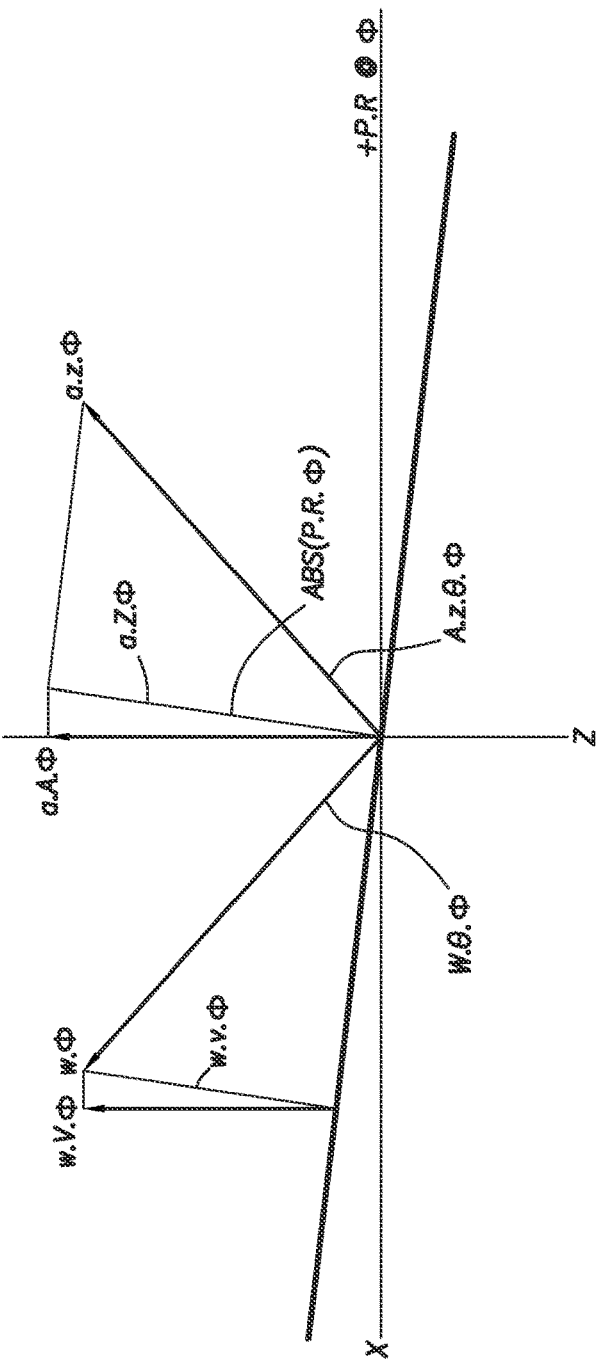
Figure 23D:
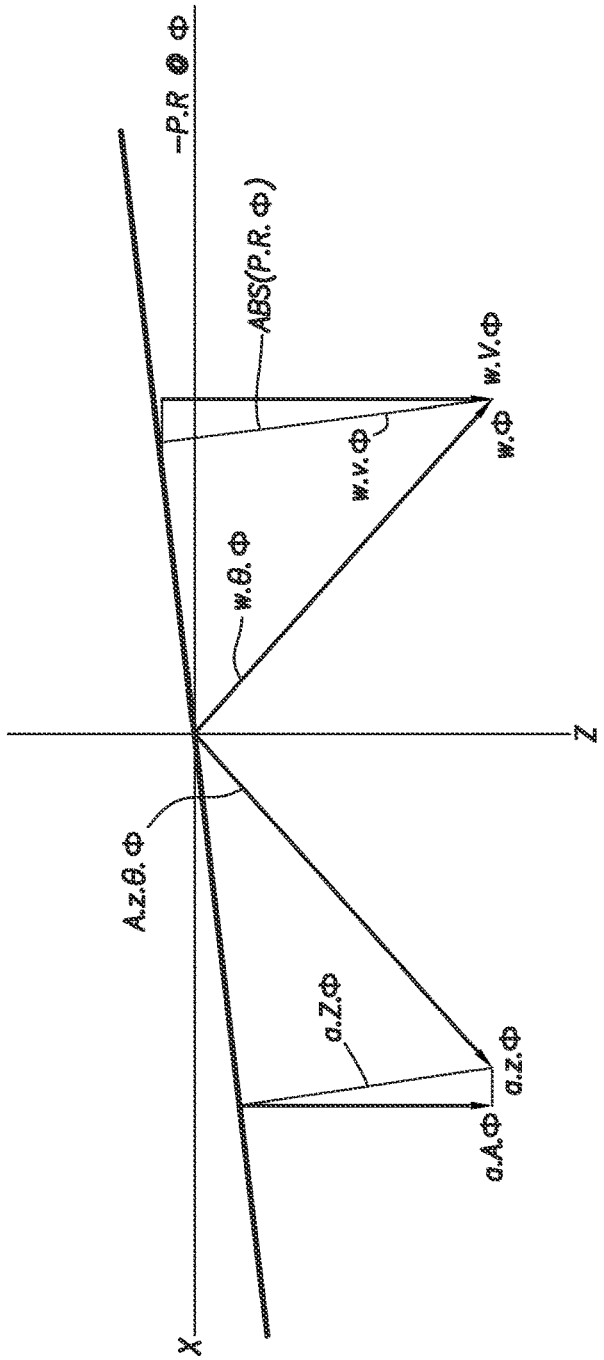
Figure 23F:
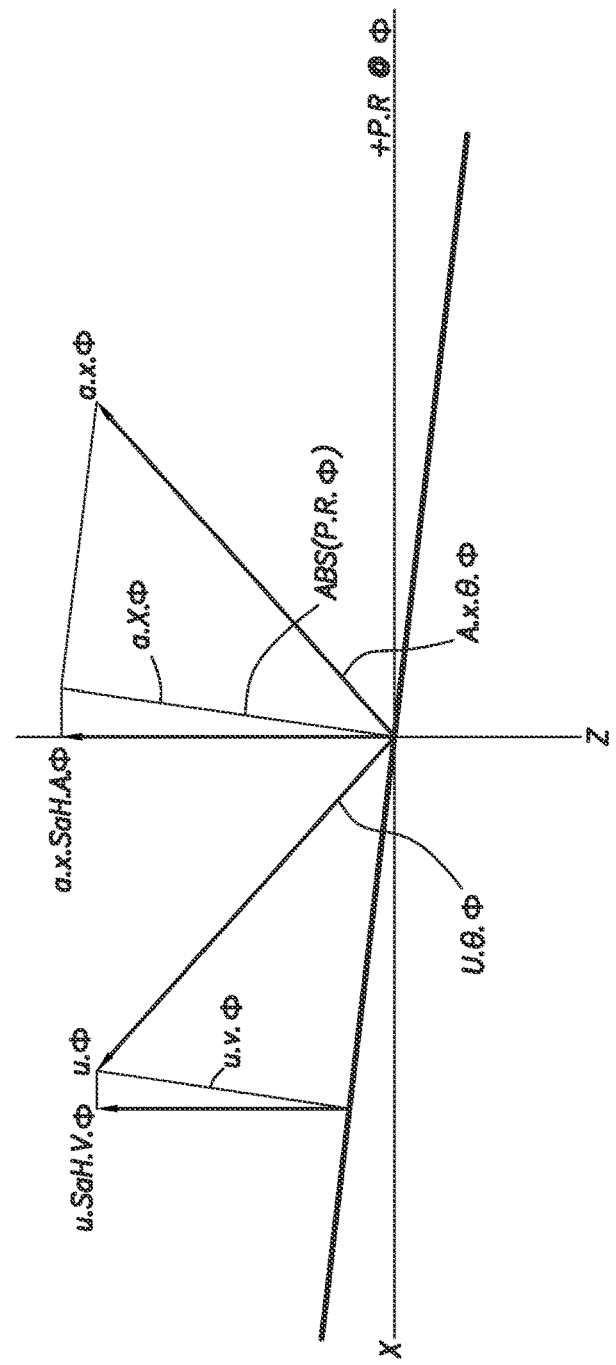
Figure 25A:
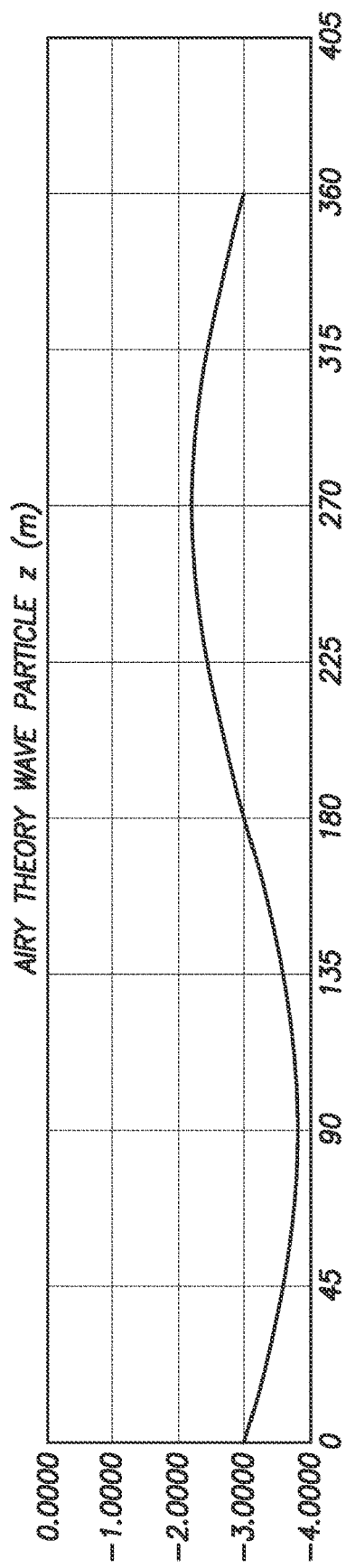
FIGS. 25A-25E depict data associated with the logic control used to control the PTO.
Figure 25B:
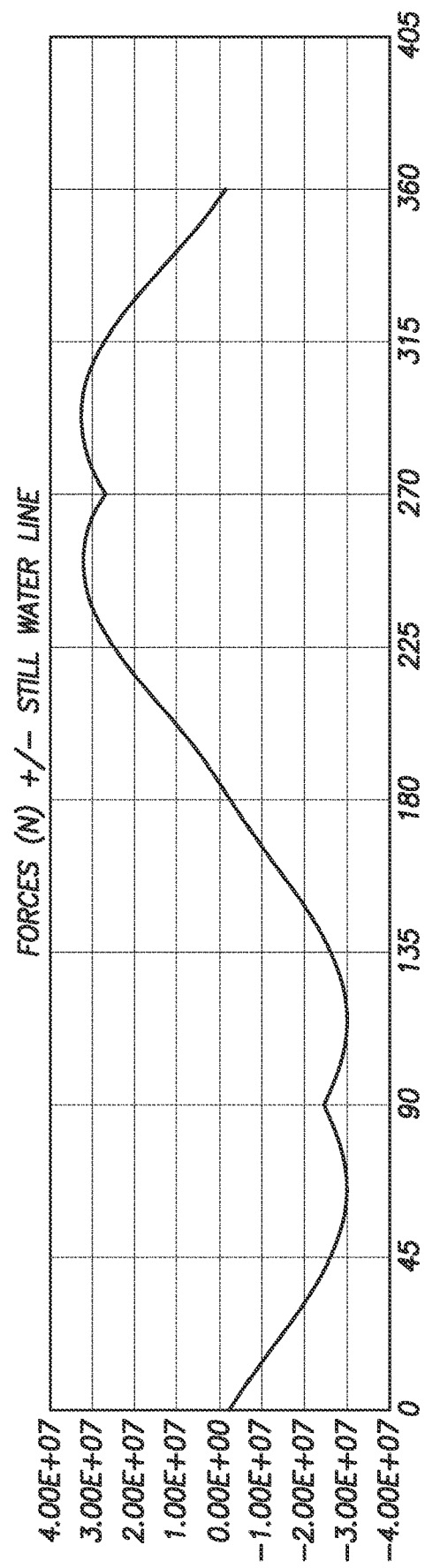
Figure 25C:
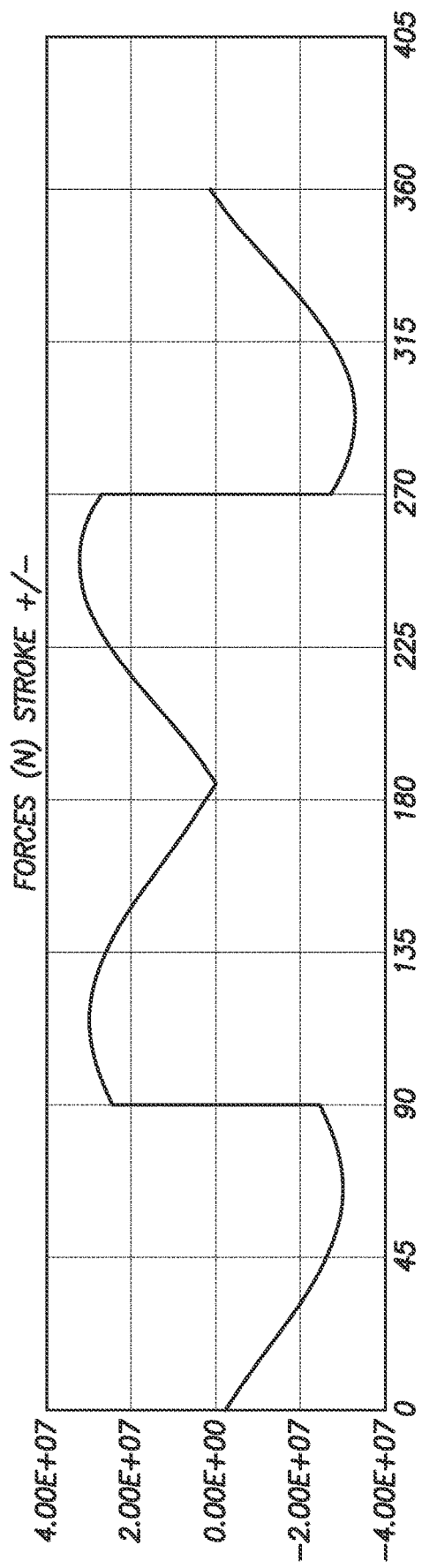

The data for these calculations can include data for each degree of wave phase, from 0° to 360°. Thus, using the real-phase Airy wave theory and the equations and data discussed above, the stroke forces on the paravane and/or stroke telescope (or another mechanical interface) at each degree of wave phase can be determined. From this data, graphs of various data can be generated, including: (1) plots of the wave particle depth, z, as shown in FIG. 24 (which is substantially similar to FIG. 25A) which indicates trough 2406; (2) plots of the SWL forces (FIG. 25B); and (3) plots of the stroke forces (FIG. 25C).

Between the mechanical interface (e.g., paravane and stroke telescope) and generators of the WEC, the systems disclosed herein can include a PTO (e.g., transmission) that operates to transmit the mechanical forces of the moving mechanical interface into the generators for the generation of electricity. In some embodiments, the PTO is a hydraulic transmission that includes hydraulic pumps coupled with the stroke telescope and hydraulic motors coupled with the hydraulic pumps, with the hydraulic motors coupled with the generators. In operation of such embodiments, movement of the stroke telescope drives operation of the hydraulic pumps, operation of the hydraulic pumps drives operation of the hydraulic motors, and operation of the hydraulic motors drives the generators.

PTO Control—Converting Mechanical Force to Kilowatts

With the stroke forces determined, as discussed above, the method of FIG. 21 can include converting the stroke forces to radial hydraulic kilowatts, 2102 (i.e., radial hydraulic kilowatts of the hydraulic motors of the hydraulic transmission of the WEC).

With reference to Tables 8A-8E, calculations and data associated with converting stroke force to radial hydraulic kilowatts is illustrated.

TABLE 8A

Converting Stroke Force to Radial Hydraulic Kilowatts

Stroke Force Continuous 16 × 16 Hydraulic Transmission: 8.2 MW Capacity t.int = 0.0222

| Row # | Φ | t (sec) | (m) | Dist (m) |
|---|---|---|---|---|
| 1 | 0 | 0.000 | −3.0000 | ~ |
| 2 | 45 | 1.000 | 3.5655 | −0.00996 |
| 3 | 90 | 2.000 | −3.8000 | −0.00013 |
| 4 | 135 | 3.000 | −3.5664 | 0.00977 |
| 5 | 180 | 4.000 | −3.0013 | 0.01395 |
| 6 | 225 | 5.000 | −2.4354 | 0.00997 |
| 7 | 270 | 6.000 | −2.2000 | 0.00016 |
| 8 | 315 | 7.000 | −2.4327 | −0.00975 |
| 9 | 360 | 8.000 | −2.9975 | −0.01395 |

TABLE 8B

Converting Stroke Force to Radial Hydraulic Kilowatts- Continued

Stroke Force Continuous 16 × 16 Hydraulic Transmission: 8.2 MW Capacity
Monitor End of Stroke Clearance

| | |
|---|---|
| 9.5076 | Effective Stroke (of 10.0 m total) |
| 0.8480 | Active Stroke (m) |
| 4.3298 | End of Stroke [EoS] clearance (m @ end) |
| 53% | Active Stroke = % Wave Height |

| Row # | [XX %*z.int] ABS (z.int %) | No Stroke ABS (N) | No Stroke Interval (N) | 53% Active Stroke Interval (N) |
|---|---|---|---|---|
| 1 | ~ | 2.0439E+06 | ~ | ~ |
| 2 | 0.00528 | 2.5531E+07 | 2.5338E+07 | 1.1909E+07 |
| 3 | 0.00007 | 2.4470E+07 | 2.4599E+07 | 1.1562E+07 |
| 4 | 0.00518 | 2.5826E+07 | 2.6006E+07 | 1.2223E+07 |
| 5 | 0.00740 | 2.3881E+06 | 2.6210E+06 | 1.2319E+06 |
| 6 | 0.00529 | 2.5059E+07 | 2.4790E+07 | 1.1651E+07 |
| 7 | 0.00008 | 2.6880E+07 | 2.7109E+07 | 1.2741E+07 |
| 8 | 0.00517 | 2.6608E+07 | 2.6851E+07 | 1.2620E+07 |
| 9 | 0.00740 | 2.0442E+06 | 1.7855E+06 | 8.3917E+05 |

TABLE 8C

Converting Stroke Force to Radial Hydraulic Kilowatts- Continued

Stroke Force Continuous 16 × 16 Hydraulic Transmission: 8.2 MW Capacity
Rack

| Row # | (m/s*60 = m/min) Velo.int | m/s² Accel.int |
|---|---|---|
| 1 | ~ | ~ |
| 2 | 14.24923 | 0.40739 |
| 3 | 0.19008 | 0.39191 |
| 4 | 13.98030 | 0.41333 |
| 5 | 19.96908 | 0.03910 |
| 6 | 14.27149 | 0.39952 |
| 7 | 0.22189 | 0.43329 |
| 8 | 13.95757 | 0.42622 |
| 9 | 19.96873 | 0.03134 |

TABLE 8D

Converting Stroke Force to Radial Hydraulic Kilowatts- Continued

Stroke Force Continuous 16 × 16 Hydraulic Transmission: 8.2 MW Capacity
Per Pump

| RpM.Av | Torque.Av | Bar.Av |
|---|---|---|
| 6.78 | 11,626.04 | 221.45 |
| RpM.Max | Torque.Max | Bar.Max |
| 10.60 | 17,880.46 | 340.58 |

Hagglunds Motors as Pumps CBp 840

| Row # | (m/min)/R*2)*3.14 RpM | Per Motor # Motors = 16 N | Force × Radius(m) 0.3 Torque (Nm) | 840.0 Nm/bar Bar | 1 Pump (L/min) 52,800.0 cm³/rpm 1,000.0 cm³/L |
|---|---|---|---|---|---|
| 1 | ~ | ~ | ~ | ~ | ~ |
| 2 | 7.563 | 7.443E+05 | 223,291.366 | 265.823 | 399.341 |
| 3 | 0.101 | 7.226E+05 | 216,779.334 | 258.071 | 5.327 |
| 4 | 7.421 | 7.639E+05 | 229,178.565 | 272.832 | 391.805 |
| 5 | 10.599 | 7.699E+04 | 23,097.288 | 27.497 | 559.643 |
| 6 | 7.575 | 7.282E+05 | 218,459.241 | 260.071 | 399.965 |
| 7 | 0.118 | 7.963E+05 | 238,901.559 | 284.407 | 6.219 |
| 8 | 7.408 | 7.887E+05 | 236,621.907 | 236,621.907 | 391.168 |
| 9 | 10.599 | 5.245E+04 | 15,734.458 | 18.731 | 559.633 |

TABLE 8E

Converting Stroke Force to Radial Hydraulic Kilowatts- Continued

Stroke Force Continuous 16 × 16 Hydraulic Transmission: 8.2 MW Capacity

| GpM.Av | P.Av | |
|---|---|---|
| 1,512.14 | 3,211.00 | |
| GpM.Max | P.Max | kW.Av |
| 2,365.56 | 4,938.41 | 1721.972 |

| Row # | 16 Pumps Convert "L" > "gal" GpM(Q) | Bar * 14.5 = P | P*Q/1714 = HP | 1HP*0.7457 = kW |
|---|---|---|---|---|
| 1 | ~ | ~ | ~ | ~ |
| 2 | 1687.917 | 3854.434 | 3795.780 | 2830.513 |
| 3 | 22.517 | 3742.024 | 49.159 | 36.658 |
| 4 | 1656.061 | 3956.059 | 3822.331 | 2850.312 |
| 5 | 2365.473 | 398.703 | 550.246 | 410.318 |
| 6 | 1690.555 | 3771.023 | 3719.440 | 2773.587 |
| 7 | 26.284 | 4123.896 | 63.240 | 47.158 |
| 8 | 1653.369 | 4084.545 | 3940.057 | 2938.101 |
| 9 | 2365.431 | 271.607 | 374.835 | 279.514 |

Within Tables 8A-8E, each row number in one table corresponds with the same row number in the other tables. For example, the values shown in Row #6 in Table 8A corresponds with the values shown in Row #6 in Tables 8B, 8C, 8D, and 8E. The values shown in Tables 8A-8E are for an exemplary, discrete selection of points during a wave phase, including at 0°, 45°, 90°, 135°, 180°, 225°, 270°, 315°, and 360°. However, as is shown in FIGS. 36A-36H of the '030 application, values can be determined for other points in the wave phase, such as for each discrete degree ranging from 0° to 360°.

The data shown in Tables 8A-8E is for a "16×16 hydraulic transmission." That is, a WEC system that includes sixteen hydraulic pumps coupled with sixteen hydraulically driven motors for transmitting energy from the paravane to generators. However, the system disclosed herein in not limited to this particular exemplary embodiment. The data in Tables 8A-8E includes: (1) wave phase ($\Phi$); (2) wave period (t); (3) depth (z); (4) depth change for the phase interval (z.int); (5) depth change for the phase interval as a % of stroke (ABS(z.int %)); (6) stroke force (ABS(N)); (7) the stroke force for the phase interval (Interval (N)); and (8) the active stroke interval (N). For a given system, the velocity and acceleration of a rack at a certain stroke force can be determined where the rack is the gear rack in the stroke telescope that is meshed with pinion gears of the hydraulic pumps (for driving the hydraulic pumps). In this particular embodiment, the pinion gear has a radius of 0.3 m. Thus, the stroke force on the paravane will provide the rack with a certain velocity, which will in turn drive the hydraulic pumps at a certain rate. Other hydraulic pump and motor data used in determining the kilowatts (kW) output from the motors includes: (1) the RMP; (2) force (N); (3) torque (Nm); (4) pressure (bar); (5) volume of flow per rpm (cm³/rpm); (6) gallons per minute (GpM (Q)); (7) pressure (P); and (8) horse power (HP). Thus, in embodiments of the methods disclosed herein: (1) the wave energy is estimated; (2) the estimated wave energy is then used to estimate the stroke force (or other force of the mechanical interface); (3) the estimated stroke force is then used to estimate the pump operational parameters (or other parameters of the PTO);

and (4) the pump operational parameters are then used to estimate the motor output in kW (or other output of the PTO). These estimations of operational parameters of the components of the PTO, such as pumps and motors, can be used to inform the control of the PTO (e.g., control of the pumps and motors) during operation of the WEC. The particular values for the data in Tables 6A-6D and 8A-8E are exemplary only, as the data will vary depending on the particular application.

Figure 25D:
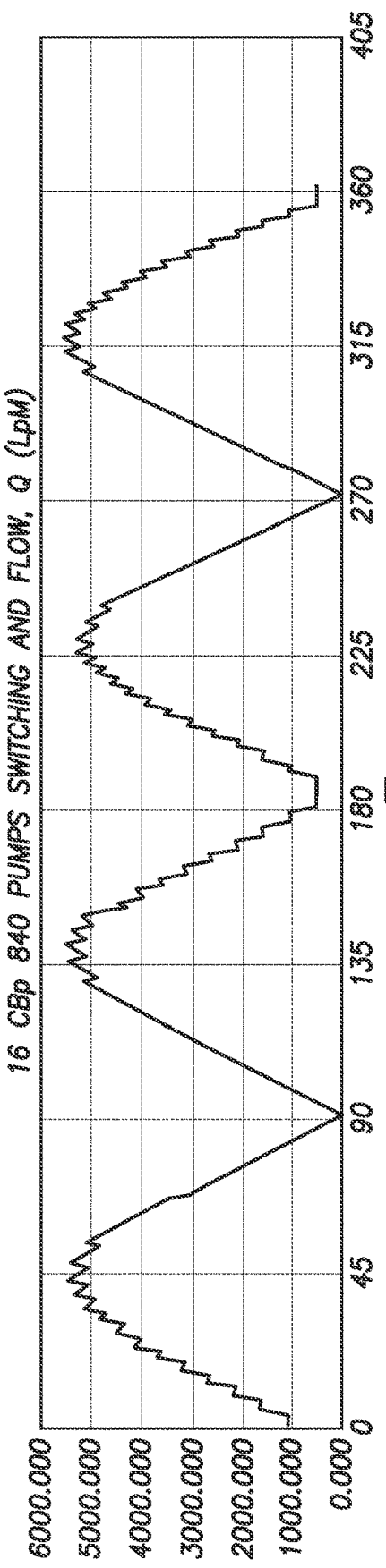
Figure 25E:
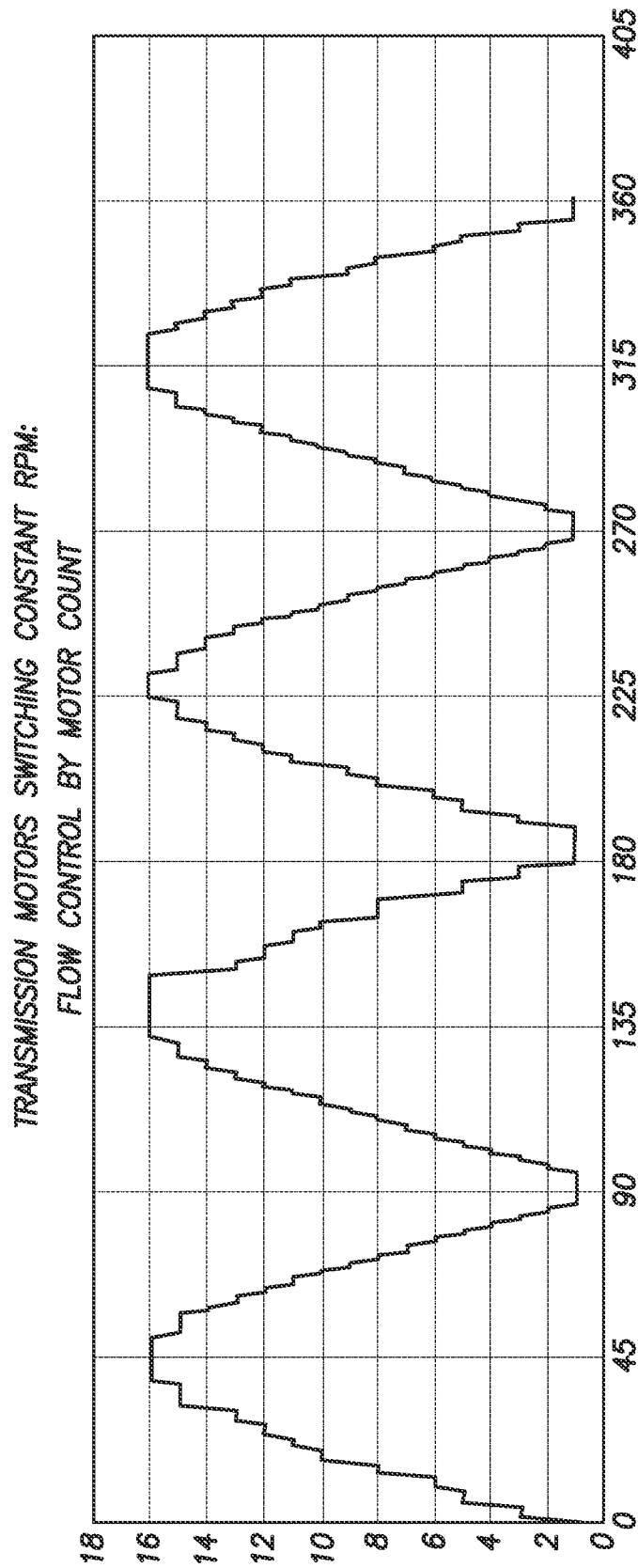
Figure 26:
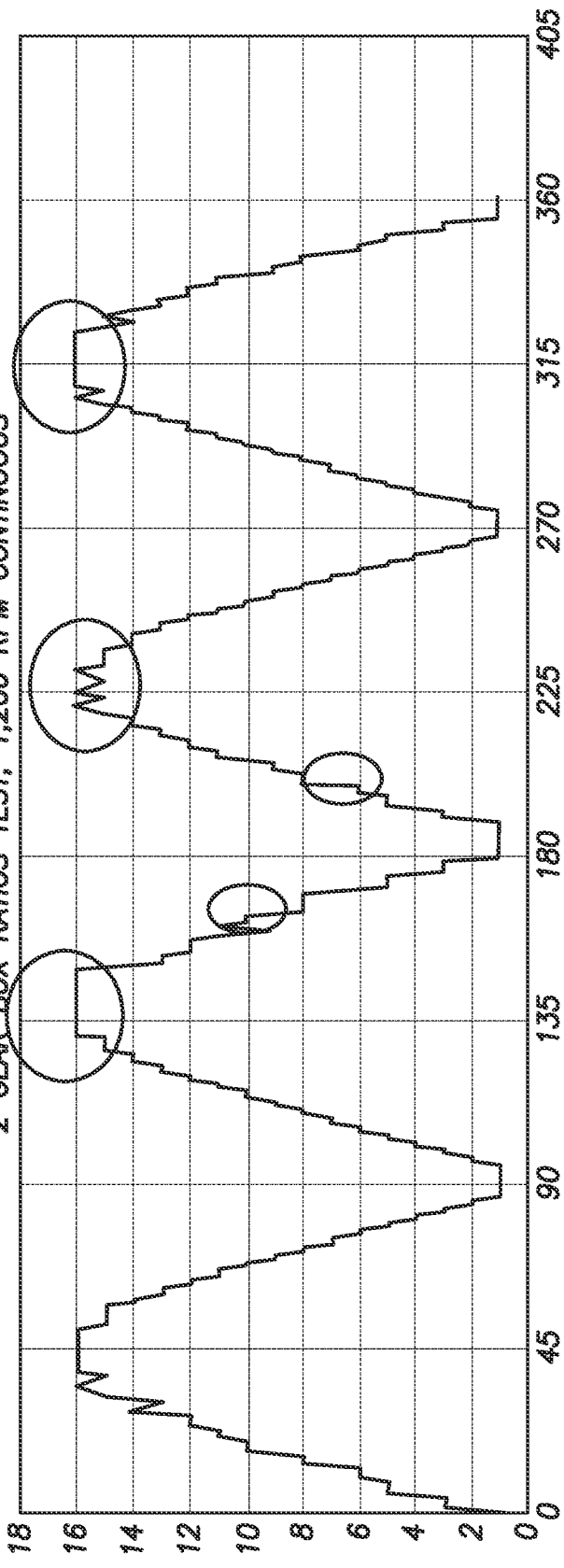
FIG. 26 is a graph of the number of motors outputting energy to the generators over a wave cycle.

With reference to FIG. 21, the method can include controlling the hydraulic transmission 2106 between the mechanical interface (e.g., stroke telescope) and the generators 2107. The control of the hydraulic transmission 2106 can include: (1) using the radial hydraulic pumps as paravane-to-wave phase control 2103; (2) using the radial hydraulic motors to convert variable flows and pressures from the pumps to a constant flow 2104; and (3) using a common gearbox with multiple gear ratio inputs to provide constant RPM outputs to the generators 2105. Steps 2103, 2104, and 2105, together provide for control of hydraulic transmission 2106 between the mechanical interface and the generators 2107. The common gearbox and generators can be configured to output a constant RPM. The field excitation of the generators can be switched, as required, to island or grid mode. In operation of some embodiments, the common gearbox and generators constantly spin to provide a "flywheel like" momentum to the system. Radial motors can be hydraulically clutched in and out as required. FIG. 25D is a graph showing pump switching data. FIG. 25E is a graph showing motor switching data. FIG. 26 is a graph of the number of motors outputting energy to the generators over a wave cycle.

PTO Control—Pump and Motor Data

The pump data related to the control of the pumps and motors of the hydraulic transmission, as shown in Table 9 (below), as well as in FIGS. 37A-37H of the '030 application, includes: (1) flow (both GpM and LpM/Q); (2) the delta of flow (ΔQ); (3) the pump count, Pump.CT. Saved); (4) the impedance (kNm); (5) kNm and N; and (6) pressure. The motor data related to the control of the pumps and motors of the hydraulic transmission, as shown in Table 9 as well as in FIGS. 37A-37H of the '030 application, includes: (1) the number of motors; (2) the liters required per pump (L.Req/ 1P/1° Φ) to operate the motors at the desired RMP; (3) the flow consumed (Q.LpM.Consumed); (4) the flow remainder (Q.LpM.Remainder); (5) the torque; and (6) the kW. This pump and motor data can be monitored during operation of the WEC, and assessed to determine actions for controlling the generation of electricity using the WEC. The data includes number of pumps in operation (pump count, Pump.CT Saved), which can be varied throughout operation of the system depending on the pressure and/or flow to the pumps. The data includes the number of motors at any given time that are clutched to output energy to the generators, which can be varied throughout operation of the system (e.g., depending on the RPM).

TABLE 9

| Pump and Motor Data | | | | | | | |
| --- | --- | --- | --- | --- | --- | --- | --- |
| Transmission Pump Data | | | | | | | |
| Flow (Gpm) | Delta of flow (ΔQ) | Flow (LpM) | Pump count | Impedance (kNm) | kNm | N | pressure |
| Transmission Motor Data | | | | | | | |
| number of motors | liters required per pump (L.Req/1P/1°Φ) | flow consumed (Q.LpM.Consumed) | flow remainder (Q.LpM.Remainder) | torque | kW | | |

Energy Flow in the PTO

Figure 27:
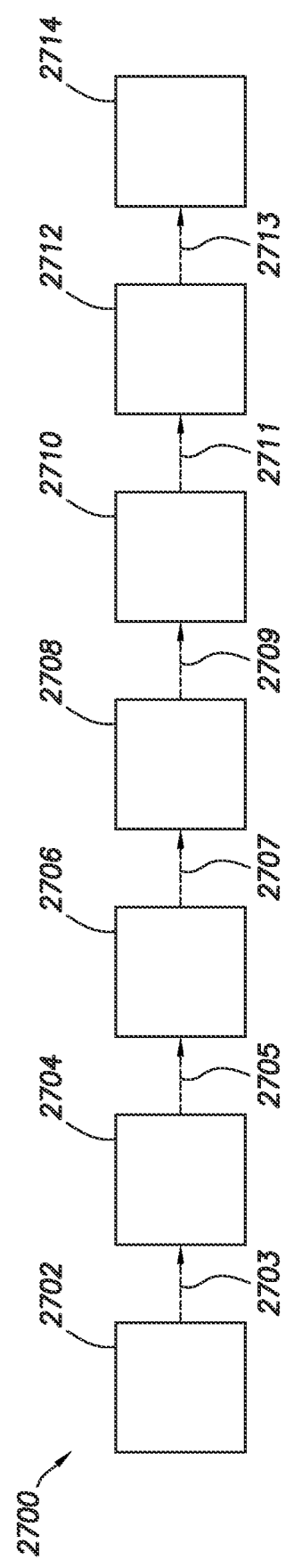
FIG. 27 is a schematic of the energy flow in the PTO of a wave energy converter.

With reference to FIG. 27, system 2700 includes paravane 2704, stroke telescope 2706, hydraulic pumps 2708, hydraulic motors 2710, generators 2712, and equipment 2714. Paravane 2704 is coupled with stroke telescope 2706, such as in the same manner as described with reference to FIGS. 1-20. In operation, wave energy 2703 is transferred from waves 2702 to paravane 2704. The wave energy 2703 causes paravane 2704 to move upwards and/or downwards, which, in-turn, transfers mechanical energy 2705 to stroke telescope 2706, causing stroke telescope 2706 coupled thereto to correspondingly stroke upwards and/or downwards. Stroke telescope 2706 is coupled with hydraulic pumps 2708 (e.g., via a rack of the stroke telescope meshed with a pinion gear of the hydraulic pumps), such that movement of stroke telescope 2706 transfers mechanical energy 2707 to hydraulic pumps 2708, driving operation of hydraulic pumps 2708. Hydraulic pumps 2708 are coupled with hydraulic motors 2710, such that pumping action of hydraulic pumps 2708 converts the mechanical energy 2707 to hydraulic energy 2709, which is transferred to hydraulic motors 2710, driving operation of hydraulic motors 2710. Hydraulic motors 2710 are coupled with generators 2712, such that operation of hydraulic motors 2710 converts hydraulic energy to mechanical energy and then transfers mechanical energy 2711 to generators 2712, driving operation of generators 2712. Operation of generators 2712 converts the mechanical energy 2711 into electricity 2713, which is transferred to equipment 2714. Electricity 2713 may, for example, drive operation of equipment 2714 or be stored in equipment 2714. The flow of energy through the PTO is defined by the energy generated and/or transferred along the PTO, as shown by elements 2703, 2705, 2707, 2709, 2711, and 2713. The systems and methods disclosed herein are not limited to the particular energy flow shown in FIG. 27.

PTO Control—Controlling Impedance

With further reference to FIG. 27, in some embodiments controlling the PTO includes controlling impedance (or lack of impedance) on energy being input into the generators, including regulating and/or modulating the impedance or parameters that affect the impedance. The controlling of impedance can include, but is not limited to, controlling the energy transferred from the stroke telescope 2706 to the hydraulic pumps 2708, controlling the energy transferred from the hydraulic pumps 2708 to the hydraulic motors 2710, controlling the energy transferred from the hydraulic motors 2710 to the generators 2712, or combinations thereof. By controlling the flow of energy through the PTO, the electricity generated by generators 2712 can be controlled.

In some embodiments, a primary goal is use of the pumps is to control phase. A secondary goal is maintaining the paravane, as close as possible, at a position that is 50% of a wave height for maximum energy collection. Restricting flow and/or limiting the number of pumps operating limit the active stroke of the paravane and increases pressure. Increasing flow and/or increasing the number of pumps operating increases the active stroke and decreases pressure. A tertiary goal is controlling a length of stroke to not exceed maximum stroke when operating in wave heights greater than a maximum stroke length. Some such embodiments include controlling a vertical position of the paravane 2704 relative to the waves 2702. Using a depth adjustable paravane, as described elsewhere herein, allows the vertical position (depth) of the paravane 2704 to be controlled.

As a pump produces flow, restricting flow from the pump can be used to control pressure. In maximizing energy collection, for a given wave force with all pumps operating, there is flow without pressure and without energy output from the pumps. For a given wave force with all pumps shut down, there is no flow with pressure and with no energy output from the pumps. A maximum energy output from the pumps occurs with the wave energy converter at 50% of the wave height where a balance of both flow and pressure is provided. Increasing or decreasing flow or pressure relative to the maximum energy output will decease mechanical energy provided to the motors.

Embodiments can include controlling the flow volume and/or volumetric flow rate and/or pressure of fluid from the hydraulic pumps 2708 to the motors 2710. In some embodiments, the method includes shutting down and/or starting up one or more of a plurality of hydraulic pumps 2708. By shutting down one or more of the hydraulic pumps 2708, the amount of hydraulic flow decreases to the hydraulic motors 2710 and pressure increases, which, in-turn, reduces the amount of mechanical energy produced by the hydraulic motors 2710 and so forth, throughout the flow of energy through the PTO. By starting up one or more of the hydraulic pumps 2708, the amount of hydraulic flow increases to the hydraulic motors 2710 pressure decreases, which, in-turn, increases the amount of mechanical energy produced by the hydraulic motors 2710 and so forth, throughout the flow of energy through the PTO. In some embodiments, the hydraulic pumps 2708 can be selectively coupled and decoupled from the hydraulic motors 2710 to control of the amount of hydraulic flow applied to the hydraulic motors 2710 by the hydraulic pumps 2708, without requiring the hydraulic pumps 2708 to be shut down.

Controlling the energy transferred from the hydraulic motors 2710 to the generators 2712 may include shutting down and/or starting up one or more of the hydraulic motors 2710. In some embodiments, controlling the energy transferred from the hydraulic motors 2710 to the generators 2712 may include clutching in or out one or more of the hydraulic motors 2710 to selectively couple and decouple the hydraulic motors 2710 with the generators 2712. By shutting down or clutching out one or more of the hydraulic motors 2710, the amount of mechanical energy applied to the generators 2712 is reduced, which, in-turn, reduces the amount of electrical energy produced by the generators 2712. By starting up or clutching in one or more of the hydraulic motors 2710, the amount of mechanical energy applied to the generators 2712 is increased, which, in-turn, increases the amount of electrical energy produced by the generators 2712.

Constant flow rate, through one or multiple motors, produces constant RPM in one or multiple generators. Constant RPM in one or multiple generators results in constant voltage and frequency from the generators. The amount of increase or decrease in pressure results in increase or decrease in torque at the constant RPM and the amount of increase or decrease in amperage produced at constant voltage and frequency. Thus, by controlling the transfer and/or generation of energy at one or more points throughout the PTO, the electricity generated by generators 2712 can be controlled. In some embodiments, controlling the transfer and/or generation of energy includes shifting a gear in which the motor is operated to a lower or higher gear. For example, this can be accomplished by shifting gears of a gearbox coupled between the motors and the generators.

PTO Control—Exemplary WECs

Figure 28:
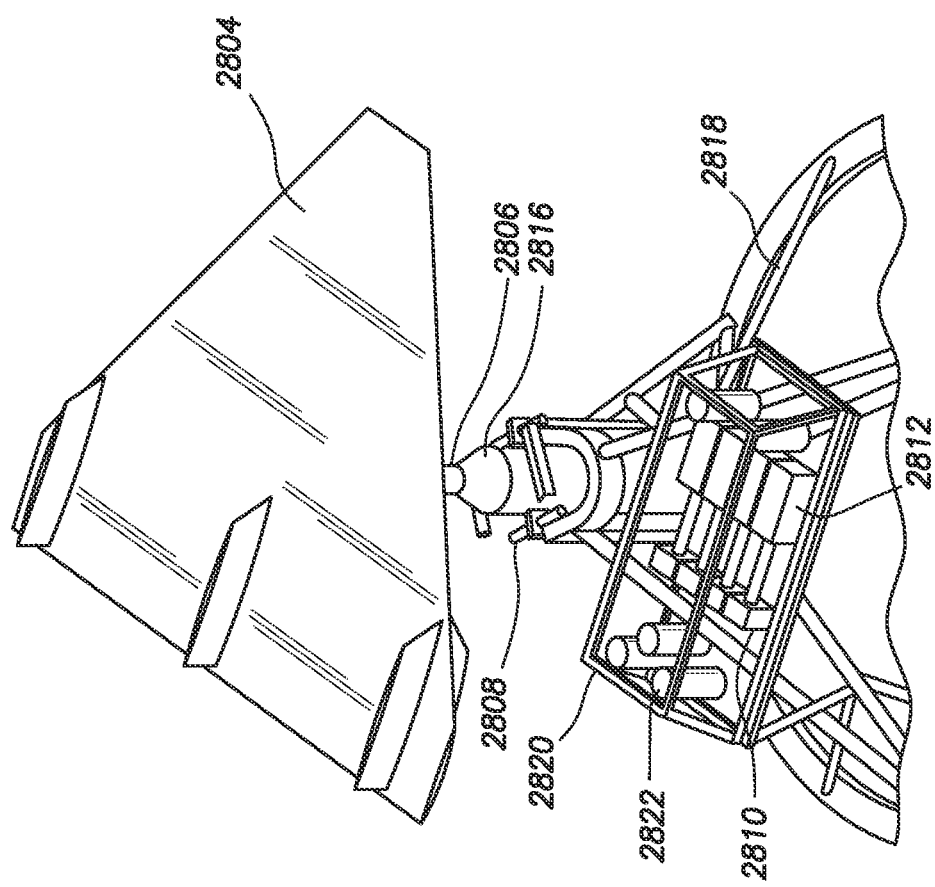
FIG. 28 depicts a wave energy convertor with a PTO including a hydraulic-electric generator skid.

FIG. 28 depicts one exemplary embodiment of a system disclosed herein. System 2800 includes paravane 2804. In one exemplary embodiment, paravane 2804 has a surface area of 1,100 m² and is designed to operate in oceans having a depth of up to 60 meters; however, the paravanes disclosed herein are not limited to these particular parameters or dimensions. System 2800 includes stroke telescope 2806 coupled with paravane 2804. In one exemplary embodiment, stroke telescope 2806 has a vertical extent of 10 meters; however, the stroke telescopes disclosed herein are not limited to these particular parameters or dimensions. The paravane 2804 and stroke telescope 2806 are have a neutral buoyancy, such that the paravane 2804 and stroke telescope 2806 react equally to energy from both heave-up and heave-down waves.

System 2800 includes structural column 2816, within which stroke telescope 2806 is telescopically engaged. Structural column 2816 is coupled with pedestal frame 2818. Pedestal frame 2818 may be positioned on a seabed, with paravane 2804 positioned at the desired height relative to the seabed and/or relative to the sea level to harvest wave energy. Pedestal frame 2818 and structural column 2816 may each have a positive buoyancy.

System 2800 includes a hydraulic-electric generator skid 2820, which forms at least a portion of the PTO of system 2800. Hydraulic-electric generator skid 2820 includes four generators 2812. In one exemplary embodiment, each generator is a 2.2 MW generator; however, the generators disclosed herein are not limited to these particular parameters. Hydraulic-electric generator skid 2820 includes four motors 2810. Each motor 2810 is coupled with one of the generators 2812. The hydraulic motors 2810 serve a substantially similar function as the energy collection device (e.g., 210) described in reference to FIGS. 1-20, with the cylinder of the energy collection device being pressure-controlled and the hydraulic motors 2810 being flow-controlled.

System 2800 includes four pumps 2808 coupled with the structural column 2816. Each pump 2808 is coupled with one of the motors 2810. As shown, system 2800 includes an array of four hydraulic pumps 2808, an array of four motors 2810, and an array of four generators 2814; however, the systems disclosed herein are not limited to this particular arrangement and number of components, and may include more or less than four hydraulic pumps, four motors, and four generators. System 2800 includes accumulators 2822 coupled with the hydraulic pumps 2808 to compensate for pressure fluctuations.

In operation of system 2800, heave up and/or heave down forces of the water impact paravane 2804, causing paravane 2804 move upwards and/or downwards (e.g., reciprocally). The movement of the paravane 2804 causes the stroke telescope 2806 to correspondingly stroke upwards and/or downwards relative to the structural column 2816. Thus, the stroke telescope 2806 and structural column 2816 function as a piston and cylinder, respectively, to produce a hydraulic force. The stroking of the stroke telescope imparts hydraulic force on the hydraulic pumps 2808 coupled with the combinations of the stroke telescope 2806 and structural column 2816. The hydraulic force on the hydraulic pumps 2808 drives the operation of the hydraulic pumps 2808. The driven hydraulic pumps 2808 impart hydraulic force on the hydraulic motors 2810, which drives operation of the hydraulic motors 2810. The driven hydraulic motors 2810 are mechanically coupled with the generators 2812 (e.g., via a drive shaft) such that the driven hydraulic motors 2810 impart mechanical force onto the generators 2812, driving operation of the generators 2812. The operation of the generators 2812 produces electricity, which can then be transferred, stored, and/or consumed.

While FIG. 28 depicts a single paravane coupled with a hydraulic-electric generator skid, the systems disclosed herein are not limited to this arrangement, and may include more than one paravane coupled with a hydraulic-electric generator skid, or may include more than one hydraulic-electric generator skid coupled with a paravane.

System 2800 does not require an operating range telescope (as described in reference to FIGS. 1-20). The paravane 2804 and power-take-off can operate in optimum conditions. Where optimum wave energy is extracted with the paravane 2804 at 50% wave height, increasing stroke can reduce extraction/loads. Switching on and off of the multiple pumps 2808 can be used to control phase to the wave. Control logic for stochastic wave forms can be based on four real time sensors including an up-looking sonar, as described elsewhere herein. The switching of the multiple motors 2810 to a common gear box can be used to provide continuous RPMs to all generators 2812. The hydraulic transmission and common gear box can allow off-line synchronous generators of the system 2800 to function as synchronous condensers (e.g., if the grid requires). With components of the system 2800 having neutral or only slight buoyancy, the need for heavy lift ships can be reduced or eliminated.

Figure 29:
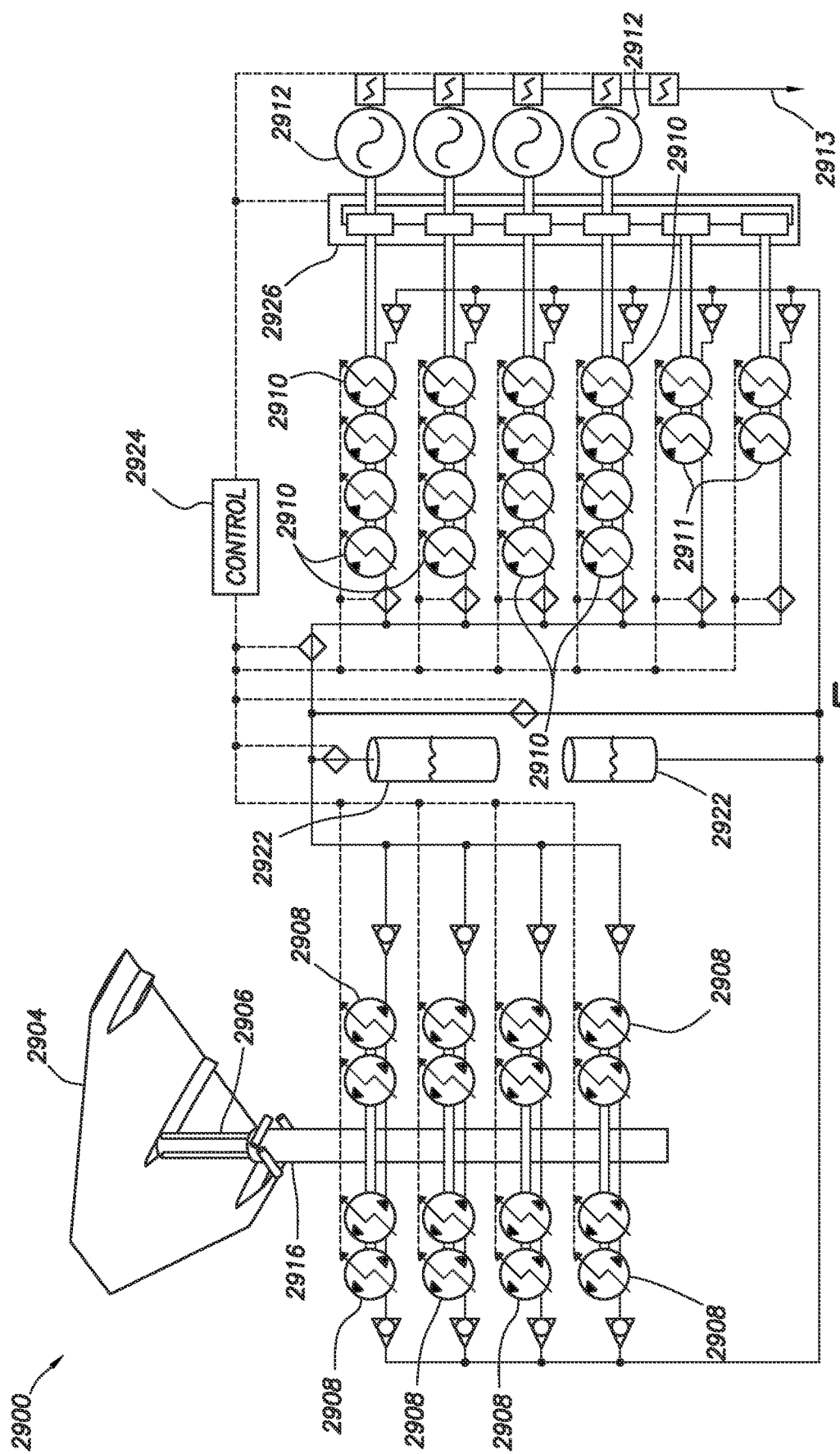
FIG. 29 is a schematic of a PTO of a wave energy convertor, including hydraulic pumps, motors, and electric generators.

FIG. 29 depicts another embodiment of the system having a depth adjustable paravane, with the power take off hydraulic transmission shown in schematic format. System 2900 includes paravane 2904 coupled with stroke telescope 2906, which is, in-turn, coupled with structural column 2916. System 2900 includes four sets of four reversible, hydraulic, radial piston pumps 2908, four sets of four hydraulic radial piston motors 2910 and two sets of two hydraulic radial piston motors 2911, and two accumulators 2922. In some embodiments, to enhance the capture of low climatic wave resource events, the two hydraulic radial piston motors 2911 are included in the system 2900.

System 2900 also includes four generators 2912. In one exemplary embodiment, the generators are synchronous, and are from about 1 to about 4 MW generators. The generators 2912 include one common mechanical gearbox 2926 to provide for control of the constant RPM to an optimum level. The common gearbox can be positioned between the motor 2910 and 2911 and the generators 2912. Each motor array 2910 and 2911 can have a specific gear ratio, such as a gear ratio for a 100-year wave event, a gear ratio for a mean climatic condition, or a gear ratio for a minimum climatic condition/resource. The output shafts of common mechanical gearbox 2926 can be coupled via idler gears, such that any of the motors 2910 and 2911 can drive any of the generators 2912; thereby, providing for better power distribution and system redundancy.

System 2900 includes an electronic control system 2924 with ring topology and redundancy. Electronic control system 2924 may be a programmed logic controller (PLC) or computer, and may include computer instructions, stored on a non-transitory medium (e.g., a hard drive), to execute the various control and monitory functions disclosed herein.

System 2900 generates electricity 2913 in response to both positive and negative stroke forces (i.e., in both directions of movement of the stroke telescope 2906). In operation, linear motion of the stroke telescopes 2906 gear racks engages idler gears with pinion gears of the pumps 2908, such that movement of the stroke telescopes 2906 drives operation of the pumps 2908.

In some embodiments, the synchronous generators 2912 can function as synchronous condensers to modulate/stabilize power and frequency fluctuation in the grid. With the armatures of all of the generators 2912 constantly rotating at constant RPM, whether excited and producing power or not excited, control from the grid can be determined by switching the system to move from power production to grid essential reliability service.

In some embodiments, system 2900 is configured to provide paravane-to-wave phase control and constant RPMs to the generators 2912. In other embodiments, system 2900 is configured to provide paravane-to-wave phase control and fluctuating RPMs to the generators 2912. In some embodiments of controlling impedance, wave-induced hydraulic fluid flow and hydraulic pressure is varied and controlled by switching one or more of the pumps 2908 on or off. Switching the one or more of the pumps 2908 on or off can produce paravane-to-wave phase control and provide for optimum energy harvesting from combinations of wave forces via a phase-based control logic with real-time data inputs. The phase-based control logic refers to, or includes, the data collection, analysis, calculations, and determinations described in reference to FIG. 21 and Tables 1-9.

The motors 2910 can be switched on or off (or clutched in or out) in coordination with the pumps 2908 to provide for constant flow, resulting in constant RPMs provided to the active generators 2912. Providing constant RPMs produces constant voltage and frequency electricity 2913, for optimum electric power generation. The use of an arrangement of multiple pumps, motors, and generators provides for the capacity to generate power in various conditions, such as in DNV defined 100-year wave events. Additionally, the use of an arrangement of multiple pumps, motors, and generators provides for redundancy in the system. While described as providing for constant flow, RPMs, voltage and frequency, the systems and methods are not limited to this application, and may provide for varied flow, RPMs, voltage, and/or frequency.

In some embodiment, the paravane of the system disclosed herein is dynamically stable and requires no control. That is, the paravane aligns with the resultant vector of all wave forces that impact the paravane, including particle accelerations, flow velocities, and coastal and ocean currents. The wave forces that impact the paravane are converted to heave-up and/or heave-down forces that are transferred to the stroke telescope, aligning with the gravitation forces that forms the ocean waves. Thus, in some embodiments, only two controls are used in regards to the paravane—either raise the paravane or lower the paravane.

PTO Control—Phase-Based Control Logic

Figure 30A:
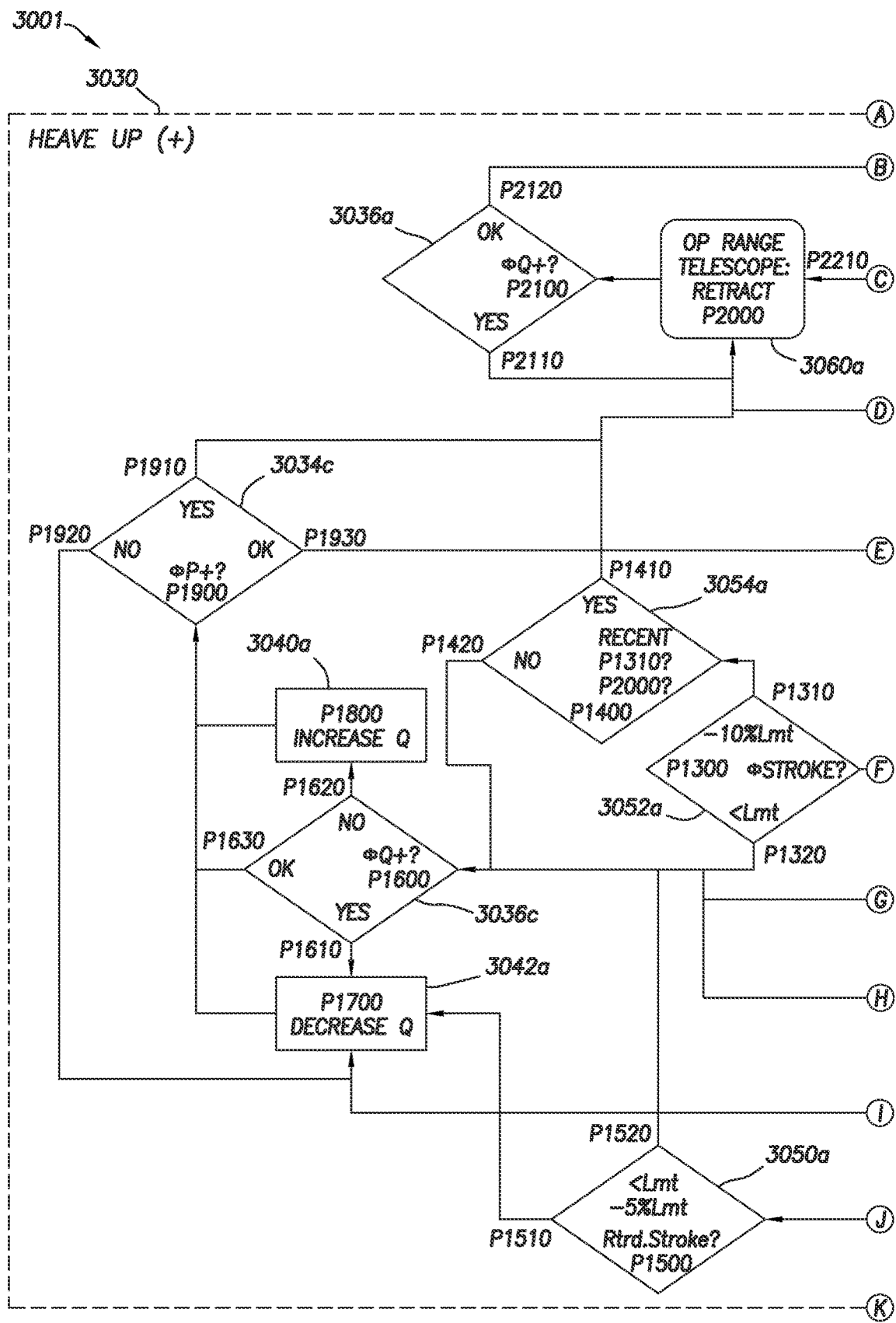
FIGS. 30A-30C are a schematic of logic control used to control the PTO of a wave energy convertor.
Figure 30B:
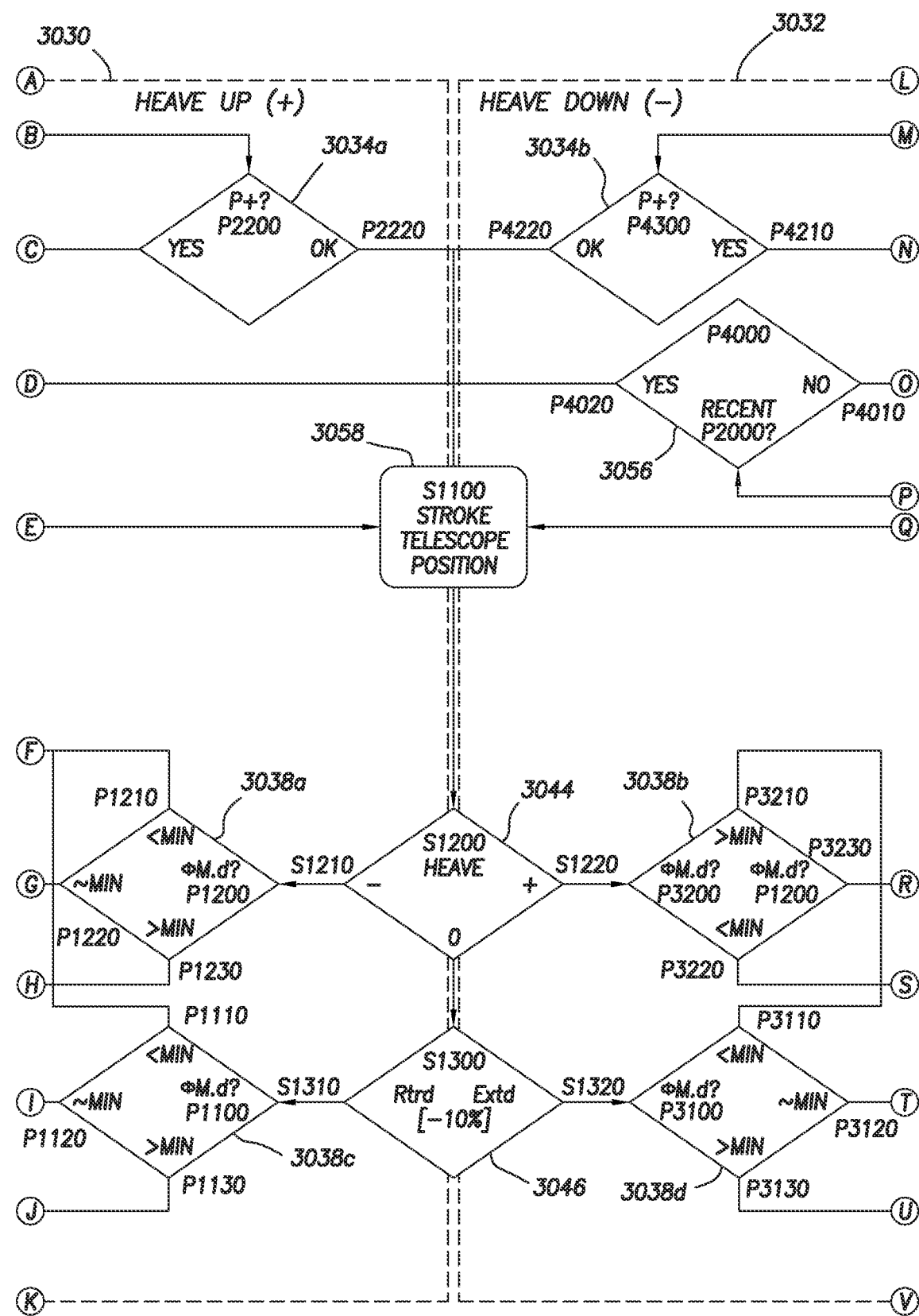
Figure 30C:
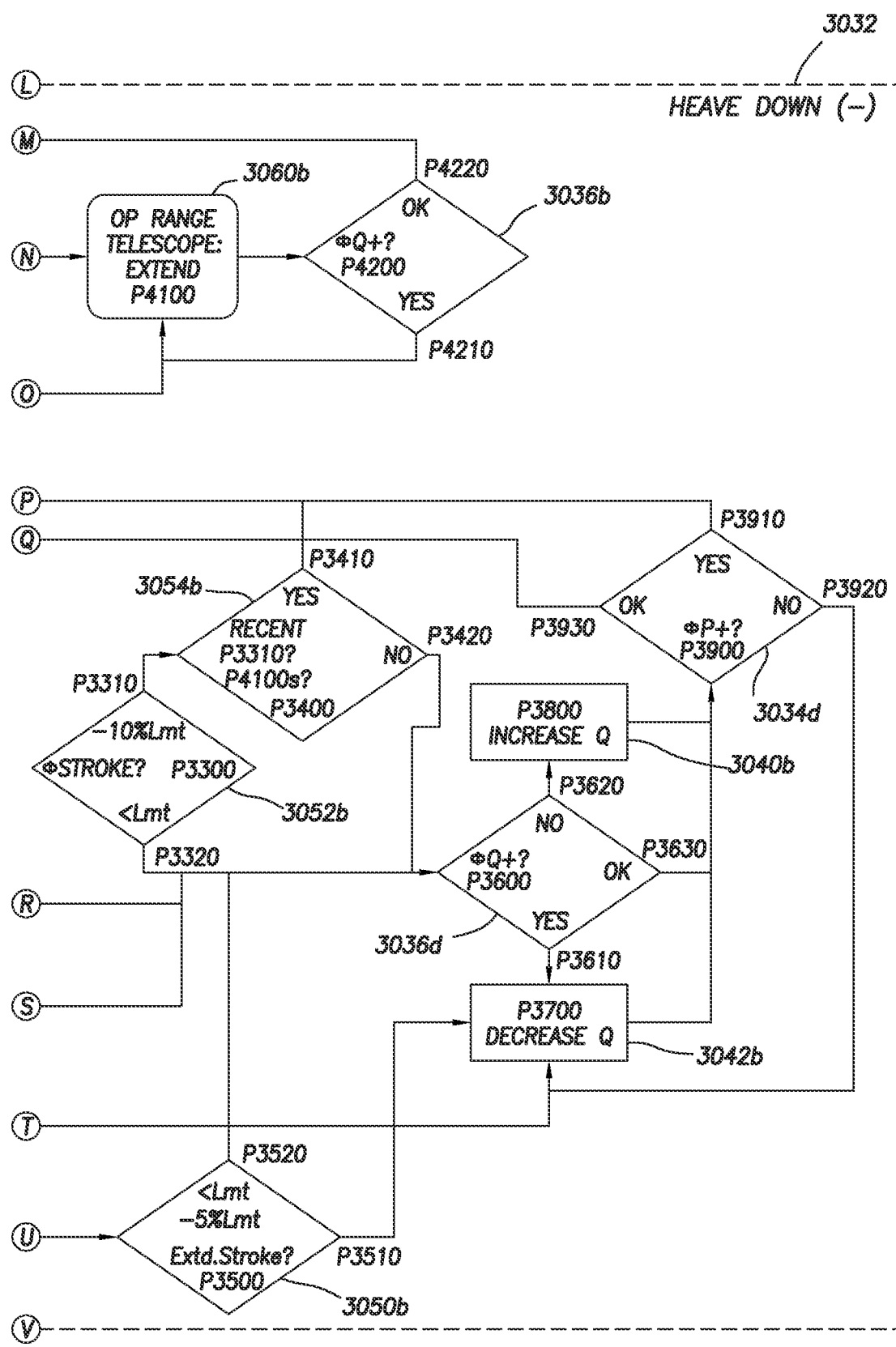
Figure 31:
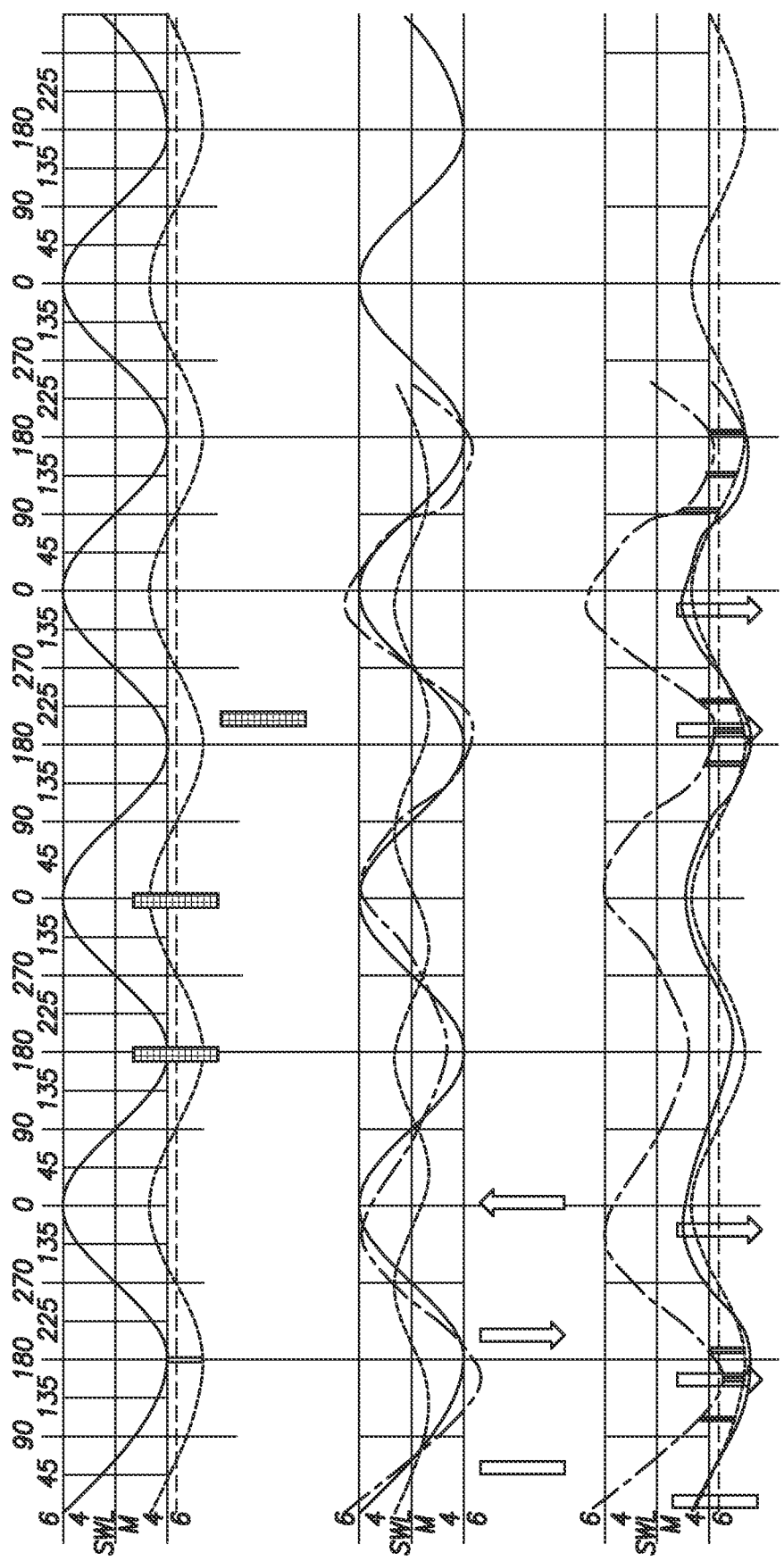
FIG. 31 depicts data associated with the logic control used to control the PTO.

FIGS. 30A-30C are a schematic of an embodiment of at least a portion of phase-based control logic used to control the PTO. A parameter exploited by the phase-based control logic is that wave crests are preceded by troughs. FIG. 31 depicts graphs related to use of the phase-based control logic in an asynchronous Bretschneider Wave Spectra, as well as a table of optimal impedances based on typical sinusoidal phases. In some embodiments, a virtual phase control model in the phase-based control logic is used to optimize energy harvest. In some embodiments, the phase-based control logic disclosed herein includes adaptive learning software and autopilot hardware that is adapted to be utilized to control the depth of the paravane.

In FIGS. 30 and 31, M.d. is mass.distance or distance to wave surface from the paravane. At least a minimum amount of wave mass is positioned above the paravane for wave energy extraction. In FIGS. 30 and 31, P is pressure from the pumps, and Q is flow rate from the pumps.

Phase-based control logic 3001 is used under both heave-down 3030 and heave-up 3032 conditions. As evident from FIGS. 30A-30C, the operations implemented based on the phase-based control logic 3001 are based upon: (1) the status of the hydraulic pressure 3034a-3034d from the hydraulic pumps of the PTO; (2) the status of the flow rate of hydraulic fluid 3036a-3036d from the hydraulic pumps of the PTO; and (3) the status of the distance between the paravane and the wave surface 3038a-3038d from the hydraulic pumps of the PTO. Based on the conditions, the operations of the phase-based control logic 3001 can include: (1) increasing the flow rate of hydraulic fluid 3040a and 3040b from the hydraulic pumps of the PTO; and (2) decreasing the flow rate of hydraulic fluid 3042a and 3042b from the hydraulic pumps of the PTO.

In operation, upon the occurrence of a heave-up or heave down wave 3044 and/or a retraction or extension of the stroke telescope 3046 (relative to the stroke telescope position 3058), the phase-based control logic 3001 is used to determine and assess the distance between the paravane and the wave surface 3038a-3038d. The phase-based control logic 3001 is used to determine and assess the occurrence of extension and retractions of the stroke telescope 3050a and 3050b.

Stroke telescope position 3058 is a control parameter of the phase-based control logic 3001. In operation, the phase-based control logic 3001 determines the stroke telescope position 3058. The phase-based control logic 3001 determines whether the stroke telescope has exhibited a positive heave or a negative have at 3044. If a positive heave is determined at 3044, then the remainder of determinations and actions implemented by the phase-based control logic 3001 are set forth on the right side of the chart, for heave-up 3032 conditions. If a negative heave is determined at 3044, then the remainder of determinations and actions implemented by the phase-based control logic 3001 are set forth on the left side of the chart, for heave-down 3030 conditions. The phase-based control logic 3001 also determines whether the stroke telescope position 3058 is within 10% of the fully retracted or full extended position of the stroke telescope, at box 3046.

At boxes 3038a-3038d of the phase-based control logic 3001, "ΦM.d" or "phase mass distance", the percentages of phase, which can be expanded or contracted depending on wave conditions, reside in the virtual phase control model within the PLC that implements the phase-based control logic 3001. The required mass above the paravane is a function of distance and can be measured by an up-looking doppler sonar transducer array positioned on the upper surface of the paravane, just above the pivot point of the paravane at the center and lateral area and buoyancy. The virtual phase control model includes a percentage parameter that depends on the heave position 3038a and 3038b, and depending on the status of the stroke telescope being within ~10% of the fully retracted or full extended position of the stroke telescope 3038c and 3038d.

In FIGS. 30A-30C, "ΦStroke" is "phase stroke position." At boxes 3052a and 3052b, the phase stroke position is determined. At boxes 3054a 3054b, if the stroke is repetitive, then the operating range telescope is retracted or extended, per boxes 3060a or 3060b. At box 3056, a decision to extend the operating range telescope to optimize exposure to greater wave energy is made, if conditions allow.

In FIGS. 30A-30C, "ΦQ" is "phase flow." Once the stoke telescope and paravane positions are deemed to be safe, the phase control is implemented by flow control. The flow control includes determining how many of the plurality of hydraulic pumps to open and/or to close. In FIGS. 30A-30C, boxes 3040a, 3040b, 3042a, and 3042b are the actions of opening and closing the hydraulic pumps as implemented by the phase-based control logic 3001.

In FIGS. 30A-30C, "ΦP" is "phase pressure." In operation, if too much pressure (e.g., 5,000 PSI/345 Bar) is being applied by the hydraulic pumps, then one or more of the closed hydraulic pumps are opened to increase the flow volume from the hydraulic pumps and drop the pressure from the hydraulic pumps.

The steps within the phase-based control logic 3001 can be repeated to continue control of the generation of electricity.

FIG. 31 depicts graphs related to sixteen hydraulic pumps controlling wave phase, including an Airy Theory wave particle graph, a forces +/− still water line graph, a forces stroke+/− graph, and a pumps switching and flow graph, respectively.

In some embodiments, the phase-based control logic estimates disclosed herein are based on eight discrete wave period/phase calculations, and resolve wave forces to normal forces to stroke forces. The phase-based control logic can be used to produce hydraulic power output in kilowatts via a hydraulic cylinder. The phase-based control logic is capable of achieving estimates for each degree of a 360-degree wave period/phase, and can be continuous to within thousandths of a second. The phase-based control logic model can resolve wave forces to normal forces to stroke forces for each of the 360-increments of phases. The phase-based control logic model can be the Airy Theory Formula reformatted into a real wave event chronology that is: Phase 0='first of trough'.

The phase-based control logic can be used to determine hydraulic power output in kilowatts via motors and pumps (e.g., Bosch Rexroth Hagglunds Motors and Motors as Pumps). In such embodiments, the phase-based control logic model can establish the fundamentals of a universal hydraulic transmission of multiple pumps (e.g., Hagglunds Pumps) to multiple motors (e.g., Hagglunds Motors), which will convert varying pressures and flows from a wave forms' energy into constant revolutions per minute (RPMs) to an electrical generator. In such embodiments, the hydraulic transmission achieves optimum energy harvest/absorption/extraction from wave forms by simultaneously maintaining phase relation to the wave form. The phase-based control logic is the switching logic for and between the pumps and motors in wave forms. The phase-based control logic is used to switch the flow control valves based upon real-time data inputs from the depth adjustable paravane, sonar measurement from the paravane-to-wave form surface, and virtual model parameters derived from universal optimum flow values discerned from previous analyses. Thus, in operation of some embodiments, the phase-based control logic is used to control the opening and closing of the hydraulic pumps to maintain correct resistance, such that a constant RPM of the generators is achieved to provide a constant amperage (e.g., using permanent magnets or variable magnets). By controlling impedance, maximum energy extraction is maintained from a particular wave. The phase-based control logic can be used to provide optimum power output of a WEC, keep the paravane in phase with the wave energy, permit energy harvest in both directions of the paravane (heave-up and -down), maintain constant and optimum generator RPM (high efficiency), adjust the location of the paravane for various combinations of sea states so it is placed where wave energy is concentrated, and provide an energy output of up to 8 MW per paravane. The system, including the phase-based control logic, has various features that provide the system with reliability, including: (1) the ability to lower the paravane in the water column to protect the paravane from damage; (2) the track record for longevity of the PTO components; (3) the redundant energy transmission paths in the PTO; (4) the multiple control signal paths (e.g., in case of damage); and (5) the use of individual motors and pumps that may be individually taken off line while the PTO is still operating (e.g., in case of malfunction).

The phase-based control logic can determine the energy output from the WEC, and can be used to maintain the paravane at mid-wave height, and in-phase with the wave. Due to the shape of some paravanes, which self-align with the waves, the only adjustment to the paravane needed in some embodiments is adjustment of the depth (i.e., the paravane is either raised or lowered). The phase-based control logic can be used to determine whether the paravane needs to be adjusted, and, if so, whether the paravane needs to be raised or lowered, and, if so, by how much the paravane needs to be raised or lowered. The phase-based control logic is adaptable to by synchronous and asynchronous wave forms.

In some embodiments, the methods disclosed herein can be used to analyze wave conditions before installation of a WEC to determine the specifications of the WEC to install at a particular location based on the wave conditions at that location.

PTO Control—Paravane Position Data

In some embodiments, the input data that is input into the phase-based control logic is real-time information that is measured during the operation of a WEC. With reference to FIG. 32, system 3200 includes paravane 3204 coupled with stroke telescope 3206, which is, in-turn, coupled with structural column 3216 that is coupled with seabed 3219. The input data can include paravane stroke position, which allows for an assessment of whether the paravane 3204 is in-phase with the waves 3202. The paravane stroke position can be measured by a rotary encoder 3203 positioned on the stroke telescope 3206 to measure extent of the stroke. The input data can include a measurement of distance 3205 between the paravane 3204 and the wave surface 3207. The distance 3205 can be measured by a sonar transducer 3209 that is positioned to receive input date from above the sonar transducer 3209 at the wave surface 3207.

While, as described herein, the wave energy is analyzed and exploited for generation of electricity, the wave energy analysis methods disclosed herein are not limited to this particular application. In some embodiments, the methods disclosed herein can be used to analyze wave forces for use in designing and/or installing aquatic structures other than a WEC. In some embodiments, the methods disclosed herein can be used to analyze wave forces for use in analyzing expected forces and activities of tsunamis or other sea conditions.

Although the present embodiments and advantages have been described in detail, it should be understood that various changes, substitutions and alterations can be made herein without departing from the spirit and scope of the disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for converting wave energy into electricity, the system comprising:
 a wave energy mechanical interface;
 a power take off coupled with the wave energy mechanical interface, wherein the power take off comprises a plurality of hydraulic pumps coupled with a plurality of hydraulic motors, and wherein the hydraulic pumps are coupled with the wave energy mechanical interface;
 one or more generators coupled with the plurality of hydraulic motors of the power take off;
 a controller coupled with the power take off, wherein the controller is configured to estimate an amount of energy transferred from waves to the wave energy mechanical interface using a modified Airy wave theory model, the modified Airy wave theory model generated by: generating a graph of a propagation of the waves on a surface of a homogeneous fluid layer in accordance with the Airy wave theory, wherein a wave phase of the graph begins at a wave crest, and wherein a direction of propagation of the wave phase of the graph is such that a wave period moves from 360° to 0°; resetting the beginning of the wave phase from the wave crest to a wave trough; and reorienting the direction of the propagation of the wave phase such that the wave period moves from 0° to 360°; and
 wherein the controller is configured to regulate impedance of energy transferred from the wave energy mechanical interface through the power take off and to the one or more generators by starting-up at least one of the hydraulic pumps while at least another of the hydraulic pumps is shut-down, shutting-down at least one of the hydraulic pumps while at least another of the hydraulic pumps is started-up, selectively shifting a gear of one or more of the hydraulic motors, clutching-in at least one of the hydraulic motors while at least another of the hydraulic motors is clutched-out, clutching-out at least one of the hydraulic motors while at least another of the hydraulic motors is clutched-in, or combinations thereof.

2. The system of claim 1, wherein the controller is configured to regulate a flow rate of hydraulic fluid from the hydraulic pumps to the hydraulic motors and a hydraulic pressure applied to the hydraulic motors by the hydraulic pumps.

3. The system of claim 2, further comprising a plurality of flow control valves coupled between the hydraulic pumps and the hydraulic motors, wherein the controller is configured to selectively open and close the flow control valves to regulate a flow of hydraulic fluid from the hydraulic pumps to the hydraulic motors.

4. The system of claim 1, wherein the controller is configured to coordinate a starting-up and shutting-down of each of the hydraulic pumps with a starting-up and shutting-down of each of the hydraulic motors.

5. The system of claim 1, wherein the controller is configured to regulate energy transferred from the wave energy mechanical interface to the power take off.

6. The system of claim 5, wherein the wave energy mechanical interface comprises a paravane coupled with a stroke telescope, wherein the stroke telescope is telescopically coupled with a column, and wherein the controller is configured to regulate a stroke position of the stroke telescope.

7. The system of claim 6, further comprising a sonar transducer positioned on the paravane to measure the distance between the paravane and a surface of a wave.

8. The system of claim 6, further comprising a rotary encoder positioned relative to the stroke telescope and configured to measure the stroke position of the stroke telescope.

9. The system of claim 1, further comprising a common gearbox coupled between the generators and the hydraulic motors, wherein the controller is configured to shift gears of the gearbox to regulate energy transferred from the hydraulic motors to the generators.

10. The system of claim 1, wherein the controller is configured to regulate impedance of energy transferred to the one or more generators by starting-up at least one of the hydraulic pumps while at least one of the hydraulic pumps is shut-down, shutting-down at least one of the hydraulic pumps while at least one of the hydraulic pumps is started-up, or combinations thereof.

11. The system of claim 1, wherein the controller is configured to regulate impedance of energy transferred to the one or more generators by selectively coupling and decoupling one or more of the hydraulic pumps from the hydraulic motors.

12. The system of claim 1, wherein the controller is configured to regulate impedance of energy transferred to the one or more generators by starting-up at least one of the hydraulic motors while at least one of the hydraulic motors is shut-down, shutting-down at least one of the hydraulic motors while at least one of the hydraulic motors is started-up, or combinations thereof.

13. The system of claim 1, wherein the controller is configured to regulate impedance of energy transferred to the one or more generators by selectively coupling and decoupling one or more of the hydraulic motors from the generators.

14. The system of claim 1, wherein the controller is configured to regulate impedance of energy transferred to the one or more generators by clutching-in at least one of the hydraulic motors while at least one of the hydraulic motors is clutched-out, clutching-out at least one of the hydraulic motors while at least one of the hydraulic motors is clutched-in, or combinations thereof.

15. The system of claim 1, wherein the controller is configured to regulate impedance of energy transferred to the one or more generators by selectively shifting a gear of one or more of the hydraulic motors.

16. The system of claim 1, wherein the controller is configured to generate the modified Airy wave theory model; and
 wherein the controller is configured regulate impedance based on the wave energy estimate.

17. A method for regulating the generation of electricity from wave energy in a wave energy convertor, the method comprising:

forming a modified Airy wave theory model by: generating a graph of a propagation of the waves on a surface of a homogeneous fluid layer in accordance with the Airy wave theory; resetting a beginning of the wave phase from a wave crest to a wave trough; and reorienting a direction of the propagation of the wave phase;

estimating an amount of energy transferred from a wave to a wave energy mechanical interface, through a power take off, and to a plurality of generators, wherein the amount of energy transferred from the wave to the wave energy mechanical interface is estimated based on the modified Airy wave theory model;

wherein the power take off comprises a plurality of hydraulic pumps coupled with a plurality of hydraulic motors, and wherein the hydraulic pumps are coupled with the wave energy mechanical interface, and wherein the generators are coupled with the hydraulic motors; and regulating impedance of energy transferred to the generators, thereby controlling the generation of electricity by the generators;

wherein the regulating comprises starting-up at least one of the hydraulic pumps while at least another of the hydraulic pumps is shut-down, shutting-down at least one of the hydraulic pumps while at least another of the hydraulic pumps is started-up, shifting a gear of one or more of the hydraulic motors, clutching-in at least one of the hydraulic motors while at least another of the hydraulic motors is clutched-out, clutching-out at least one of the hydraulic motors while at least another of the hydraulic motors is clutched-in, or combinations thereof.

18. The method of claim 17, wherein the regulating comprises regulating the amount of energy transferred from the hydraulic pumps to the hydraulic motors.

19. The method of claim 18, wherein regulating the amount of energy transferred from the hydraulic pumps to the hydraulic motors comprises:
regulating a flow rate of hydraulic fluid from the hydraulic pumps to the hydraulic motors;
regulating a hydraulic pressure applied to the hydraulic motors by the hydraulic pumps;
selectively opening and closing flow control valves between the hydraulic pumps and the hydraulic motors to regulate a flow of hydraulic fluid from the hydraulic pumps to the hydraulic motors; or
combinations thereof.

20. The method of claim 17, wherein the regulating comprises regulating energy transferred from the hydraulic motors to the generators.

21. The method of claim 17, wherein the regulating comprises coordinating a starting-up and shutting-down of each of the hydraulic pumps with a starting-up and shutting-down of each of the hydraulic motors.

22. The method of claim 17, wherein the regulating comprises regulating energy transferred from the wave energy mechanical interface to the power take off.

23. The method of claim 22, wherein the wave energy mechanical interface comprises a paravane coupled with a stroke telescope, wherein the stroke telescope is telescopically coupled with a column.

24. The method of claim 23, further comprising:
monitoring hydraulic pressure of the hydraulic pumps;
monitoring flow rate of hydraulic fluid from the hydraulic pumps;
monitoring a distance between the paravane and a wave surface;
monitoring a stroke position of the stroke telescope; and
controlling hydraulic pressure, flow rate, distance, and stroke position based on monitored hydraulic pressure, flow rate, distance, and stroke position to control production of electricity by the generators.

25. The method of claim 24, wherein controlling hydraulic pressure, flow rate, distance, and stroke position comprises:
increasing or decreasing the flow rate of hydraulic fluid from the hydraulic pumps;
determining a mass above the paravane based on the distance between the paravane and the wave surface;
raising or lowering the paravane relative to the water surface; or
combinations thereof.

26. The method of claim 23, wherein regulating energy transferred from the wave energy mechanical interface to the power take off comprises regulating a stroke position of the stroke telescope.

27. The method of claim 26, further comprising determining a distance between the paravane and a surface of a wave.

28. The method of claim 26, further comprising determining the stroke position of the stroke telescope.

29. The method of claim 17, wherein estimating the amount of energy transferred from the wave energy mechanical interface to the power take off and from the power take off to the plurality of generators comprises:
estimating an amount energy transferred from the wave energy mechanical interface to the hydraulic pumps;
estimating an amount energy transferred from the hydraulic pumps to the hydraulic motors; and
estimating an amount energy transferred from the hydraulic motors the generators.

30. The method of claim 29, wherein the wave energy mechanical interface comprises a paravane coupled with a stroke telescope, wherein the stroke telescope is telescopically coupled with a column, and wherein estimating the amount energy transferred from the wave energy mechanical interface to the hydraulic pumps comprises estimating a stroke force of the stroke telescope based on the estimated amount of energy transferred from waves to the wave energy mechanical interface.

31. The method of claim 30, wherein the stroke force is used to estimate operational parameters of the hydraulic pumps, and wherein the operational parameters are used to estimate a motor output in kW of the hydraulic motors.

32. The method of claim 30, further comprising using a gearbox coupled between the hydraulic motors and the generators to provide a constant RPM output to the generators.

33. The method of claim 32, further comprising using offline generators as synchronous condensers.

34. The method of claim 30, wherein controlling the amount of energy transferred from the hydraulic motors to the generators comprises controlling a depth of the paravane.

35. The method of claim 17, wherein controlling the amount of energy transferred from the hydraulic motors to the generators comprises controlling a number of hydraulic motors coupled to the generators, controlling a number of hydraulic pumps coupled to the hydraulic motors, or combinations thereof.

36. The method of claim 17, wherein the estimate of the wave energy is used to estimate a stroke force of the stroke telescope.

37. They method of claim 17, wherein electricity is produced with the generators prior to, during, and after regulating the impedance of energy transferred to the generators.

38. They method of claim 37, wherein the impedance of energy transferred to the generators is regulated to increase the electricity produced by the generators.

39. The method of claim 37, wherein the impedance of energy transferred to the generators is regulated to decrease the electricity produced by the generators.

40. The method of claim 17, comprising clutching-in at least one of the hydraulic motors while at least one of the hydraulic motors is clutched-out, clutching-out at least one of the hydraulic motors while at least one of the hydraulic motors is clutched-in, or combinations thereof.

41. The method of claim 17, wherein the regulating comprises starting-up at least one of the hydraulic pumps while at least another of the hydraulic pumps is shut-down, shutting-down at least one of the hydraulic pumps while at least another of the hydraulic pumps is started-up, or combinations thereof.

42. The method of claim 17, wherein estimating the amount of energy transferred from the wave to the wave energy mechanical interface, through the power take off, and to the plurality of generators comprises: estimating a force on the wave energy convertor from the wave based on an estimated wave energy; estimating operational parameters of the hydraulic pumps based on the estimated force on the wave energy converter; and estimating an output of the hydraulic motors based on the estimated operational parameters of the hydraulic pumps; and wherein the energy transferred to the generators is controlled based on the estimated operational parameters of the hydraulic pumps; thereby, controlling the electricity generated by the generators.

43. A method for regulating the generation of electricity from wave energy in a wave energy convertor, the method comprising:
    positioning a wave energy mechanical interface of a wave energy convertor in water, the wave energy convertor further comprising:
        a power take off, the power take off including a plurality of hydraulic pumps coupled with a plurality of hydraulic motors, wherein the hydraulic pumps are coupled with the wave energy mechanical interface; and
        a plurality of generators coupled with the hydraulic motors;
    forming a modified Airy wave theory model by generating a graph of a propagation of the waves in accordance with the Airy wave theory, resetting a beginning of a wave phase of the graph from a wave crest to a wave trough; and reorienting a direction of a propagation of the wave phase;
    estimating an amount of energy transferred from waves to the wave energy mechanical interface by determining a wave energy estimate based on the modified Airy wave theory model; and
    controlling the generation of electricity by the generators based on the wave energy estimate-based.

44. A method for regulating the generation of electricity from wave energy in a wave energy convertor, the method comprising:
    forming a modified Airy wave theory model by generating a graph of a propagation of a waves on a surface of a homogeneous fluid layer in accordance with the Airy wave theory, wherein a wave phase of the graph begins at a wave crest, and wherein a direction of propagation of the wave phase of the graph is such that a wave period moves from 360° to 0°; resetting the beginning of the wave phase from the wave crest to a wave trough; and reorienting the direction of the propagation of the wave phase such that the wave period moves from 0° to 360°;
    estimating an amount of energy transferred to a generator from a wave energy convertor, wherein the estimating comprises determining a wave energy estimate based on the modified Airy wave theory model; and
    regulating impedance of energy transferred to the generator based on the wave energy estimate, thereby controlling generation of electricity by the generator.

45. A method for regulating the generation of electricity from wave energy in a wave energy convertor, the method comprising:
    providing a wave energy converter comprising a wave energy mechanical interface, a power take off, and a plurality of generators, wherein the power take off comprises a plurality of hydraulic pumps coupled with the wave energy mechanical interface and a plurality of hydraulic motors coupled with the hydraulic pumps, wherein the hydraulic motors are coupled with the generators;
    forming a modified Airy wave theory model by generating a graph of a propagation of a waves on a surface of a homogeneous fluid layer in accordance with the Airy wave theory, wherein a wave phase of the graph begins at a wave crest, and wherein a direction of propagation of the wave phase of the graph is such that a wave period moves from 360° to 0°; resetting the beginning of the wave phase from the wave crest to a wave trough; and reorienting the direction of the propagation of the wave phase such that the wave period moves from 0° to 360°;
    estimating an amount of energy transferred to the generators from the wave energy convertor, wherein the estimating comprises determining a wave energy estimate based on the modified Airy wave theory model;
    regulating impedance of energy transferred to the generators based on the wave energy estimate, thereby controlling the generation of electricity by the generators; and
    using offline generators of the plurality of generators as synchronous condensers.

46. A system for the generation of electricity, the system comprising:
    a wave energy converter comprising a wave energy mechanical interface, a power take off, and a plurality of generators, wherein the power take off comprises a plurality of hydraulic pumps coupled with the wave energy mechanical interface and a plurality of hydraulic motors coupled with the hydraulic pumps, wherein the hydraulic motors are coupled with the generators;
    a controller configured to estimate an amount of energy transferred to the generators from the wave energy convertor, wherein the estimating comprises determining a wave energy estimate based on a modified Airy wave theory model, the modified Airy wave theory model formed by: generating a graph of a propagation of a waves on a surface of a homogeneous fluid layer in accordance with the Airy wave theory, wherein a wave phase of the graph begins at a wave crest, and wherein a direction of propagation of the wave phase of the graph is such that a wave period moves from 360° to 0°; resetting the beginning of the wave phase from the wave crest to a wave trough; and reorienting the direction of the propagation of the wave phase such that the wave period moves from 0° to 360°;

the controller configured to regulate impedance of energy transferred to the generators based on the wave energy estimate, thereby controlling the generation of electricity by the generators; and wherein offline generators of the plurality of generators are configured to function as synchronous condensers.

47. A method for regulating the generation of electricity from wave energy in a wave energy convertor in real-time, the method comprising:

providing a wave energy converter at a site, wherein asynchronous waves are present at the site, wherein the wave energy converter comprises: a wave energy mechanical interface; a power take off coupled with the wave energy mechanical interface, the power take off comprising a plurality of hydraulic pumps coupled with a plurality of hydraulic motors, wherein the hydraulic pumps are coupled with the wave energy mechanical interface; and one or more generators coupled with the plurality of hydraulic motors;

determining, in real-time, wave conditions of the asynchronous waves at the site using a modified Airy wave theory model including determining a wave energy estimate of the asynchronous waves, wherein the modified Airy wave theory model is generated by: generating a graph of a propagation of waves on a surface of a homogeneous fluid layer in accordance with the Airy wave theory, resetting a beginning of a wave phase of the graph from a wave crest to a wave trough, and reorienting a direction of the propagation of the wave phase;

estimating, in real-time, an amount of energy transferred from the asynchronous waves to the wave energy mechanical interface, through the power take off, and to the one or more generators based on the wave energy estimate based of the modified Airy wave theory model; and regulating, in real-time, impedance of energy transferred to the one or more generators based on the estimated amount of energy transferred from the asynchronous waves, thereby controlling generation of electricity by the one or more generators.

48. The method of claim 47, wherein estimating the amount of energy transferred from the asynchronous waves to the wave energy mechanical interface, through the power take off, and to the one or more generators comprises: estimating a force on the wave energy convertor from the asynchronous waves based on the wave energy estimate; estimating operational parameters of the hydraulic pumps based on the estimated force on the wave energy converter; and estimating an output of the hydraulic motors based on the estimated operational parameters of the hydraulic pumps; and wherein the energy transferred to the generators is controlled based on the estimated operational parameters of the hydraulic pumps; thereby, controlling the electricity generated by the generators.

* * * * *